(12) United States Patent
Stilwell et al.

(10) Patent No.: US 12,330,925 B2
(45) Date of Patent: Jun. 17, 2025

(54) LIFT TRUCK HAVING ADVANTAGEOUS DESIGN ELEMENTS

(71) Applicant: Hyster-Yale Materials Handling, Inc., Fairview, OR (US)

(72) Inventors: Edmund Stilwell, Oregon City, OR (US); Ryan McDermott, Fairview, OR (US); Nicholas M. Draayer, Portland, OR (US); Dan Miller, Portland, OR (US); Mark Cheyne, Gresham, OR (US); John Santiago, Portland, OR (US)

(73) Assignee: Hyster-Yale Materials Handling, Inc., Fairview, OR (US)

( * ) Notice: Subject to any disclaimer, the term of this patent is extended or adjusted under 35 U.S.C. 154(b) by 0 days.

(21) Appl. No.: 18/640,146

(22) Filed: Apr. 19, 2024

(65) Prior Publication Data

US 2024/0262665 A1   Aug. 8, 2024

Related U.S. Application Data

(63) Continuation of application No. 17/845,030, filed on Jun. 21, 2022, now Pat. No. 12,012,321, which is a
(Continued)

(51) Int. Cl.
*B66F 9/22*    (2006.01)
*B66F 9/075*   (2006.01)

(52) U.S. Cl.
CPC ........ *B66F 9/07572* (2013.01); *B66F 9/0759* (2013.01); *B66F 9/22* (2013.01)

(58) Field of Classification Search
CPC ....... B66F 9/07572; B66F 9/22; B66F 9/0759
See application file for complete search history.

(56) References Cited

U.S. PATENT DOCUMENTS 4,026,378 A * 5/1977 DePriester .......... B66F 9/07531
                                              180/68.5
4,580,650 A * 4/1986 Matsuda ............. B66F 9/07554
                                              280/30
(Continued)

FOREIGN PATENT DOCUMENTS

DE   102011004603 A1   6/2012
DE   102017127255 A1   5/2019
(Continued)

OTHER PUBLICATIONS

Partial European Search Report, EPO Pat. Appl.24219872.9 (May 8, 2025).

*Primary Examiner* — Bryan A Evans

(57) ABSTRACT

Lift trucks are designed with a common chassis and can accommodate different form factors and different energy sources. According to one example, a chassis for a configurable sit-down counterbalanced forklift truck comprises a front side, a rear side, a left side, and a right side. A chassis compartment is situated between the front side and the rear side and between the left side and right side of the chassis. The chassis compartment is configured to fit within the chassis compartment one of a plurality of different types of power plants for the forklift truck and one of a plurality of different types of power sources. The chassis compartment is configured to hold one of a plurality of different designs of counterweights on or in a rear portion of the chassis compartment. The chassis is configured to support one of a plurality of different operator compartment modules attached atop the chassis.

29 Claims, 40 Drawing Sheets

Related U.S. Application Data continuation of application No. 16/424,998, filed on May 29, 2019, now Pat. No. 11,427,450.

(60) Provisional application No. 62/679,686, filed on Jun. 1, 2018.

(56) References Cited

U.S. PATENT DOCUMENTS

| | | | |
|---|---|---|---|
| 6,446,758 B1* | 9/2002 | Schatz | B60N 2/14 297/335 |
| 11,505,265 B2 | 11/2022 | Lee | |
| 2008/0017426 A1 | 1/2008 | Walters et al. | |
| 2008/0302608 A1 | 12/2008 | Eckersley | |
| 2011/0162912 A1* | 7/2011 | Rainsford | B66F 9/07554 187/222 |

FOREIGN PATENT DOCUMENTS

| | | |
|---|---|---|
| EP | 2883730 B1 | 6/2015 |
| EP | 3168895 A1 | 5/2017 |
| EP | 3546418 B1 | 10/2018 |
| JP | H1146405 A | 2/1999 |

\* cited by examiner

LIFT TRUCK HAVING ADVANTAGEOUS DESIGN ELEMENTS

CROSS REFERENCE TO RELATED APPLICATIONS

This application is a continuation and claims the benefit, under 35 U.S.C. § 120, of U.S. patent application Ser. No. 17/845,030, entitled "Lift Truck Having Advantageous Design Elements," filed Jun. 21, 2022, now U.S. Pat. No. 12,012,321, which in turn claims the benefit, under 35 U.S.C. § 120, of U.S. patent application Ser. No. 16/424,998, entitled "Lift Truck Having Advantageous Design Elements," filed May 29, 2019, now U.S. Pat. No. 11,427,450, which in turn claims priority under 35 U.S.C. § 119(e) to U.S. Provisional Patent Application No. 62/679,686, entitled "Modular Lift Truck Design Based on a Common Chassis," filed Jun. 1, 2018. The entire disclosures of those foregoing patent applications are incorporated by reference herein.

TECHNICAL FIELD

The field of this disclosure relates generally to material handling vehicles. More specifically, this disclosure relates to lift trucks having a modular design that can incorporate a common chassis and one of a variety of different possible energy sources and power plants, an operator compartments, and counterweights.

BACKGROUND INFORMATION

Lift trucks, including forklift trucks, are commonly used in manufacturing and warehousing facilities to lift and to transport materials. Lift trucks incorporate multiple components such as counterweights, a hydraulic system, electronics, an energy source, wheels (and tires), a steering mechanism, an operator's seat within an operator compartment, and a lift assembly, all supported by the truck's chassis. These lift trucks are ideally small and agile, have a small turning radius and compact footprint, and are able to repeatedly lift thousands of pounds of materials with little maintenance. An operator (also referred to as a "driver") controls the lift truck from the operator compartment, often for multiple hours at a time, and may frequently enter and exit the operator compartment of the truck to manually handle or adjust the materials that are being transported. The operator's comfort within the operator compartment, visibility from the operator compartment, and ease of physically accessing the operator compartment are relevant to efficient material transport.

To improve maneuverability, the design of lift trucks often will compromise the ergonomics of the operator compartment. For example, the truck components are commonly arranged in a stacked vertical orientation to minimize the truck's length and width. This arrangement can result in a lift truck having a high operator compartment floor, thereby requiring an operator to use multiple vertical steps to enter and to exit the truck. The high floor height of the operator compartment relative to the ground is one shortcoming of commonly available lift trucks and makes it unduly burdensome for an operator to quickly and easily step into and out of the truck. A high floor height also raises the elevation of truck components that are located on or above the floor, such as overhead guards, operator seats, operator compartments, or portions of the lift assembly. Such elevated placement can hamper visibility if the view from the operator's seat is limited; hinder the operator when moving into, out of, or within the operator compartment; and undesirably raise the center of gravity of the lift truck. Another shortcoming with known lift trucks is the limited floor space within the operator compartment. Columns and foot controls that extend from the floor can restrict movement of the operator's legs and feet while using the truck. In the absence of ergonomically designed lift trucks, operator comfort and productivity may suffer.

Overview of Disclosure

One aspect of this disclosure relates to lift trucks having a modular design that incorporates a common chassis, which can accommodate one of a variety of hydraulic systems, electronics, energy sources, counterweights, wheels, steering, seating and floor components assembled in various configurations, to provide a driver with ergonomic and productive truck operation.

One aspect of an ergonomic operator compartment can be achieved by placing the floor of the operator compartment relatively close to the ground, such that the operator need only take a single vertical step to enter and to exit the compartment comfortably. A flat and broad floor in the operator compartment can also improve operator comfort. In addition, it is beneficial for the floor to have few or no obstacles that the operator has to avoid or to maneuver around when getting into and out of the compartment, or while driving the lift truck. For example, the operator compartment may be free of a steering wheel and/or foot controls, instead having means for steering and/or control integrated into the operator's seat.

It is also often desirable to design a lift truck so that the lift truck driver has views from the operator's seat with minimal or no obstructions. This can be achieved, for example, by designing truck components to have a low profile or to slope downwardly at a specific location, such as behind the operator's seat to allow for improved rear visibility by the operator. The operator's seat itself can be positioned within the operator compartment in a manner that provides sufficient leg room for rapid ingress and egress, as well as during routine truck driving. In addition, the operator's seat can move in a manner that provides the operator with unobstructed views both in front of and behind the lift truck without incurring undue eye, neck, back, or leg strain. For example, the operator's seat can rotate about a vertical axis and be designed to slide forward and backward independent from, or concurrent with, such rotation. The seat may incorporate a mechanism that adjusts the seat height vertically, in addition to or instead of the rotating and/or sliding mechanisms.

The chassis of the lift truck can be designed to include compartments that contain specific components, which can be placed in various locations within the truck. For example, a chassis compartment can contain an energy source, such as one or more batteries, and/or an electric motor, or hydraulic components that are used for the lift assembly. A chassis compartment can be designed to be readily accessible to an operator, such as to allow for routine maintenance of a component, or it can be designed to limit accessibility by an operator. An operator-inaccessible compartment can contain certain components of the lift truck that generally require little maintenance, such as service-free batteries, motors, and/or hydraulic components.

A lift truck generally includes a number of standard components. For example, lift trucks have an energy source that provides energy to the truck, such as one or more lithium-ion or lead-acid batteries. The lift truck incorporates a lift assembly with an attachment, such as forks, used to vertically lift a load. Lift trucks also have a plurality of wheels that are used to move the truck forward and backward. For example, a lift truck may have three wheels, or it may have four wheels, or it may have more than four wheels. The lift truck can include a roof over the operator compartment, such as an overhead guard. Truck components can be arranged in a horizontal manner, rather than vertically, using a prudently designed chassis. One will appreciate, however, that vertical arrangements of truck components using other advantageous configurations described herein are also possible, as are mixed horizontal and vertical arrangements.

In an embodiment, a lift truck includes a chassis having a front side, a rear side, a left side and a right side. The lift truck also includes a plurality of wheels attached to the chassis at, at least, the front side of the chassis. A counterweight can be attached to the rear side of the chassis, and a drive axle can be attached to the front side of the chassis. A chassis compartment can extend between the drive axle and the counterweight, and also extend between the left side and right side of the chassis. The lift truck can include an operator seat that is located above the operator compartment floor. The operator compartment floor can be located above the chassis compartment and can extend between the left side and right side of the chassis, and also extend between the drive axle and the counterweight. The operator compartment floor can be located at least partially underneath the operator seat. The lift truck can include an energy source, an electric motor operably connected to the energy source and to the drive axle, and a hydraulic system operably connected to the energy source.

In one embodiment, a lift truck is a forklift truck, which includes a chassis having sides and a bottom that are configured to define a chassis compartment within the sides and above the bottom. The chassis also has front and back ends. A plate that is on and securely attached to the chassis on a top of the chassis can form a top cover of the chassis compartment. The forklift can include an operator compartment that is bounded on its bottom by the plate, thereby forming a floor for the operator compartment. A plurality of wheels attached to the chassis and configured to roll forward and backward and to steer the forklift truck can also be included, as can a lift assembly attached to the chassis and having forks, with the lift assembly configured to lift a load on the forks vertically. The forklift truck can include a counterweight on a side of the truck opposite the lift assembly, and it can include a power plant providing power to turn one or more of the plurality of wheels and to actuate the lift assembly. The power plant can be located within the chassis compartment. The power plant can include a motor, a hydraulic tank, a hydraulic pump that is fluidly connected to the hydraulic tank, and a hydraulic valve. The motor is electrically connected to a service-free battery and configured to drive one or more hydraulic pumps and at least one of the plurality of wheels.

In an additional embodiment, a lift truck includes a chassis having a front end, a rear end, a left side and a right side. A set of wheels is connected to the chassis. A counterweight can be attached in the proximity of the rear end of the chassis, and a drive axle can be attached in the proximity of the front end of the chassis. A drive axle can be attached to the front end of the chassis, and an electric motor can be located in the drive axle and configured to drive at least one of the set of wheels. A mast can be attached in the proximity of the front end of the chassis. A chassis compartment can extend between the drive axle and the counterweight and also extend between the left side and right side of the chassis. The lift truck can include an energy source and a hydraulic system located in the chassis compartment. The energy source is operably connected to the electric motor and the hydraulic system. The lift truck can include an operator seat in an operator compartment. An operator compartment floor can be located over the chassis compartment and can extend between the left side and right side of the chassis. The floor can also extend from the drive axle toward the counterweight such that the floor is at least partially underneath the operator seat.

In some embodiments, a lift truck comprises a chassis having a front side, a rear side, a left side, and a right side. The lift truck also comprises a plurality of wheels attached to the chassis at the front side of the chassis, a drive axle attached to one or more of the plurality of wheels, a counterweight attached to the rear side of the chassis, a chassis compartment extending between the drive axle and the counterweight and between the left side and right side of the chassis, an operator seat, and an operator compartment floor above the chassis compartment, the floor extending between the left side and right side of the chassis and between the drive axle and the counterweight such that the operator compartment floor is at least partially under the operator seat. The lift truck also comprises an energy source, an electric motor operably connected to the energy source and to the drive axle, and a hydraulic system operably connected to the energy source.

In some embodiments, a lift truck comprises a chassis having a front side, a rear side, a left side, and a right side. The lift truck also comprises one or more drive wheels attached to the chassis at the front side of the chassis, a counterweight attached to the rear side of the chassis, a chassis compartment situated between the one or more drive wheels and the counterweight and between the left side and right side of the chassis, an operator seat, and an operator compartment floor above the chassis compartment, wherein the floor is situated between the left side and right side of the chassis and between the one or more drive wheels and the counterweight such that the operator compartment floor is at least partially under the operator seat. The lift truck also comprises an energy source, a motor operably connected to the energy source and to the drive wheel, and a hydraulic system operably connected to the energy source.

In some embodiments, a forklift truck comprises a chassis having sides and a bottom configured to define a chassis compartment within the sides and above the bottom, the chassis further having a front end and a back end. The fork lift truck also comprises a plate on and attached to the chassis on a top of the chassis, the plate forming a top cover of the chassis compartment. The forklift truck also comprises an operator compartment bounded on its bottom by the plate, which forms a floor of the operator compartment. The forklift truck also comprises a plurality of wheels attached to the chassis and configured to roll to steerably move the forklift truck forward and backward, a lift assembly attached to the chassis near the front end of the chassis and having forks, the lift assembly configured to lift a load on the forks vertically, a counterweight placed near the back end of the chassis, and a power plant providing power to turn one or more of the plurality of wheels and to actuate the lift assembly. An energy source is located within the chassis compartment and comprises a service-free battery. A hydraulic tank, a hydraulic pump fluidly connected to the hydraulic tank, a motor electrically connected to the service-free battery and configured to drive one or more of the hydraulic pumps or at least one of the plurality of wheels, and a hydraulic valve are also located within the chassis compartment.

In some embodiments, a lift truck comprises a chassis having a front end, a rear end, a left side, and a right side. The lift truck also comprises a set of wheels connected to the chassis, a counterweight in the proximity of the rear end of the chassis, a drive axle in the proximity of the front end of the chassis, an electric motor located in the drive axle and configured to drive at least one of the wheels or one of the sets of wheels, a mast in the proximity of the front end of the chassis, a chassis compartment extending between the proximity of the drive axle and the proximity of the counterweight and between the left side and the right side of the chassis, a hydraulic system located in the chassis compartment, an energy source located in the chassis compartment and operably connected to the electric motor and the hydraulic system, an operator seat, and an operator compartment floor over the chassis compartment, wherein the floor extends between the left side and the right side of the chassis at a height of no more than approximately 20 inches above the ground.

In some embodiments, a lift truck comprises a chassis having a front side, a rear side, a left side, and a right side. The lift truck also comprises a plurality of wheels which include one or more drive wheels, a counterweight, and a chassis compartment situated between the front side and the rear side and between the left side and right side of the chassis wherein the chassis compartment has a chassis compartment area between the one or more drive wheels and the counterweight and between the left side and right side of the chassis. The lift truck also comprises an operator seat and an operator compartment floor above the chassis compartment, wherein the operator compartment floor is situated within the chassis compartment, is between approximately 10 and approximately 30 inches (or 25-75 cm) above the ground, and has a floor area that is greater than or equal to 60% of the chassis compartment area. The lift truck also comprises an energy source, a motor operably connected to the energy source and to one or more of the drive wheels, and a hydraulic system operably connected to the energy source.

In some embodiments, a lift truck comprises a chassis having a front side, a rear side, a left side, and a right side. The lift truck also comprises a plurality of wheels, including one or more drive wheels having a drive wheel height, a counterweight, a chassis compartment situated between the front side and the rear side and between the left side and right side of the chassis wherein the chassis compartment has a chassis compartment area between the front side and the rear side and between the left side and right side of the chassis. The lift truck also comprises an operator seat, an operator compartment floor above the chassis compartment, wherein the operator compartment floor is situated within the chassis compartment, has a floor height that is less than or equal to the drive wheel height, and has a floor area that is greater than or equal to 60% of the chassis compartment area. The lift truck also comprises an energy source, a motor operably connected to the energy source and to one or more of the drive wheels, and a hydraulic system operably connected to the energy source.

In some embodiments, an inventory of parts for assembling a lift truck comprises multiple wheels which include drive wheels and steer wheels, multiple interchangeable counterweights which include a first counterweight having a first weight value and a second counterweight having a different second weight value, multiple interchangeable operator seats which include a first seat having a first seat configuration and a second seat having a different second seat configuration, energy sources, motors for operable connection to one or more of the energy sources and to one or more of the drive wheels, hydraulic systems, and a chassis having a front side, a rear side, a left side, and a right side, wherein the chassis is adapted for operable connection to one or more of the drive wheels, wherein the chassis is adapted for operable connection to one or more of the steer wheels, wherein the chassis has a chassis compartment situated between the front side and the rear side and between the left side and right side of the chassis, wherein the chassis compartment is adapted to accommodate an operator seat of either of both the first and second seat configurations, wherein the chassis is adapted to accommodate a counterweight of either of both the first and second weight values, wherein the chassis is adapted to support at least one of the energy sources, wherein the chassis is adapted to support at least one of the motors, and wherein the chassis is adapted to support at least one of the hydraulic systems.

In some embodiments, a chassis for a modular lift truck comprises a front side, a rear side, a left side, a right side. The chassis also comprises one or more first wheel connection areas adapted for operable connection to one or more drive wheels, one or more second wheel connection areas adapted for operable connection to one or more steer wheels, a chassis compartment situated between the front side and the rear side and between the left side and right side of the chassis, a counterweight area adapted to accommodate a counterweight of either of both first and second different weight values of interchangeable counterweights, an energy source area adapted to support at an energy source, a motor area adapted to support a motor; and a hydraulic system area adapted to support a hydraulic system. The chassis compartment is adapted to accommodate an operator seat of either of both first and second different seat configurations of interchangeable operator seats.

In some embodiments, a method of constructing a lift truck comprises forming a chassis adapted for operable connection to modular components wherein the chassis includes a front side, a rear side, a left side, a right side, one or more first wheel connection areas adapted for operable connection to one or more drive wheels, one or more second wheel connection areas adapted for operable connection to one or more steer wheels. The chassis includes a chassis compartment situated between the front side and the rear side and between the left side and right side of the chassis, a counterweight area adapted to accommodate a counterweight of either of both first and second different weight values of interchangeable counterweights, an energy source area adapted to support at an energy source, a motor area adapted to support a motor; and a hydraulic system area adapted to support a hydraulic system. An operator compartment above the chassis compartment is adapted to accommodate an operator seat of either of both first and second different seat configurations of interchangeable operator seats. The method also comprises operably connecting one or more drive wheels to the drive wheel connection areas, operably connecting one or more steer wheels to the steer wheel connection area, operably connecting the operator seat within the operator compartment, operably connecting a counterweight to the counterweight area; operably connecting the energy source to the energy source area, operably connecting the motor to the motor area and to the energy source and one or more of the drive wheels, and operably connecting the hydraulic system to the hydraulic system area.

In some additional, alternative, or selectively cumulative embodiments, the lift truck employs multiple motors.

In some additional, alternative, or selectively cumulative embodiments, a drive axle is attached to one or more of the drive wheels, wherein the electric motor is located in the drive axle.

In some additional, alternative, or selectively cumulative embodiments, the hydraulic system is located in the chassis compartment.

In some additional, alternative, or selectively cumulative embodiments, the hydraulic system comprises a hydraulic pump and a motor configured to operate the hydraulic pump.

In some additional, alternative, or selectively cumulative embodiments, the hydraulic system further comprises a hydraulic tank fluidly connected to the hydraulic pump, and a hydraulic valve.

In some additional, alternative, or selectively cumulative embodiments, the hydraulic pump is directly connected to the hydraulic tank without a hose.

In some additional, alternative, or selectively cumulative embodiments, the chassis compartment further comprises an operator-inaccessible compartment.

In some additional, alternative, or selectively cumulative embodiments, the operator compartment floor is not readily removable by the operator and comprises a cover for the operator-inaccessible chassis compartment.

In some additional, alternative, or selectively cumulative embodiments, the operator compartment floor extends substantially flat side-to-side across approximately the entire width of the lift truck.

In some additional, alternative, or selectively cumulative embodiments, the operator compartment floor is between approximately 10 and approximately 30 inches (or about 25-76 cm) above the ground.

In some additional, alternative, or selectively cumulative embodiments, the operator compartment floor is between approximately 15 and approximately 25 inches (or about 38-63 cm) above the ground.

In some additional, alternative, or selectively cumulative embodiments, the operator compartment floor is between approximately 17 and approximately 22 inches (or about 43-56 cm) above the ground.

In some additional, alternative, or selectively cumulative embodiments, the operator compartment floor is between approximately 18 and approximately 20 inches (or about 45-51 cm) above the ground.

In some additional, alternative, or selectively cumulative embodiments, the operator compartment floor is approximately 19 inches (or about 48 cm) above the ground.

In some additional, alternative, or selectively cumulative embodiments, one or more of the drive wheels has a drive wheel height, and the operator compartment floor has a floor height that is less than or equal to the drive wheel height, 95% of the drive wheel height, 90% the drive wheel height, 85% the drive wheel height, 80% the drive wheel height, or 75% the drive wheel height.

In some additional, alternative, or selectively cumulative embodiments, one or more of the drive wheels has a drive wheel height, and the operator compartment floor has an average floor height that is less than or equal to the drive wheel height, 95% of the drive wheel height, 90% the drive wheel height, 85% the drive wheel height, 80% the drive wheel height, or 75% the drive wheel height.

In some additional, alternative, or selectively cumulative embodiments, one or more of the drive wheels has a drive wheel height, and a portion of the operator compartment floor has a floor height that is less than or equal to the drive wheel height, 95% of the drive wheel height, 90% the drive wheel height, 85% the drive wheel height, 80% the drive wheel height, or 75% the drive wheel height.

In some additional, alternative, or selectively cumulative embodiments, one or more of the drive wheels has a drive wheel height and a drive wheel radius height, and a portion of the operator compartment floor has a floor height that is between the drive wheel height and the drive wheel radius height.

In some additional, alternative, or selectively cumulative embodiments, one or more rear wheels having a rear wheel radius height, one or more of the drive wheels has a drive wheel height, and a portion of the operator compartment floor has a floor height that is between the drive wheel height and the rear wheel radius height.

In some additional, alternative, or selectively cumulative embodiments, the operator compartment floor is at a height above ground such that an operator can comfortably get in or out of the operator compartment in one step.

In some additional, alternative, or selectively cumulative embodiments, the operator compartment floor is at a height above ground such that an operator can comfortably get in the operator compartment in one step from the ground and such that an operator can comfortably get out of the operator compartment with one step to the ground.

In some additional, alternative, or selectively cumulative embodiments, the chassis compartment has a chassis compartment top area between the one or more drive wheels and the counterweight and between the left side and right side of the chassis, and the operator compartment floor has a floor area that is greater than or equal to 95%, 90%, 85%, 80%, 75%, or 60% of the chassis compartment area.

In some additional, alternative, or selectively cumulative embodiments, the chassis compartment has a chassis compartment area between the drive axle and the counterweight and between the left side and right side of the chassis, and the operator compartment floor has a floor area that is greater than or equal to 95%, 90%, 85%, 80%, 75%, or 60% of the chassis compartment area.

In some additional, alternative, or selectively cumulative embodiments, the operator compartment floor has a floor area that is substantially flat for greater than or equal to 50%, 60%, or 70% of the chassis compartment area.

In some additional, alternative, or selectively cumulative embodiments, the operator compartment has an operator compartment area between the drive axle and the counterweight and between the left side and right side of the chassis, and the operator compartment floor has a floor area that is greater than or equal to 95%, 90%, 85%, 80%, 75%, or 60% of the operator compartment area.

In some additional, alternative, or selectively cumulative embodiments, the lift truck includes an overhead guard having an overhead-guard area, and the operator compartment floor has a floor area that is greater than or equal to 95%, 90%, 85%, 80%, 75%, or 60% of the overhead guard area.

In some additional, alternative, or selectively cumulative embodiments, an operator-accessible compartment has a top cover, and an operator-serviceable component is located in the operator-accessible compartment.

In some additional, alternative, or selectively cumulative embodiments, the operator-accessible compartment is located above the counterweight.

In some additional, alternative, or selectively cumulative embodiments, the top cover slopes downward toward the rear of the lift truck.

In some additional, alternative, or selectively cumulative embodiments, the operator-serviceable component is one of a motor controller, fuse, VSM, contactor, or any combination thereof.

In some additional, alternative, or selectively cumulative embodiments, the counterweight comprises multiple distinct pieces.

In some additional, alternative, or selectively cumulative embodiments, the counterweight is a two-piece counterweight.

In some additional, alternative, or selectively cumulative embodiments, the energy source comprises a battery.

In some additional, alternative, or selectively cumulative embodiments, the energy source comprises a service-free battery.

In some additional, alternative, or selectively cumulative embodiments, the service-free battery is a lithium-based battery.

In some additional, alternative, or selectively cumulative embodiments, the operator seat is attached to the operator compartment floor.

In some additional, alternative, or selectively cumulative embodiments, the operator seat is rotatable about a vertical axis.

In some additional, alternative, or selectively cumulative embodiments, the operator seat has a range of rotation of approximately ±360 degrees, ±270 degrees, ±180 degrees, ±90 degrees, ±60 degrees, ±30 degrees, or ±22 degrees from a straight-forward-facing direction.

In some additional, alternative, or selectively cumulative embodiments, the operator seat is configured to slide backward as the seat rotates, so as to keep the operator's legs within an operator compartment as the seat rotates.

In some additional, alternative, or selectively cumulative embodiments, the operator seat has a bottom having front, left, right, and rear edges; and the operator compartment floor extends substantially flat front-to-back from a front cowl proximate the front of the lift truck to a rear floor edge behind the front edge of the seat bottom.

In some additional, alternative, or selectively cumulative embodiments, there is an amount of leg room on the operator compartment floor to permit an operator to swing the operator's legs laterally while keeping the operator's feet above the floor.

In some additional, alternative, or selectively cumulative embodiments, hand-operated operator controls are integrated into the seat.

In some additional, alternative, or selectively cumulative embodiments, the lift truck has no steering wheel extending from the operator compartment floor.

In some additional, alternative, or selectively cumulative embodiments, the lift truck has no foot controls.

In some additional, alternative, or selectively cumulative embodiments, the seat comprises at least one armrest, and the operator controls are located on at least one armrest.

In some additional, alternative, or selectively cumulative embodiments, the lift truck comprises a steering wheel.

In some additional, alternative, or selectively cumulative embodiments, the steering wheel is mounted on a steering column attached to the operator compartment floor.

In some additional, alternative, or selectively cumulative embodiments, the lift truck comprises one or more foot controls.

In some additional, alternative, or selectively cumulative embodiments, the operator compartment floor provides structural strength to the chassis to resist deflection of the chassis.

In some additional, alternative, or selectively cumulative embodiments, the lift truck comprises an overhead guard above the operator seat.

In some additional, alternative, or selectively cumulative embodiments, the plurality of wheels comprises at least one left wheel and at least one right wheel, and the operator compartment floor extends side-to-side from the at least one left wheel to the at least one right wheel.

In some additional, alternative, or selectively cumulative embodiments, the plurality of wheels consists of three wheels.

In some additional, alternative, or selectively cumulative embodiments, the plurality of wheels consists of four wheels.

In some additional, alternative, or selectively cumulative embodiments, the lift truck comprises a drive axle attached to one or more of the drive wheels; and the lift truck comprises a mast attached to the drive axle.

In some additional, alternative, or selectively cumulative embodiments, the lift truck comprises a lift assembly attached to the chassis and having forks.

In some additional, alternative, or selectively cumulative embodiments, the lift assembly comprises at least one of a paper roll clamp, a carton clamp, a multiple-forks assembly, and a side-shifter.

In some additional, alternative, or selectively cumulative embodiments, the lift truck comprises a tilt mechanism connected to the lift assembly to selectively tilt the lift assembly.

In some additional, alternative, or selectively cumulative embodiments, the energy source comprises a battery stored under the operator compartment floor.

In some additional, alternative, or selectively cumulative embodiments, the lift truck comprises a drive wheel height of the drive wheel, and the lift truck comprises a center of gravity situated at a gravitational center height that is lower than or equal to the drive wheel height.

In some additional, alternative, or selectively cumulative embodiments, the lift truck comprises a floor height of the operator compartment floor, and the lift truck comprises a center of gravity situated at a gravitational center height that is lower than or equal to the floor height.

In some additional, alternative, or selectively cumulative embodiments, the lift truck comprises a steer wheel having a steer wheel height, and the lift truck comprises a center of gravity situated at a gravitational center height that is lower than or equal to the steer wheel height.

In some additional, alternative, or selectively cumulative embodiments, the lift truck comprises an unobstructed direct sight line from an operator of average male height seated in the operator seat to a front top of an object less than or equal to 165 mm high within 892 mm, within 700 mm, within 600 mm, within 500 mm, or 388 mm behind the lift truck.

In some additional, alternative, or selectively cumulative embodiments, the operator compartment is equally accessible to an operator from both the right and left sides of the lift truck.

In some additional, alternative, or selectively cumulative embodiments, the chassis compartment has a chassis compartment height from the floor to the overhead guard that is greater than or equal to 5 feet (about 152 cm), 5.5 feet (about 168 cm), or 6 feet (about 183 cm).

Selectively cumulative embodiments are embodiments that include any combination of multiple embodiments that are not mutually exclusive.

Additional aspects and advantages will be apparent from the following detailed description of example embodiments, which proceeds with reference to the accompanying drawings.

BRIEF DESCRIPTION OF THE DRAWINGS

FIG. 10A is an isometric drawing of a lift truck from a rear right perspective, according to one embodiment. FIG. 10B is an isometric drawing of the lift truck of FIG. 10A from a front right perspective. FIG. 10C is a right side view of the lift truck of FIG. 10A. FIG. 10D is an isometric drawing of a lift truck from a front left side perspective, enlarged to show greater details according to one embodiment.

DETAILED DESCRIPTION OF EMBODIMENTS

Figure 1:
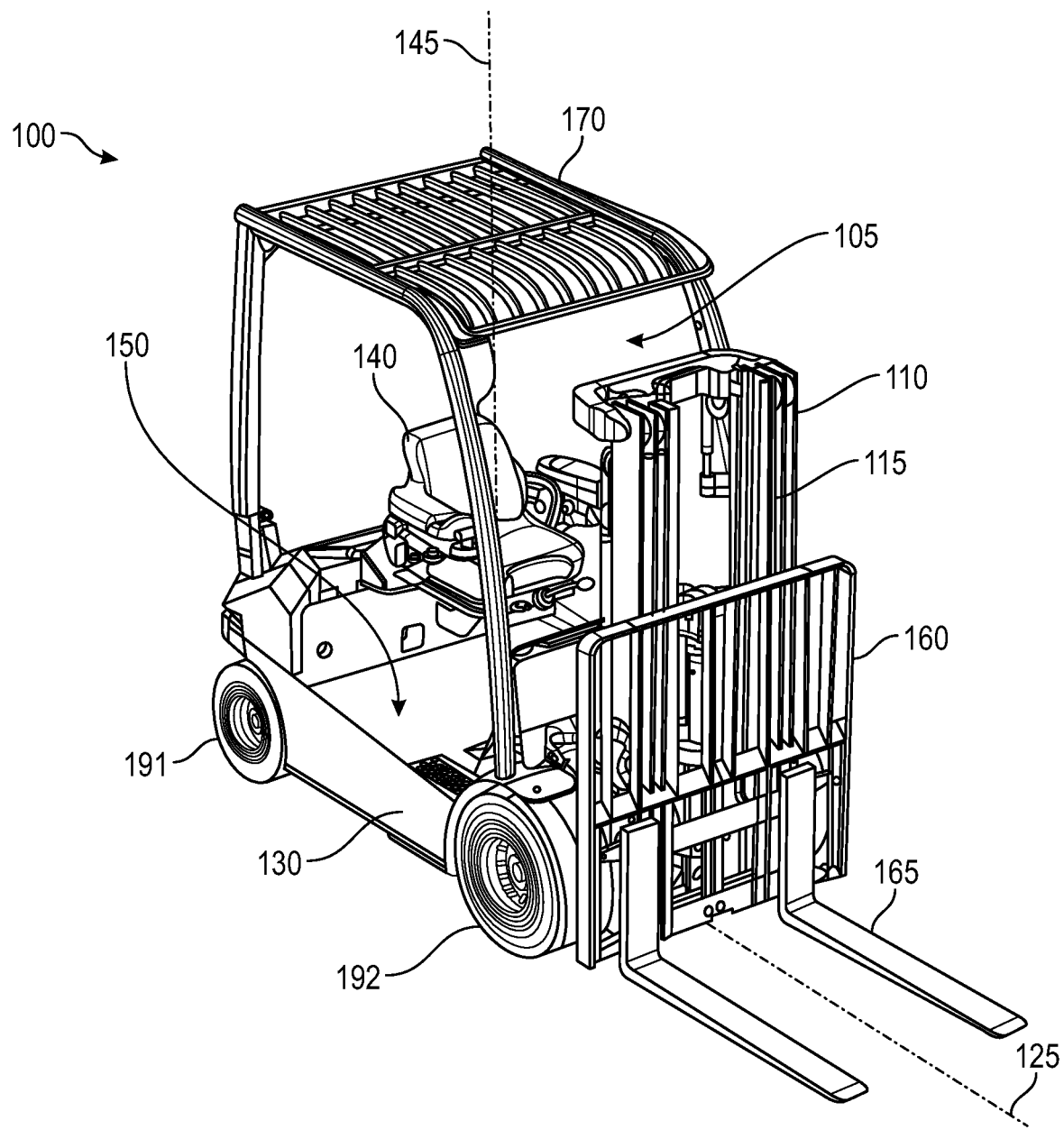
FIG. 1 is an isometric drawing of a lift truck from a front right perspective, according one embodiment.

Example embodiments are described below with reference to the accompanying drawings. Unless otherwise expressly stated, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," "comprising," "include," "includes," "including," "has," "have," and "having," when used in this document, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another and not to imply any relative order, placement, or ranking. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the drawings. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings. Additionally, the drawings may include non-essential elements that are included only for the sake of thoroughness. These non-essential elements may be removed entirely or left only in outline form if drawing changes are desired to create greater clarity.

The embodiments described herein are merely examples, set forth by way of illustration only and not limitation. Those skilled in the art will recognize in light of the teachings herein that there are alternatives, variations and equivalents to the example embodiments described herein and their component parts. For example, other embodiments are readily possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

As one skilled in the art will appreciate in light of this disclosure, certain embodiments of the lift trucks and designs therefor that are disclosed herein may be capable of achieving certain advantages, including, in some cases, one or more of the following: (1) an operator compartment with a low floor to facilitate comfortable entry into the operator compartment, exit from the operator compartment, and operation of the truck within the operator compartment; (2) an operator compartment having few or no obstacles to operator movement, especially along the floor of the operator compartment; (3) an operator-inaccessible chassis compartment that inhibits operators from disturbing high-reliability components that should ideally be accessed only by specifically trained service personnel; (4) a low-profile design to facilitate operator visibility; (5) a low center of gravity for enhanced stability, (6) a multi-piece counterweight of different densities; (7) a modular chassis design having form factors that are adaptable to multiple operator uses and to accommodate one of multiple possible energy sources, power plants, and/or other components, thereby providing manufacturers of lift trucks design options to allow for placement of various combinations of these components in various locations, while also being tailored to a customer's specific use; and (8) an operator compartment with a configurable storage system for tools and devices needed to perform daily tasks. The foregoing and other advantages of various embodiments will be apparent upon reading this document.

Figure 2:
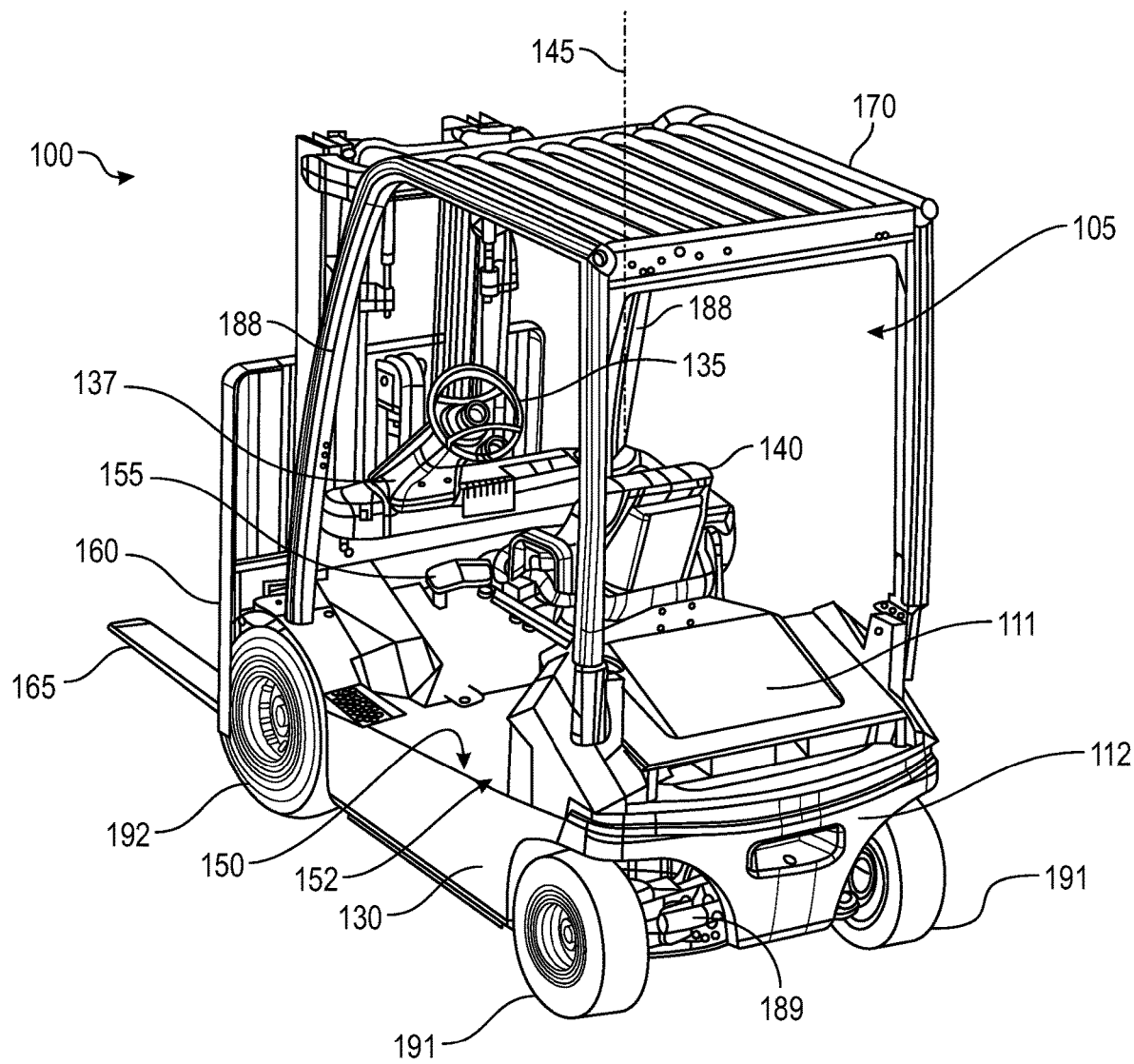
FIG. 2 is an isometric drawing of the lift truck of FIG. 1 from a rear left perspective.

FIGS. 1 and 2 are front and rear isometric illustrations, respectively, of a lift truck 100 according to one example embodiment. Referring to FIG. 1, the lift truck 100 can include an operator compartment 105 and a mast 110 having mast columns 115. Any type of mast may be used in the lift trucks disclosed herein. For example, the mast 110 may be an embodiment of the masts disclosed in U.S. Patent Appl. Publ. No. US 2017/0073203, the entire disclosure of which is incorporated by reference herein.

The lift truck 100 has a chassis 130 below the operator compartment 105 having an operator's seat 140 and an operator compartment floor 150 therein. The chassis 130 can be designed to be modular so as to accommodate a variety of components in assorted locations in order to meet an operator's specific needs. Thus, the chassis 130 can include compartments that are designed to contain certain components and that can be placed in certain locations within the lift truck 100. Additionally, the operator compartment floor 150 can be low and spacious and provide for a configurable area 152 within the operator compartment 105. The configurable area 152 may include a shelf or other means for storage on the inside of the operator compartment 305, such as a cup holder, a holder for a computerized device (such as a GPS device or an inventory device), miniature refrigerator or other food storage compartment, or other compartment(s) suitable for storing other operator items, such as tools or safety vests or jackets.

The chassis 130 can have two sides and a bottom that are configured to define a chassis compartment that is within the two sides and above the bottom. The chassis compartment can extend between the front end of the chassis, such as between the drive axle 324 (FIG. 10B) (which may extend along an axis (or a centerline) between the wheel centers of the drive wheels), to a counterweight 112 that is attached to the rear side, or at the rear end, of the chassis 130. The location of the front and rear ends of the chassis 130 are in reference to an operator seated in the seat 140 in the operator compartment 105, looking straight forward toward the mast 110 along a longitudinal axis 125. The chassis compartment can extend between the left side and the ride side of the chassis, that is, completely across the width of the lift truck 100, or it may extend between a subset of the width of the lift truck 100. The chassis compartment can contain an energy source, such as, for example, one or more batteries, and/or an electric motor, as well as hydraulic components that are used for the lift assembly, such as a hydraulic motor, hydraulic tank and/or at least one hydraulic valve.

The chassis 130 can include one or more counterweights 112 (shown in FIG. 2) made of one or more pieces, with each piece having one or more properties such as tensile strength and density. A counterweight 112 that is formed from, or made with, multiple counterweight pieces may in some circumstances be considered to be one functional unit that may be referred to herein as simply a "counterweight." Thus, the term "counterweight" may mean a single counterweight or a functional unit comprising multiple counterweight pieces, depending on context. Optionally, a chassis compartment may contain one or more counterweights 112. For example, the counterweight 112 may be a two-piece counterweight comprising multiple SAE J431 Gray Iron Casting grades. The counterweight 112 may be attached to the side of the chassis compartment distal from the mast, that is, it may be attached to the rear side or rear end of the chassis.

A chassis compartment can be located, for example, under the operator compartment floor 150 and/or behind the seat 140. The members of the chassis 130 may define a single chassis compartment or multiple chassis compartments depending on the design of the chassis 130. For example, if the primary structural members of the chassis are on the sides and bottom, then a single chassis compartment may be defined. Alternatively, if there are lateral and/or longitudinal reinforcements across the chassis, then there may be multiple chassis compartments.

A plate may be used to form a cover, such as a top cover, of a chassis compartment. The plate can be designed not to be readily removable by an operator, to form a chassis compartment that is not readily accessible to the operator when the plate is on the chassis, thereby forming an operator-inaccessible chassis compartment. The operator compartment floor 150 can be wholly or partially made from a plate. The location of an inaccessible compartment can be, for example, under the floor 150 of the operator compartment 105. An inaccessible compartment may be useful for containing truck components that do not often require maintenance, such as a service-free battery, which may be under a manufacturer's warranty or require specialized training to service. In an embodiment, an inaccessible chassis compartment contains an energy source including a service-free battery. The energy source can provide power to turn the wheels of the truck, to actuate the lift assembly, or to both turn the wheels and actuate the lift assembly.

The lift truck 100 incorporates an energy source that stores energy for the truck. The energy from the energy source may be converted to power by a power plant to turn one or more of a plurality of wheels to propel the truck forward and backward and to actuate the lift assembly. The energy source used for turning the wheels and propelling the truck may be the same as, or may be different from, the energy source used for the lift assembly. The term "energy source" may be used herein to convey one or more of a fuel, a fuel conversion device, a battery, and a battery bank. The power plant may include, but is not limited to, an electric motor, an internal combustion engine, a hydrogen fuel cell, or any combination of the foregoing. For example, the energy source used to propel and steer the truck may be a lithium-ion battery or a lead-acid battery or a bank of multiple such batteries, and the lift assembly and/or wheels may be actuated directly or indirectly by an electric motor powered by the one or more batteries. In another embodiment, the energy source is a hydrogen fuel cell that runs an electric motor and/or an electric pump. In certain embodiments, the energy source includes a lithium-ion battery or a hydrogen fuel cell. In some contexts, "fuel" may refer to electricity, fossil fuel, such as gasoline or diesel, or battery compositions, such as lead-acid or lithium-ion, or hydrogen, such as liquid or gaseous. In some contexts, "power plant" may refer to a fuel cell or a motor or an internal combustion engine or any device that converts energy into physical motion of the lift truck or its hydraulic system.

The energy source can be partially or wholly located within one or more chassis compartments, such as having a battery bank, electric motor, and a hydraulic system for the lift assembly in an operator-inaccessible chassis compartment and electronic components (for example, power electronics such as motor controllers, fuses, a vehicle controller such as a vehicle system module or "VSM", and contactors) in an operator-accessible compartment. All or some of the components of the energy source may be service-free, or at least one of the components may require service on a regular basis, such as annually or biannually. The energy source may be a low-service or service-free battery or battery bank, such as a lithium-ion battery or battery bank. A battery bank of multiple batteries may in some circumstances be considered to be one functional unit that may be referred to herein as simply a "battery." Thus, the term "battery" may mean a single battery or a functional unit comprising multiple batteries, depending on context.

The operator's seat 140 can be rotatable about a vertical axis 145 to provide an operator with views behind and in front of the truck by rotating the seat. For example, the operator seat 140 may have a range of rotation of greater than or equal to approximately ±22 degrees from a straight-forward-facing direction. The operator seat 140 may have a range of rotation of greater than or equal to approximately ±30 degrees from a straight-forward-facing direction. The operator seat 140 may have a range of rotation of greater than or equal to approximately ±60 degrees from a straight-forward-facing direction. The operator seat 140 may have a range of rotation of greater than or equal to approximately ±90 degrees from a straight-forward-facing direction. The operator seat 140 has a range of rotation of greater than or equal to approximately ±180 degrees from a straight-forward-facing direction. The operator seat 140 may have a range of rotation of greater than or equal to approximately ±270 degrees from a straight-forward-facing direction. The operator seat 140 may have a range of rotation of approximately ±360 degrees from a straight-forward-facing direction.

Depending on the layout of other components in the operator compartment 105 or cost considerations, the operator seat 140 may intentionally be limited to a range of rotation that is less than or equal to approximately ±270 degrees, ±180 degrees, ±90 degrees, ±60 degrees, or ±30 degrees. For example, the operator seat 140 may have a range of rotation of approximately ±15-25 degrees from a forward-facing direction, ±20-25 degrees from a forward-facing direction, or ±18-22 degrees from a forward-facing direction. In one embodiment, the operator seat 140 has a range of rotation of approximately ±22 degrees from a forward-facing direction. One will also appreciate that the range of rotation need not be the same in the clockwise and counterclockwise directions.

The operator's seat 140 can be configured to slide backward, sideways, forward, or a combination of such directions, while rotating. The operator's seat 140 can be adjusted vertically. In an embodiment, the operator's seat 140 has a bottom having front, left, right and rear edges. The operator's seat 140 can have one armrest, or it may have two armrests, or it may be free of armrests. In an embodiment, the operator's seat 140 includes at least one armrest.

The lift truck 100 includes a lift assembly that is used to lift a load. For example, the mast 110 can support a fork carriage (or carriage back rest) 160 having at least one fork 165 attached thereto. The fork carriage 160 can be raised to different heights by movement of the mast 110 and is part of the lift assembly. The lift assembly is configured to vertically lift a load on the forks using, for example, a hydraulic system. A lift assembly may also include paper roll clamps, carton clamps, multiple-forks assemblies, side-shifters, and other suitable attachments. In an embodiment, the lift assembly includes a reach assembly, such as a pantograph-type reach assembly. The lift assembly is attached to the chassis 130. The energy source of the lift truck 100 includes components used for the lift assembly, such as a hydraulic tank, a hydraulic pump that is fluidly connected to the hydraulic tank, a motor that is connected to the hydraulic pump, and at least one hydraulic valve. The hydraulic pump may be connected to the hydraulic tank via a hose, or it may be directly connected without a hose.

In an embodiment, the lift truck 100 includes a tilt mechanism, connected to the lift assembly, to tilt the top of the mast 110 back slightly, and therefore the ends of the forks 165 up slightly, to more stably carry a load.

The lift truck 100 can include a roof that employs an overhead guard 170 that extends over the operator compartment 105 to protect the operator from hazards, such as falling materials. The lift truck 100 can include a roof over the operator compartment 105 that forms a cover for the operator compartment 105. In an embodiment, the overhead guard 170 is solid and opaque, for example, to act as a sun shade to protect the operator from sunlight when the truck is used outside. Alternatively, the overhead guard 170 is transparent or semi-transparent in whole or in part and/or has one or more apertures to enable the operator to view the forks 165, top of the mast 110, and/or its load when the mast 110 is raised. In another embodiment, the overhead guard 170 comprises a sheet of plexiglass over substantially the entire roof area of the overhead guard 170 so as to maximize overhead visibility for the operator. In an embodiment, a tilt mechanism can be incorporated within, or attached to, the overhead guard.

In one embodiment, the overhead guard 170 may have an optional notch (not shown) on one side. The notch, when present, may facilitate having a crane, lift, or the like access heavy items within either the operator compartment 105 or a chassis compartment underneath the operator compartment 105. For example, lead-acid batteries may be hoisted into or out of the chassis compartment using a crane, lift, or the like as part of a battery-replacement operation.

FIG. 2 illustrates a rear isometric view of the lift truck 100 shown in FIG. 1, having a steering wheel 135 in the operator compartment 105. Lift truck 100 has two front wheels 192 and two rear wheels 191. The steering wheel 135 is configured to turn the rear wheels 191 when the lift truck moves forward or backward. The steering wheel 135 is mounted on a steering column 137. In an embodiment, the steering wheel 135 may be mounted on a steering column 137 that is attached to and extends from the floor 150 of the operator compartment 105. In an embodiment, there is no steering wheel or steering column present in the operator compartment 105. For example, the steering controls can be integrated into the operator's seat 140 of the lift truck 100.

In reference to FIG. 2, truck 100 has a panel 111 that is located behind the operator's seat 140. The panel 111 can be a cover to a rear compartment that lies above counterweight 112, and that may contain, for example, power electronics or other truck parts. The panel 111 is preferably sloped downwardly behind the operator's seat, toward the rear of the truck 100. The downward slope of the panel 111 enhances operator visibility when the truck 100 travels in a reverse or backward direction. The panel 111 may be a cover for an operator-accessible compartment. In an embodiment, the panel 111 does not act as a cover for a compartment.

Foot controls such as foot pedals 155, can be present on the floor 150 of the operator compartment 105. Foot controls can include an accelerator, a brake, and an inching pedal. Alternatively, the operator compartment floor 150 may be free of foot controls. In an embodiment, there are no foot controls in the operator compartment 105.

Figure 3:
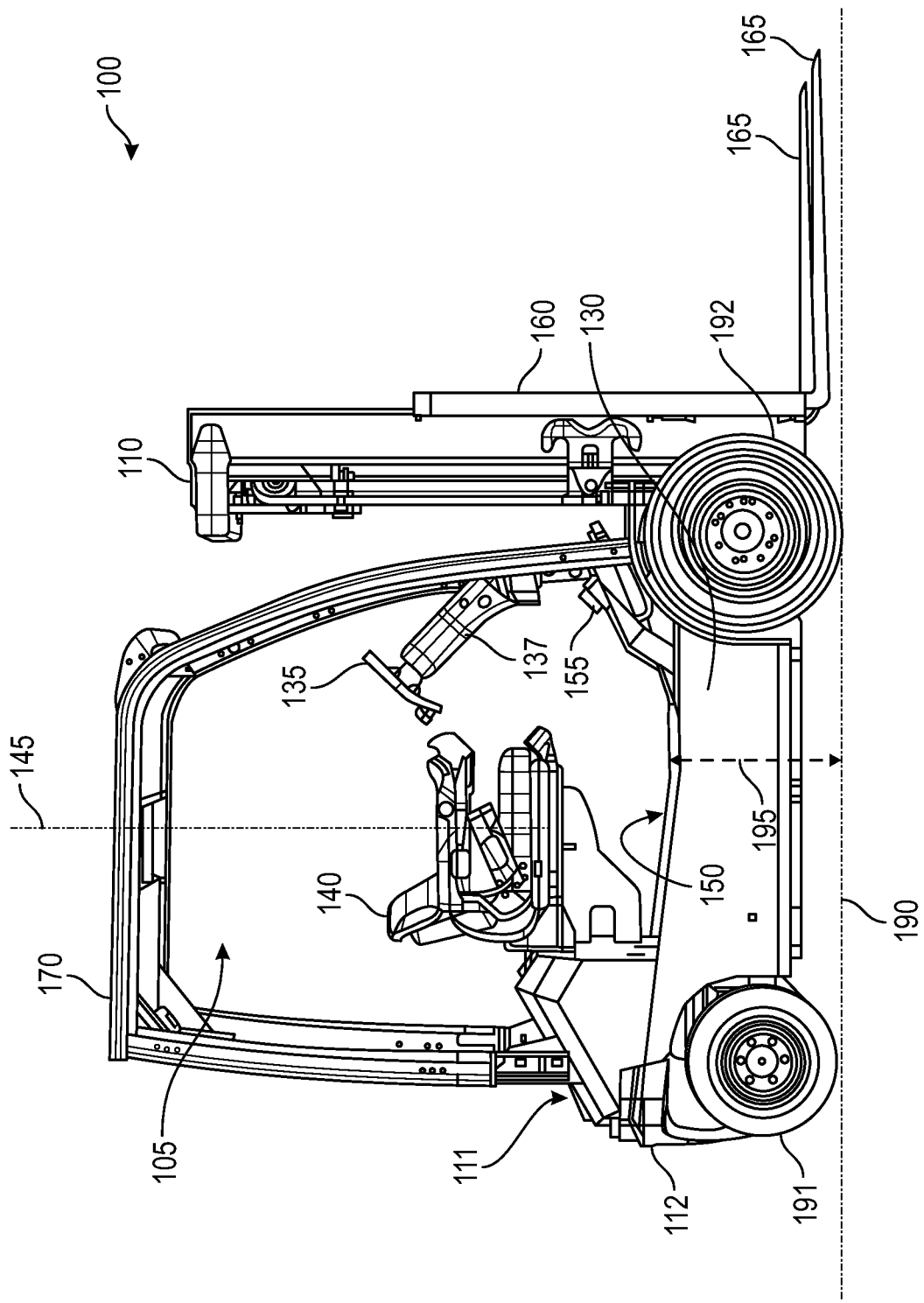
FIG. 3 is a right side view of the lift truck of FIG. 1.
Figure 4:
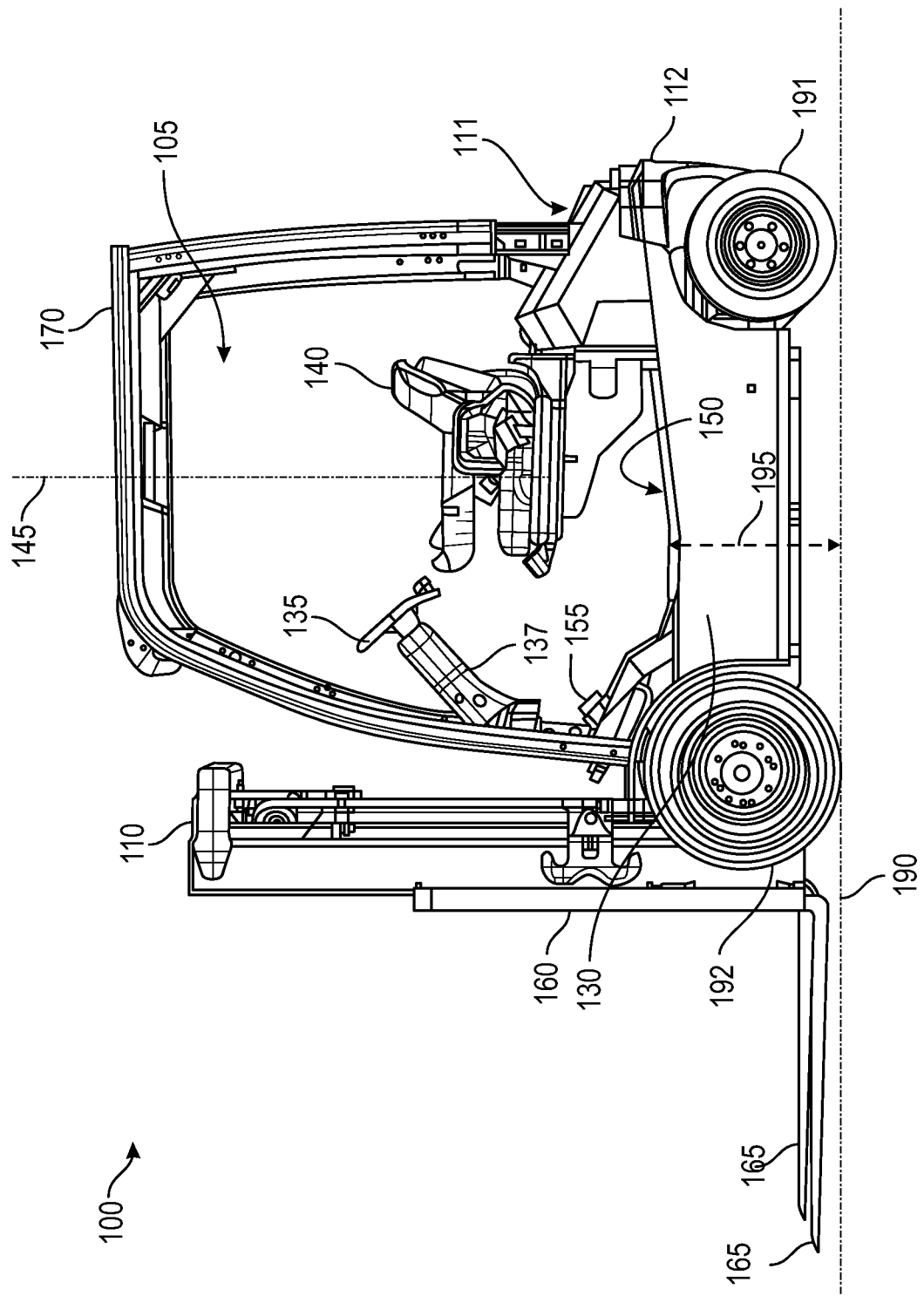
FIG. 4 is a left side view of the lift truck of FIG. 1.

FIGS. 3 and 4 illustrate side views of the embodiment of the forklift truck 100 shown in FIGS. 1 and 2. In reference to FIGS. 3 and 4, the operator compartment floor 150 is located above the ground 190 at a floor height 195. The ground 190 is considered to be the surface upon which the lift truck lies and may be a ramp or other raised supporting surface as well as a warehouse floor, a road, or the like. The access to and alternative egress from the operator compartment 105 as well as the operator compartment floor height 195 meet the standards of SAE J185: Recommended Practice for Access Systems for Off-Road Machines.

The operator compartment floor 150 may be approximately 10%-30% lower than the floor of commonly available lift trucks with similar lifting capacity. In some embodiments, the floor height 195 may be the height of a portion of the operator compartment floor 150, the height of the majority of the area of the operator compartment floor 150, or an average height of the operator compartment floor 150. In some embodiments, the floor height 195 may additionally or alternatively be the lowest point on the operator compartment floor 150.

The floor height 195 may additionally or alternatively be defined with respect to other features of the lift trucks 100, 300, 500, 600, 700, 800, and 900 (generically lift truck 100) in the various drawings. For example, with reference to FIG. 10C (used for convenience of adding height lines), the lift trucks 100 (300) have drive wheels such as front wheels 192 that have a drive wheel height 198 and a drive wheel radius 194 that determines a drive wheel radius height 196. The drive wheel radius height 196 and the floor height 195 also determine a floor-radius differential height 197. Similarly, the lift trucks 100 (300) have steer wheels such as rear wheels 191 that have a steer wheel height 203 and a steer wheel radius 199 that determines a steer wheel radius height 201. Other truck features useful as landmarks may include a bottom 207, which may be the bottom of the chassis 130 or the bottom of a component attached to the bottom of the chassis 130. The bottom 207 may define a ground clearance height 205.

In some embodiments, the top surface of the operator compartment floor 150 may be 20 inches (or about 51 cm), or closer, from the ground or surface that supports the forklift truck 100. Generally, the height 195 of the operator compartment floor 150 from the ground 190 is between approximately 10 and 30 inches (or about 25-76 cm), such as between approximately 15 and 25 inches (or about 38-64 cm), between approximately 17 and 21 inches (or about 43-54 cm), between approximately 18 and 20 inches (or about 45-51 cm), or approximately 19 inches (or about 48 cm).

In some embodiments, the operator compartment floor 150 has a floor height 195 that is less than or equal to the drive wheel height 198. The operator compartment floor 150 may have a floor height 195 that is less than or equal to 95% of the drive wheel height 198, less than or equal to 90% the drive wheel height 198, less than or equal to 85% the drive wheel height 198, less than or equal to 80% the drive wheel height 198, less than or equal to 75% the drive wheel height 198. In some embodiments, the operator compartment floor 150 has a floor height 195 that is between the drive wheel height 198 and the drive wheel radius height 196. In some embodiments, the operator compartment floor 150 has a floor height 195 that is between the drive wheel height 198 and the steer wheel radius height 201.

The term "low floor," as used herein, refers to an operator compartment floor having a height from the ground that can be comfortably reached by a typical (e.g., "95%," meaning all but the 5% outliers of the population in terms of size and shape) male or female truck operator using only a single vertical stepping motion. That is, there may be no steps intermediate the operator compartment floor 150 and the ground 190. Although use of a grab bar may not be necessary by an operator to comfortably enter or exit the operator compartment 105, a grab bar (not shown) may nonetheless be located on the truck 100, such as attached to a front strut 188 of the chassis 130, to reinforce operator training for entering and exiting the truck 100. In an embodiment, the height 195 from the ground 190 does not require 95% of male or female operators to raise (or extend) their leg more than approximately 90 degrees at their hip from standing, while their knee is bent (or flexed) at no more than approximately 90 degrees.

An operator can enter the lift truck 100 having a low floor 150 with a single step, then pivot to sit in the operator's seat 140. An operator sitting in the seat 140, which is preferably rotatable, can rotate the seat about vertical axis 145 to view in front of, to either side of, and behind the lift truck 100, with minimal twisting or neck or back strain. Embodiments of the operator's seat 140 can be designed to slide forward, sideways, backward, or a combination of such directions, independent from, or concurrent with, rotation. Thus, for example, the operator's seat may slide backwards and sideways upon rotation to enable the operator's legs and feet to be laterally raised above the floor 150 yet maintained within the operator compartment 105 while rotating.

The operator's seat 140 may include a mechanism that adjusts the seat vertically, in addition to or instead of the rotation and/or sliding mechanisms. For example, embodiments of the operator's seat 140 can be designed to go up and down from an initial height between approximately 0.5 and 10 inches (or about 1-26 cm), such as between approximately 1 and 6 inches (or about 2-16 cm), between approximately 2 and 5 inches (or about 5-13 cm), at least approximately 2 inches (5 cm), no more than approximately 5 inches (13 cm), or approximately 4 inches (10 cm).

In contrast to commonly available lift truck floors, the low floor 150 provides adequate leg room for the operator's legs to comfortably rotate about vertical axis 145 while maintaining their height above the floor, when the operator is sitting in the operator's seat 140. For lift trucks having a seat 140 that can slide backward, or backward and sideways, while rotating more than a pre-determined angular displacement, for example, more than 10 degrees, the operator's legs can be maintained within the operator compartment 105 as the seat 140 rotates. In an embodiment, there is an amount of unobstructed leg room on the floor 150 of the operator compartment 105 to permit an operator of the lift truck 100 to swing their legs laterally while keeping their feet above the floor 150.

The chassis compartment may have a chassis compartment area between the one or more drive wheels and the counterweight 112 (or between the drive axle 324 and the counterweight 112) and between the left side and right side of the chassis 130. In some embodiments, the operator compartment floor 150 has a floor area that is greater than or equal to 95% of the chassis compartment top area, greater than or equal to 90% of the chassis compartment top area, greater than or equal to 85% of the chassis compartment top area, greater than or equal to 80% of the chassis compartment top area, greater than or equal to 75% of the chassis compartment top area, or greater than or equal to 60% of the chassis top compartment area. As used herein, the chassis compartment top area is the area of the chassis compartment on its top side.

In some embodiments, the operator compartment 105 has an operator compartment area between the drive axle 324 and the counterweight 112 and between the left side and right side of the chassis 130, and the operator compartment floor 150 has a floor area that is greater than or equal to 95%, 90%, 85%, 80%, 75%, or 60% of the operator compartment area.

In some embodiments, the lift truck includes an overhead guard 170 that has an overhead-guard area between front struts 188 and rear struts that may support the overhead guard 170, and the operator compartment floor may have a floor area that is greater than or equal to the overhead-guard area, or 95%, 90%, 85%, 80%, 75%, or 60% of the overhead-guard area.

Figure 32:
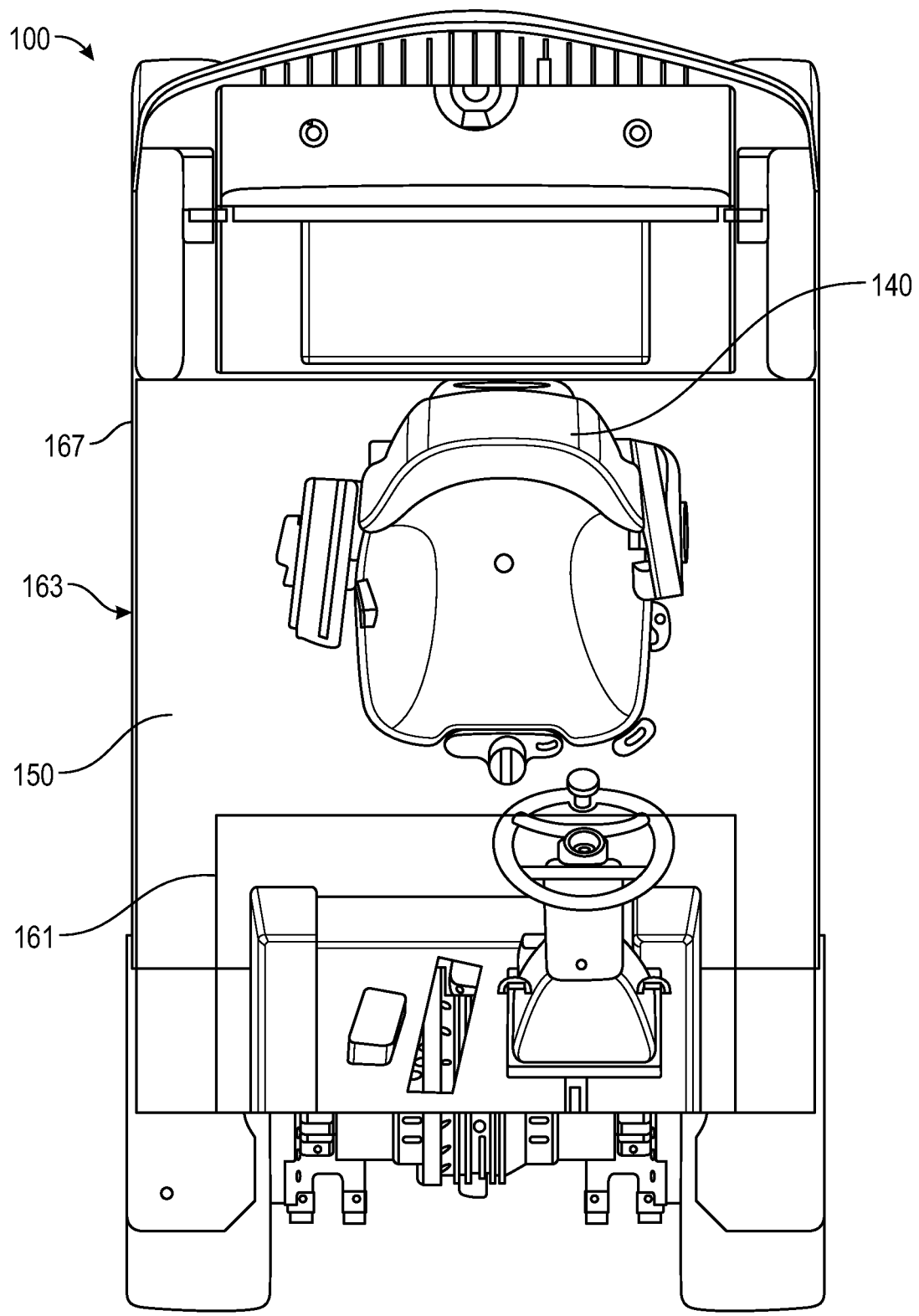
FIG. 32 is a top view of a lift truck, comparing floor area of an old lift truck to floor area according to one embodiment of a lift truck disclosed herein.

FIG. 32 is a top view of a lift truck similar to the lift truck 100 in FIG. 3, comparing conventional floor surface area 161 (where conventional foot controls are located) of a conventional lift truck to a total floor surface area 163 of the operator compartment floor 150, wherein the total floor surface area 163 equals the conventional floor surface area 161 plus gained floor surface area 167 (including area under and to the sides of the operator seat 140), according to one embodiment of a lift truck 100 disclosed herein. The gained floor surface area 167 may be as large as three times larger than the conventional floor surface area 161. In some embodiments, the total floor surface area 163 may be as large as four times larger than the conventional floor surface area 161. In some embodiments, the total floor surface area 163 may be greater than or equal to three times larger than the conventional floor surface area 161.

The lift truck 100 includes a plurality of wheels, such as two rear wheels 191 and two front wheels 192. The wheels 191 and 192 are directly or indirectly attached to the chassis 130 of the truck 100 and are configured to roll to steerably move the truck 100 forward and backward. For example, rear wheels 191 may be attached to a steer axle 189 that is attached to a counterweight 112, which is attached to chassis 130, and front wheels 192 may be attached to a drive axle 324 (FIG. 10B) that is attached to chassis 130. All or a subset of the plurality of wheels may be steerable by an operator.

The lift truck 100 generally has two pairs of wheels, as indicated in FIGS. 1-4. Two of the wheels 191 and 192 of the lift truck 100 can independently be replaced with a single wheel to form a lift truck having three wheels. For example, the two rear wheels 191 shown in FIG. 2 may be replaced with a single rear wheel. Additional front or rear wheels can independently be added to the lift truck 100 to form a truck having more than four wheels. In an embodiment, the lift truck 100 has a plurality of wheels that comprises at least one left wheel and at least one right wheel. In an embodiment, the lift truck 100 has a plurality of wheels that comprises two front wheels and one rear wheel. All or a subset of the wheels may be solid, or all or a subset of the wheels may be pneumatic, or they may include a mixture of solid and pneumatic wheels.

Figure 5:
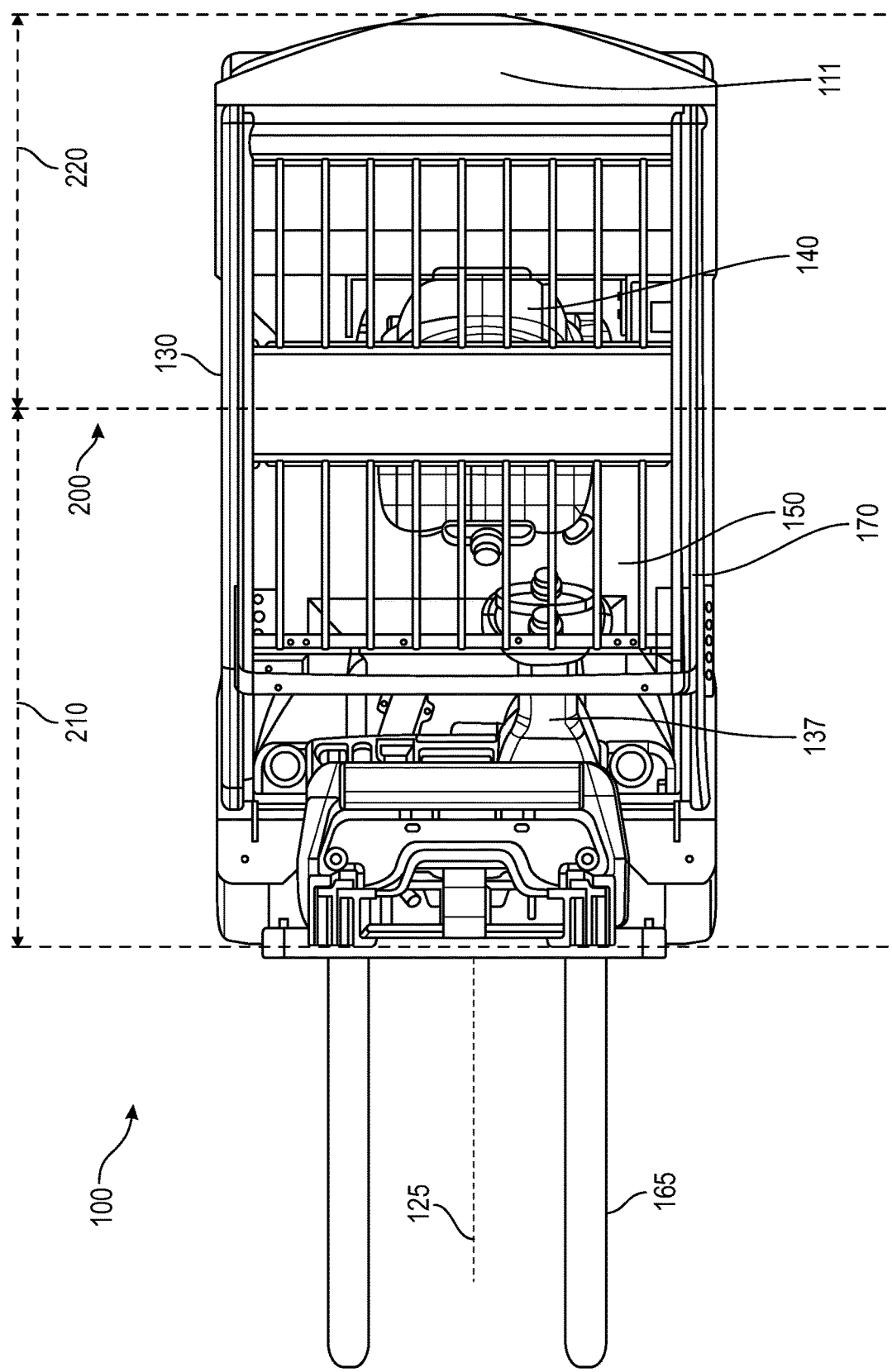
FIG. 5 is a top view of the lift truck of FIG. 1.
Figure 6:
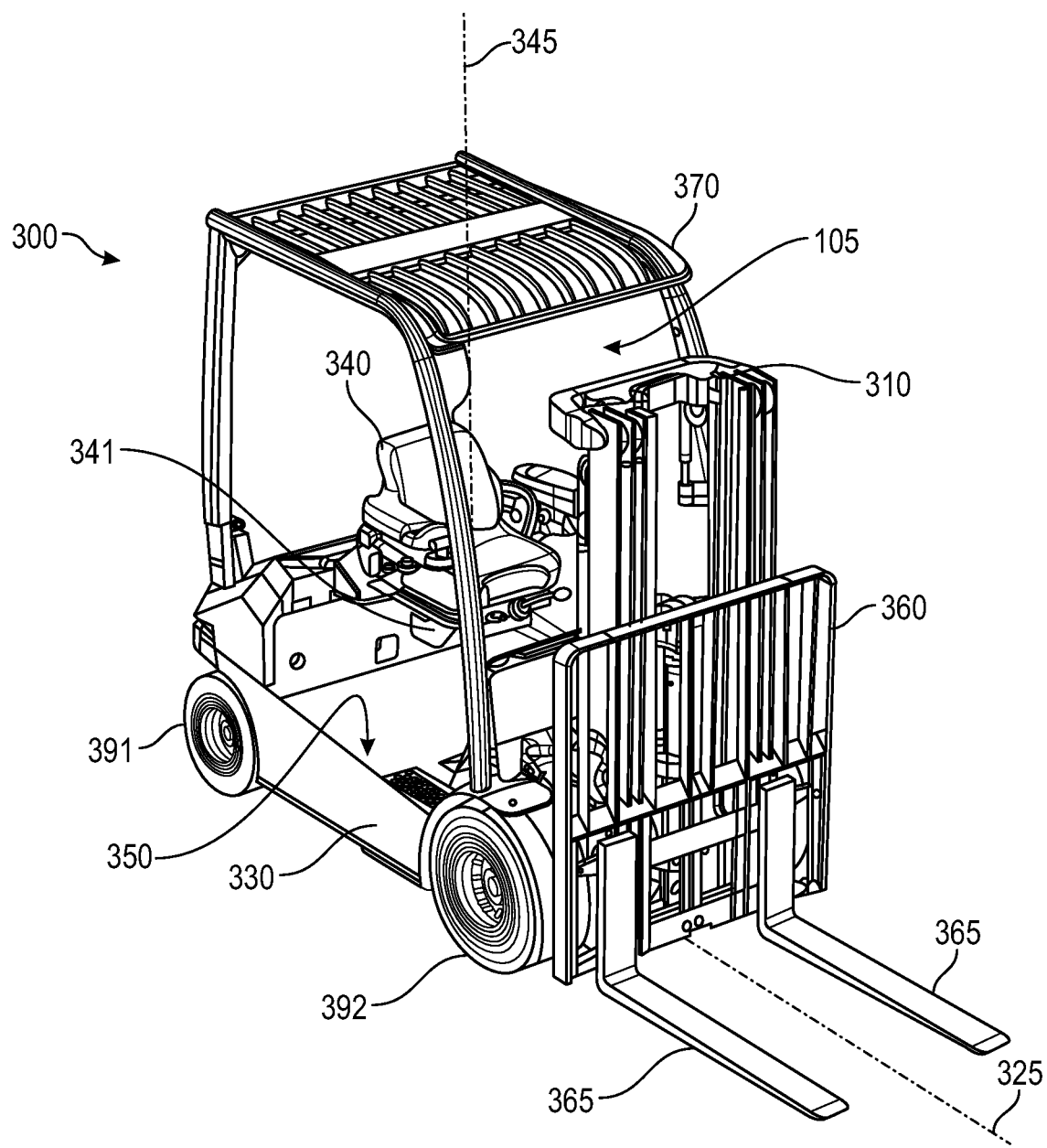
FIG. 6 is an isometric drawing of a lift truck having seatside steering from a front right perspective, according to one embodiment.

FIG. 5 is a top view of the lift truck 100 shown in FIGS. 1-4. The lift truck chassis 130 (not shown in FIG. 5) includes a section in front of, or anterior to, the operator's seat 140 and a section that is behind, or posterior to, the seat 140. A plane 200 can include the vertical axis 145 (not shown in FIG. 5) of the seat 140, extending from the vertical axis 145 and be orthogonal to the right and left sides of the truck 100. The plane 200 is orthogonal to the longitudinal axis 125 and essentially divides the truck chassis 130 into two portions. The area of the truck 100 that generally lies in front of the plane 200 and behind the forks 165 is referred to herein as the anterior portion 210, as indicated in FIG. 5. Similarly, the area of the truck 100 that is generally behind the plane 200 is referred to herein as the posterior portion 220.

The anterior portion 210 of the truck 100 generally includes components of the lift assembly, as well as means for steering and the front wheels. The posterior portion 220 can include at least one counterweight 112 and the rear wheel or wheels 191. The operator compartment 105, operator compartment floor 150, overhead guard, and components of the energy source are generally located in both the anterior portion 210 and the posterior portion 220, such as within chassis compartments that straddle or overlap both portions 210 and 220.

FIGS. 6, 7A, 7B, 8 and 9 illustrate an embodiment of a lift truck 300 having a low floor 350, a chassis 330, a counterweight 312, a rear compartment 313, and neither a steering column nor a steering wheel. Means for steering truck 300 are hand-operated controls that are integrated into an operator seat 340, and such means are referred to herein as "seatside steering." The seat 340 can incorporate steering controls, such as by integration of hand-operated operator controls into the seat 340. Such integrated steering controls may be located on an armrest, or on both armrests, of the seat. The seat 340 can preferably rotate about a vertical axis 345.

Figure 11:
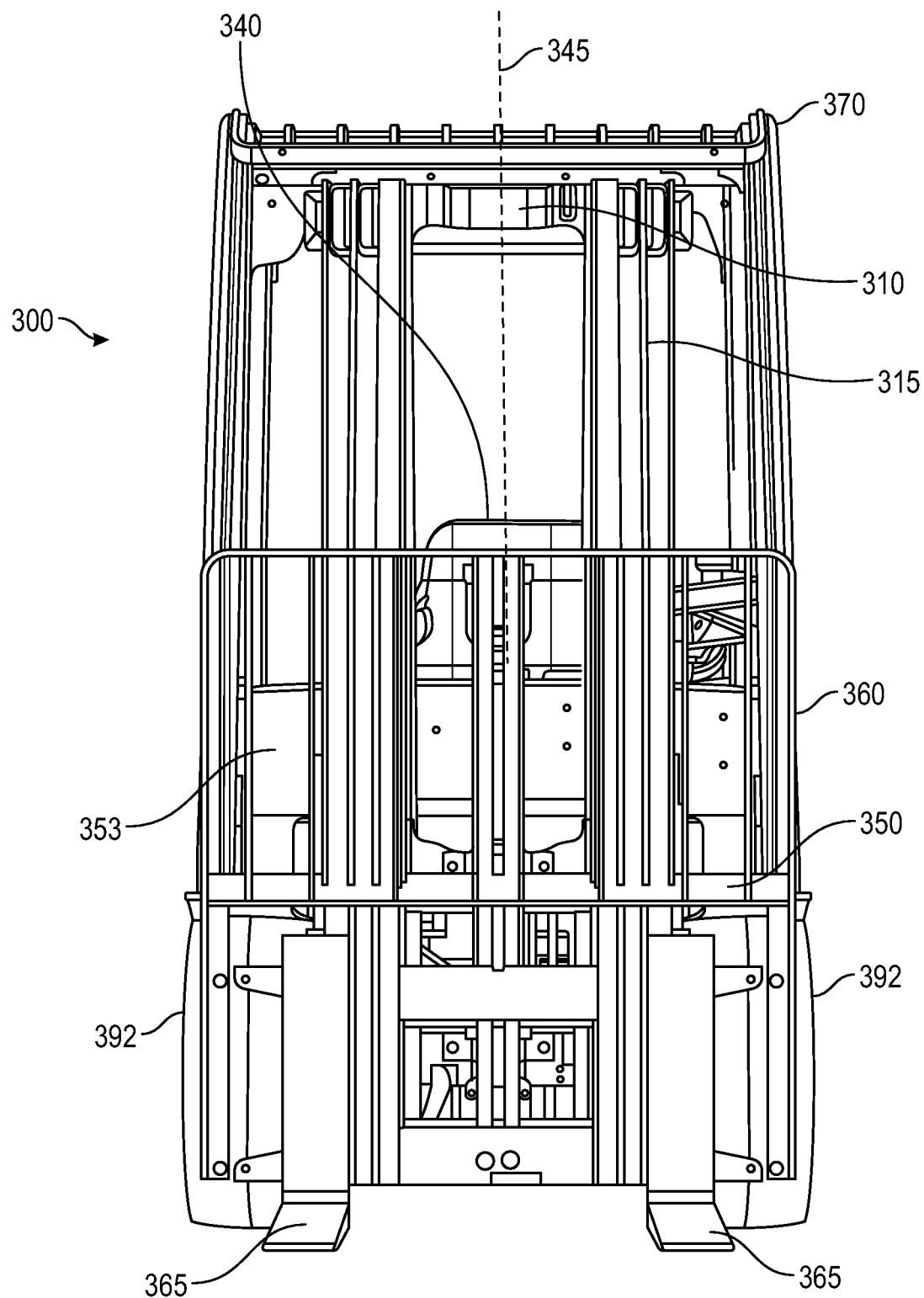
FIG. 11 is a front view of the lift truck of FIG. 6.

Seat 340 is shown attached to the truck 300 by a seat bracket 341 that extends from the truck chassis 330 in the posterior portion of the chassis 220 (FIG. 5). The seat 340 can alternatively be attached to the truck 300 by a bracket that extends from the floor 350, such as a column that is parallel to, or coincident with, the vertical axis of rotation 345. Truck 300 also includes an overhead guard 370, two rear wheels 391 and two front wheels 392, an operator compartment 305, a lift assembly 360 having forks 365, mast 310, and a lift cylinder 315 (FIG. 11). Unless specifically indicated otherwise, embodiments of the truck 300 can include some or all of the various components and variations thereof, as described for truck 100 above, such as an optional notch in the overhead guard 370.

Figure 7A:
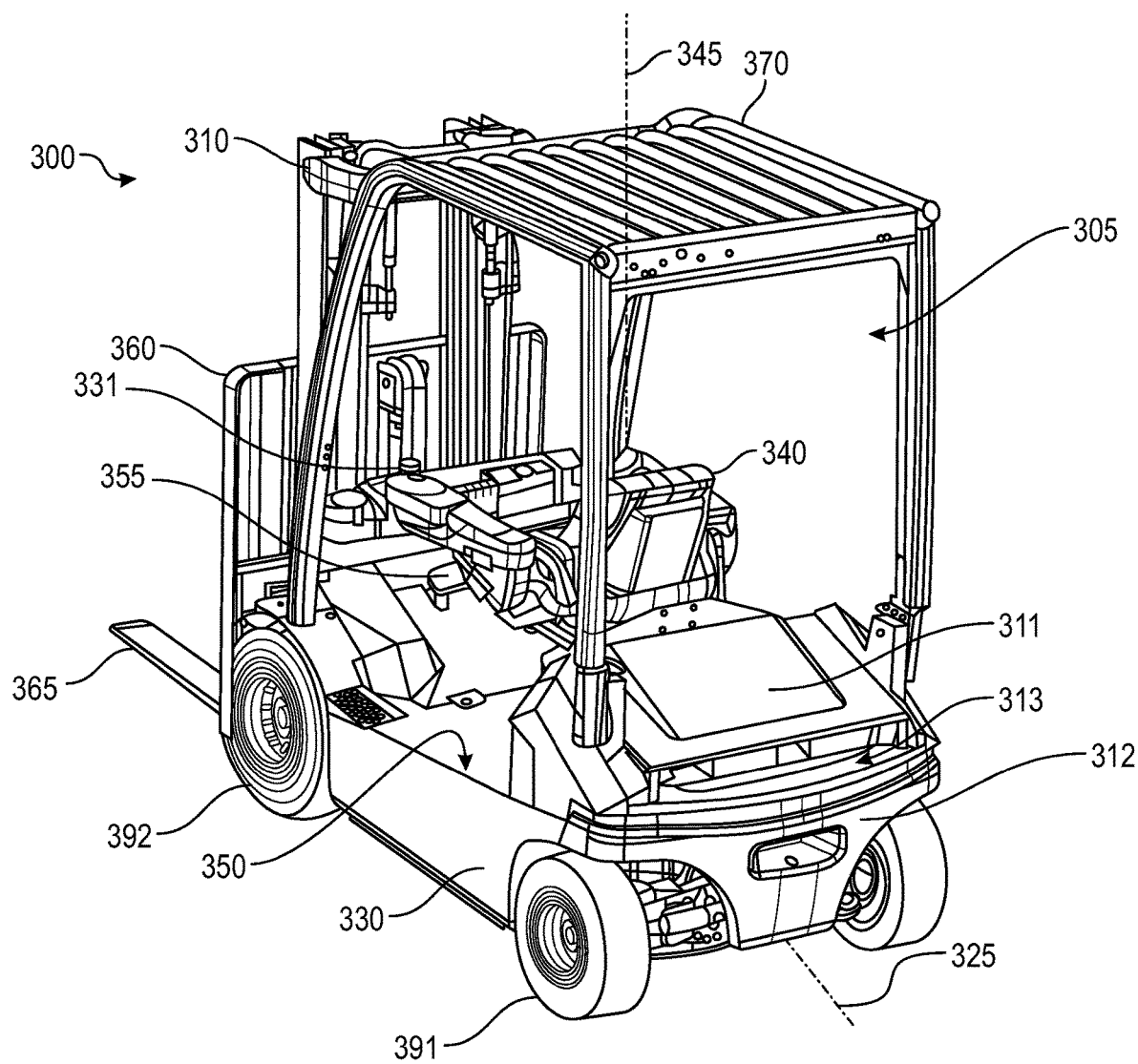
FIGS. 7A and 7B are isometric drawings of the lift truck of FIG. 6 from a rear left perspective, illustrating an exemplary rear compartment in closed (FIG. 7A) and open (FIG. 7B) configurations.
Figure 7B:
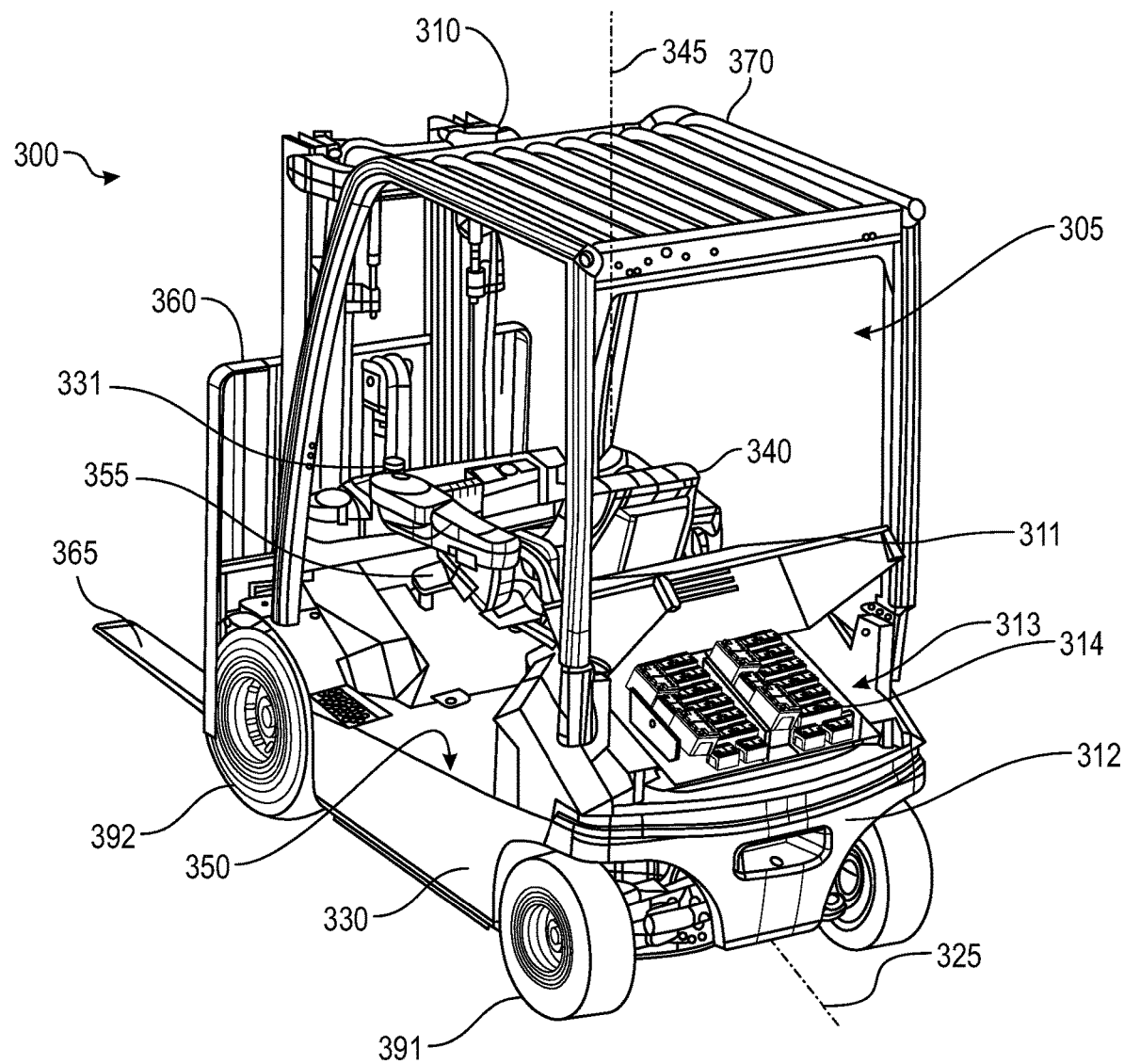
Figure 8:
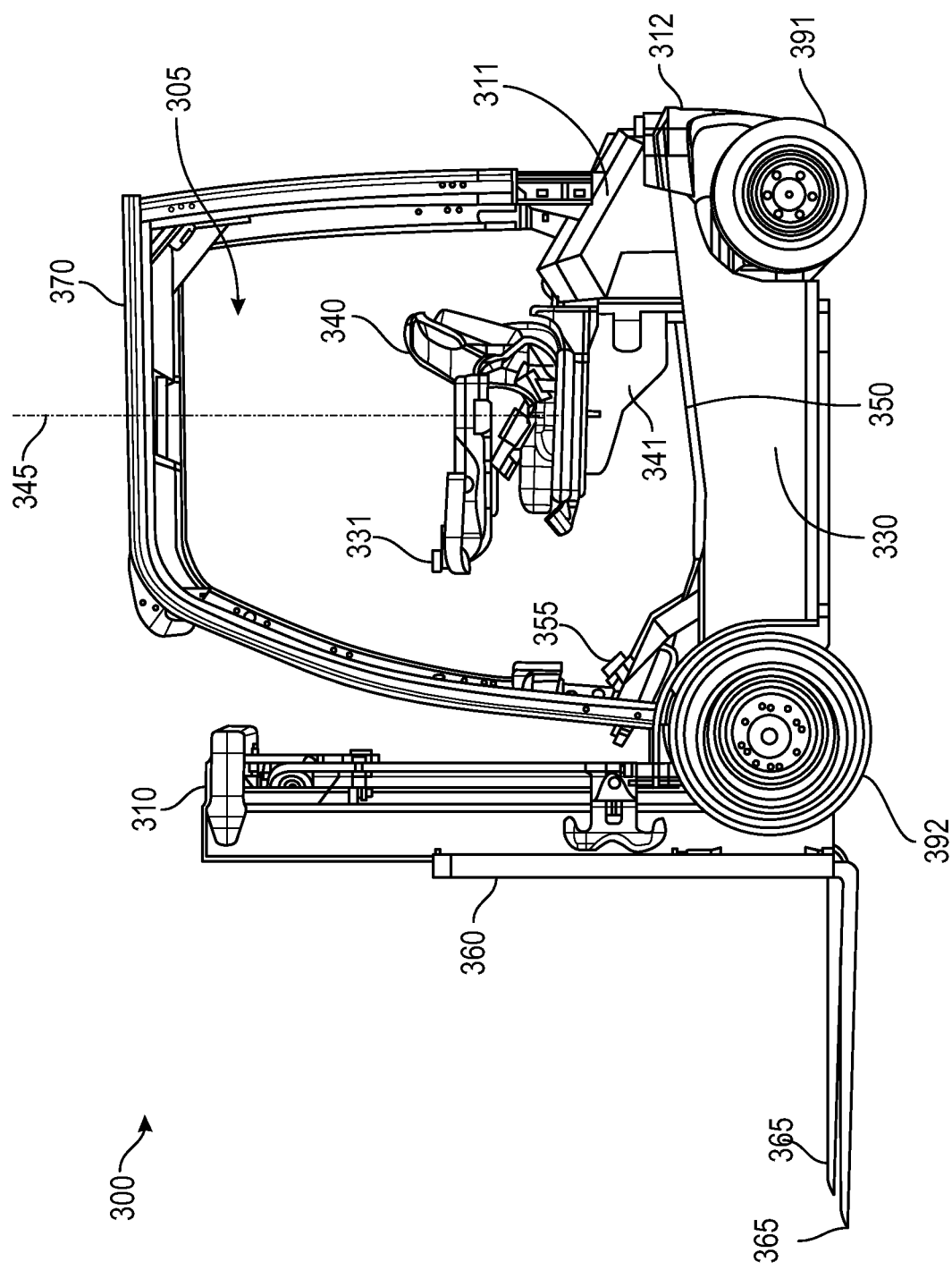
FIG. 8 is a left side view of the lift truck of FIG. 6.
Figure 9:
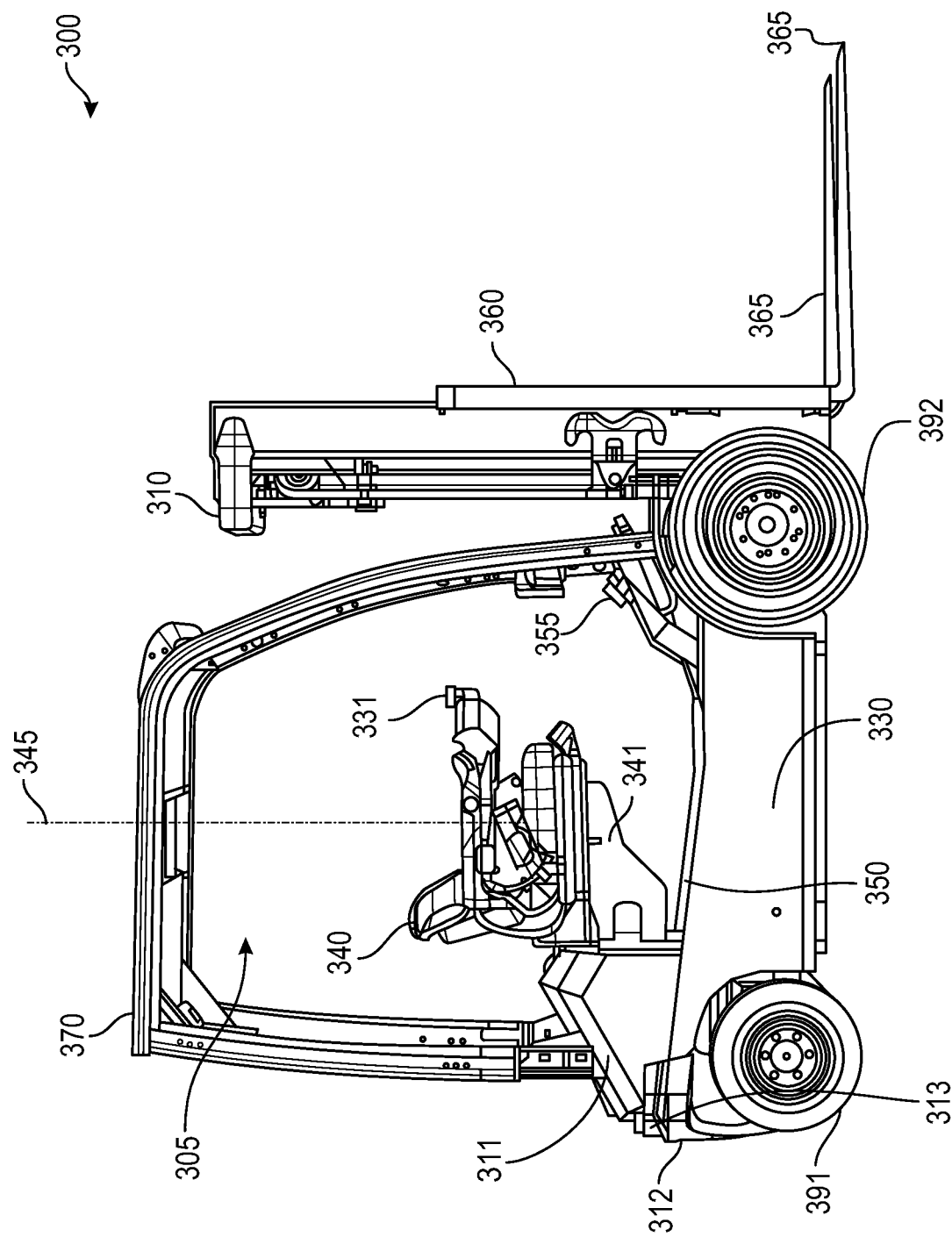
FIG. 9 is a right side view of the lift truck of FIG. 6.

As shown in detail in FIGS. 7A and 7B, the truck 300 has a steering knob 331 incorporated into an armrest of the operator's seat 340 and foot pedals 355 extending from, and close to, the operator compartment floor 350. In an embodiment, the operator can control the speed of the truck using foot controls and steer the truck using seatside steering. Exemplary controls used as means for seatside steering can include a steering knob that steers the truck, and finger controls that actuate the lift assembly. Controls used for actuating the lift assembly may be integrated wholly or in part into the operator's seat, such as into an armrest, or may include foot controls in addition to, or instead of, hand-operated controls.

The truck chassis 330 can have sides and a bottom that are configured to define a chassis compartment within the sides and above the bottom. The truck 300 includes an operator compartment 305 having a low operator compartment floor 350. Low floor 350 can be formed from a plate that is secured to the truck chassis 330, such as by welding or via screws, bolts, or the like. The low floor 350 can be wholly or partially formed from a plate. The operator compartment 305, in an embodiment, can be bounded on its bottom by a plate on, and secured to the chassis 330, with the plate forming the floor 350. Such a plate can form the top cover of a chassis compartment that is located underneath seat 340, upon which an operator's feet can rest when the operator is seated. The plate can provide structural strength to the chassis 330, such as to resist deflection of the chassis, in addition to forming a cover for a chassis compartment.

The operator compartment floor 350 may be substantially flat in one or more directions, such as side-to-side, with reference to an operator seated in the seat 340 having the vertical axis 345 and looking straight toward the front of the truck along a longitudinal axis 325. As used herein, the term "substantially" is used herein as a broadening term to refer to an amount at least about 75%, such as about 80%, about 85%, about 90%, about 95%, about 99%, or 100% of an object or characteristic. A floor 350 that is substantially flat side-to-side is therefore at least about 75% flat, and may be perfectly flat, in the left and right side directions as the operator looks forward from the seat 340. In some embodiments, the operator compartment floor 350 has a floor area that is substantially flat for greater than or equal to 50% of the chassis compartment area, that is substantially flat for greater than or equal to 60% of the chassis compartment area, or that is substantially flat for greater than or equal to 70% of the chassis compartment area.

In an embodiment, the plate may be substantially flat side-to-side, but the floor 350 may have portions that are sloped in one or more directions front-to-back. For example, a portion of the floor 350 that is immediately underneath the operator's seat 340 may be substantially flat, but a portion of the floor that is anterior to the seat 340 and behind a fork carriage 360 may slope upward toward the fork carriage 360 and may accommodate foot controls such as foot pedals 355. In an embodiment, the floor 350 extends substantially flat front-to-back from a front cowl that is proximate to the lift truck, to a rear floor edge that is behind the front edge of the seat 340.

Embodiments of a lift truck can include a compartment that is readily accessible to allow for easy access to a specific component. Optionally, such a readily accessible compartment may be included as part of the chassis or may be included as part of the counterweight. Referring to FIGS. 7A and 7B, a compartment 313 can be located in the posterior portion of the truck 300, above the counterweight 312 and behind the seat 340. The compartment 313 can include a cover that is formed by panel 311 that can be readily opened by an operator (see FIG. 7B), and therefore can be an operator-accessible compartment. For example, the cover formed by panel 311 may be secured in place via friction in cover hinges, may have a snap-fit securement, or other suitable closure that can be opened by an operator without the use of tools.

In an embodiment, the truck 300 can have an operator-accessible compartment 313 that contains at least one operator-serviceable component 314. The operator-serviceable components may include power electronics, such as one or more motor controllers, fuses, VSM, contactors or other suitable operator-serviceable components. An operator-accessible compartment 313 can be integrated into and/or above the counterweight 312 of the truck 300, such as via a plate attached to the top of the counterweight 312 that forms a cover using the panel 311 for the chassis compartment 313. Operator-serviceable components may however be located in other places in the truck, such as underneath the seat 340, for example.

Because the compartment 313 can be located behind the seat 340, the top cover made by the panel 311 of the compartment 313 can potentially hinder the operator's view behind the truck 300. It can be useful, therefore, to design the compartment 313 and the panel 311 such that they do not adversely impact operator visibility. In an embodiment, the panel 311 that covers compartment 313 slopes downward toward the rear of the lift truck 300, as indicated in FIGS. 7A and 7B. This downward slope creates a clear sight line over the panel 311 for the operator when sitting in the operator seat 340 and permits the operator to see low objects immediately behind the lift truck 300.

Figure 31:
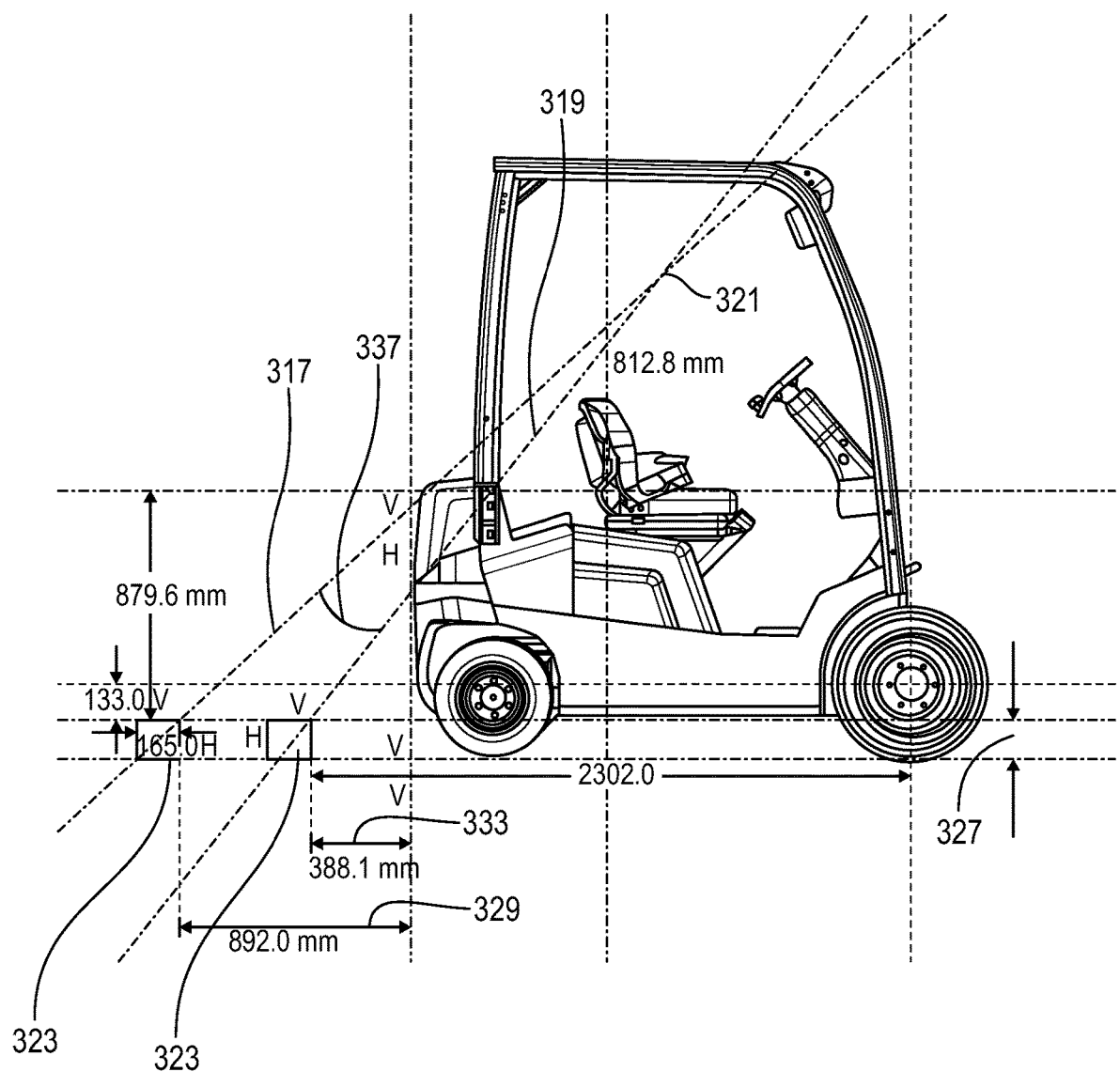
FIG. 31 is a right side view of a lift truck, comparing a sight line of an old lift truck to a sight line achievable according to one embodiment of a lift truck disclosed herein.

This sight-line advantage is demonstrated in FIG. 31, which compares a conventional sight line 317 of an old lift truck to a sight line 319 achievable according to one embodiment of the lift trucks 100, 300, 500, 600, 700 and 800 disclosed herein. With reference to FIG. 31, an operator of average male height seated in the operator seat 340 may have an eye position or eye height 321 that is about 812.8 mm above the cushion of the operator seat 340. In a conventional lift truck, this operator with a sight line 317 will not be able to see an object such as a cubic block 323 having a block height 327 of 165 mm (such as the height of a short pallet) within a rear distance 329 of 892 mm from the lift truck. However, in embodiments of a lift truck 100, 300, 500, 600, 700 and 800 disclosed herein, the operator with the improved sight line 319 will be able to see the block 323 within 892 mm behind the lift truck. Moreover, the operator with the improved sight line 319 will be able to see the block 323 within a rear distance 333 within 388 mm behind the lift truck. This sight line advantage provides an operator with a field of view that has a 10 degree or better angle 337 advantage over that permitted in conventional lift trucks. This sight-line advantage also translates in terms of an operator being able to see objects 0.6 meters closer to the rearmost point of the vehicle and effectively reduces the rear blind spot length by about 50%.

Thus, in some embodiments, the lift truck 300 provides an unobstructed direct sight line 319 from an operator of average male height seated in the operator seat 340 to a front top of an object less than or equal to 165 cm high within 850 mm behind the lift truck 300. The lift truck 300 may provide an unobstructed direct sight line 319 from an operator of average male height seated in the operator seat 340 to a front top of an object less than or equal to 165 mm high within 800 mm behind the lift truck 300. The lift truck 300 may provide an unobstructed direct sight line 319 from an operator of average male height seated in the operator seat 340 to a front top of an object less than or equal to 165 mm high within 700 mm behind the lift truck 300. The lift truck 300 may provide an unobstructed direct sight line 319 from an operator of average male height seated in the operator seat 340 to a front top of an object less than or equal to 165 mm high within 600 mm behind the lift truck 300. The lift truck 300 may provide an unobstructed direct sight line 319 from an operator of average male height seated in the operator seat 340 to a front top of an object less than or equal to 165 mm high within 500 mm behind the lift truck 300. The lift truck 300 may provide an unobstructed direct sight line 319 from an operator of average male height seated in the operator seat 340 to a front top of an object less than or equal to 165 mm high within 400 mm behind the lift truck 300. The lift truck 300 may provide an unobstructed direct sight line 319 from an operator of average male height seated in the operator seat 340 to a front top of an object less than or equal to 165 mm high within 388 mm behind the lift truck 300.

FIGS. 10A, 10B, 10C and 10D illustrate embodiments of a lift truck 300 having hand-operated controls that are integrated into an operator seat 340 and that is free from pedals or foot controls, and also free from a steering wheel and steering column. For clarity, the lift carriage and mast components are removed from these figures. In the embodiments shown, the seat 340 integrates hand-operated operator controls into the armrests of the seat 340. These hand-operator controls include a steering knob 331 integrated into one armrest and a set of finger controls 332 integrated into the second armrest. In an embodiment, the hand-operator controls include only one of knob 331 and finger controls 332. The finger controls 332 can, for example, actuate the lift carriage and control the speed of the truck 300. The steering knob 331 can steer the truck.

Figure 10A:
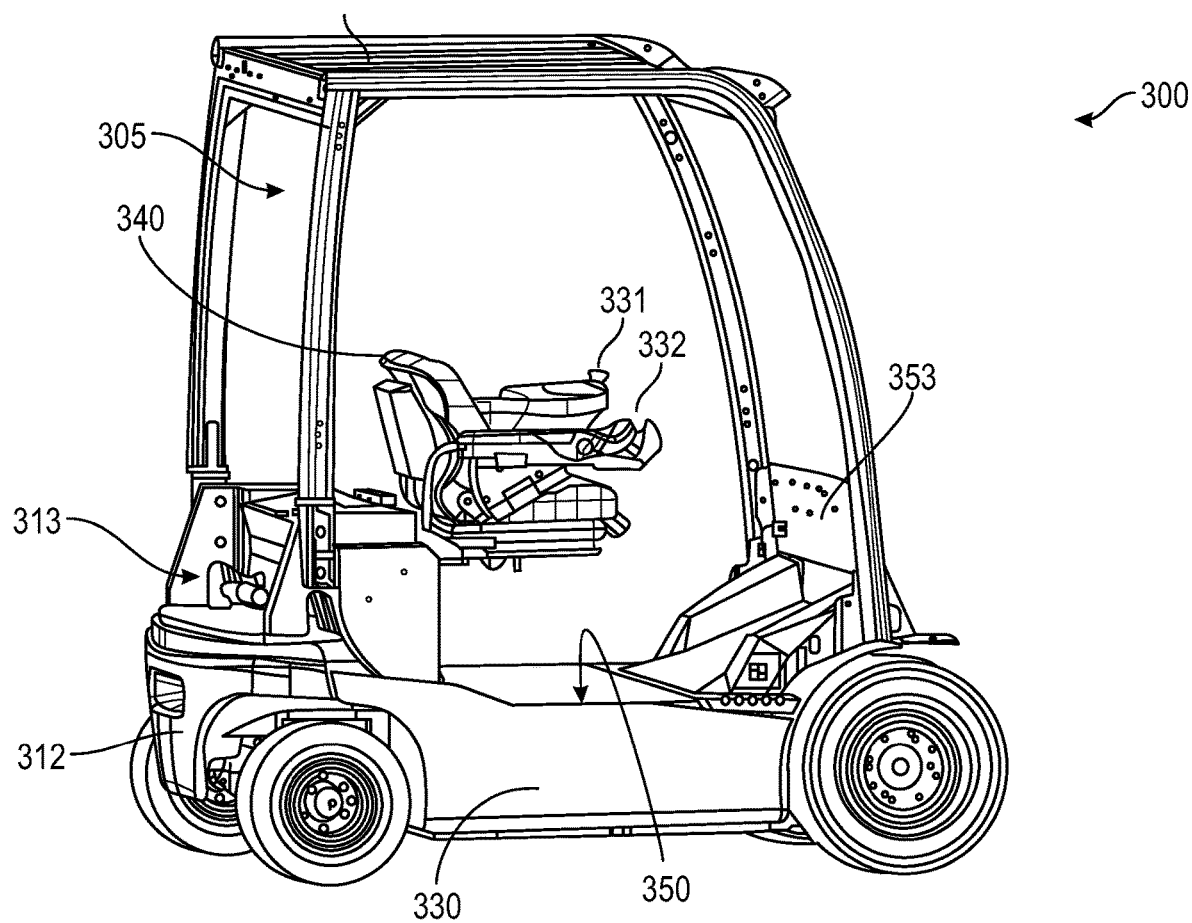
FIGS. 10A, 10B, 10C and 10D illustrate embodiments of seatside steering controls that can be used for lift trucks, including the truck of FIG. 6.
Figure 10B:
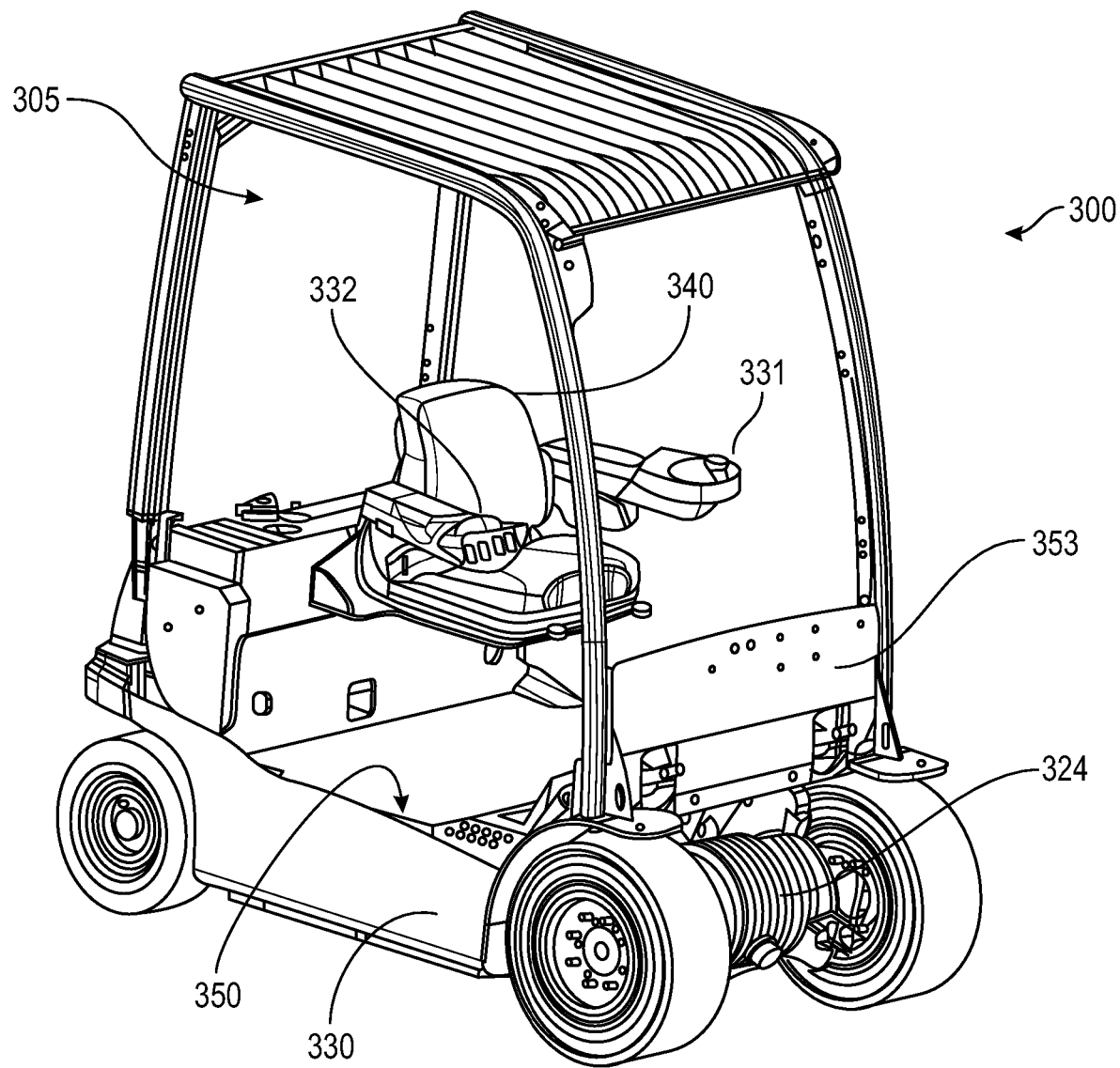
Figure 10C:
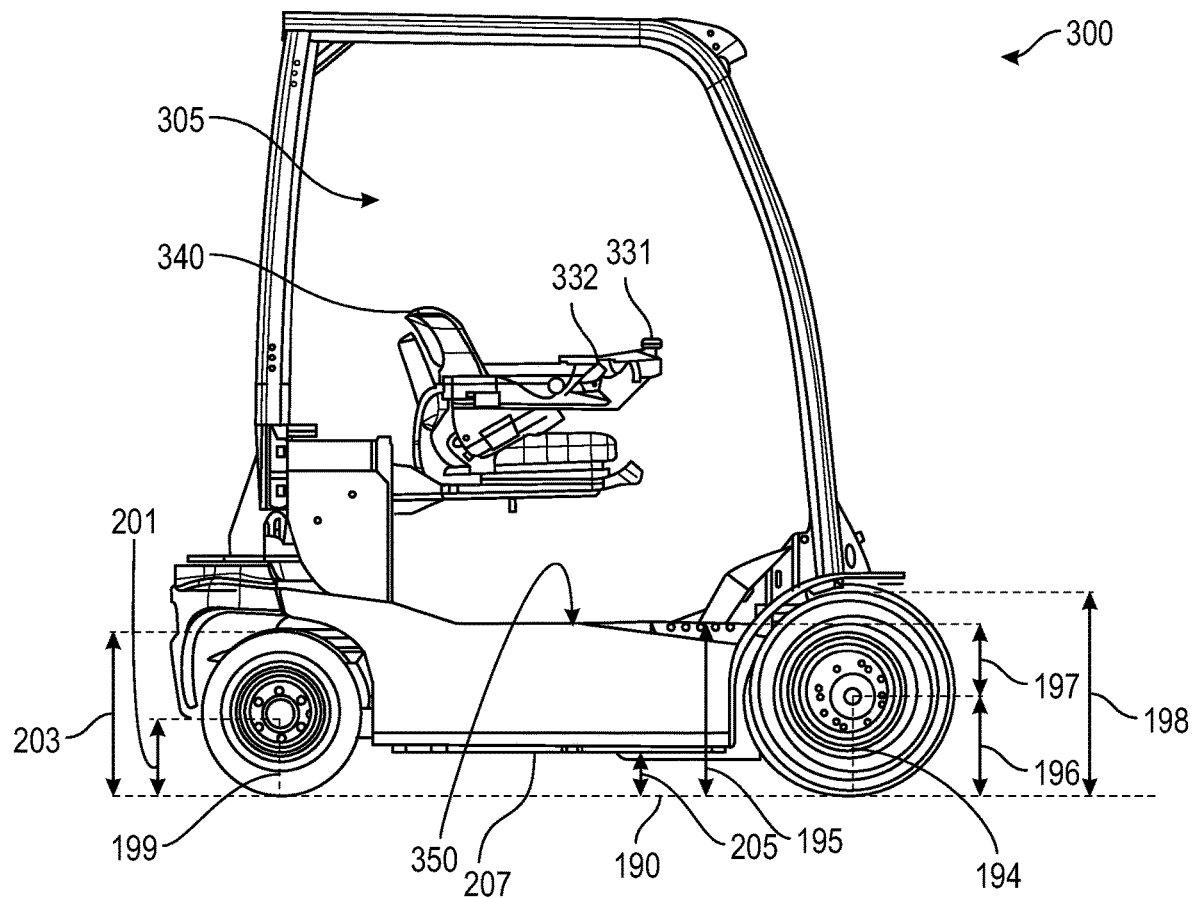

Referring to FIGS. 10A and 10B, embodiments of lift truck 300 can include a front cowl 353. The cowl 353 can be made of metal or plastic, or a combination thereof. The cowl 353 may be partially or completely transparent, to allow for an operator to view the lift carriage from the seat 340. In an embodiment, the cowl 353 is made of plexiglass. The cowl 353 may include a shelf or other means for storage on the inside of the operator compartment 305, such as a cup holder or a holder for a computerized device, such as a GPS device or an inventory device.

Figure 10D:
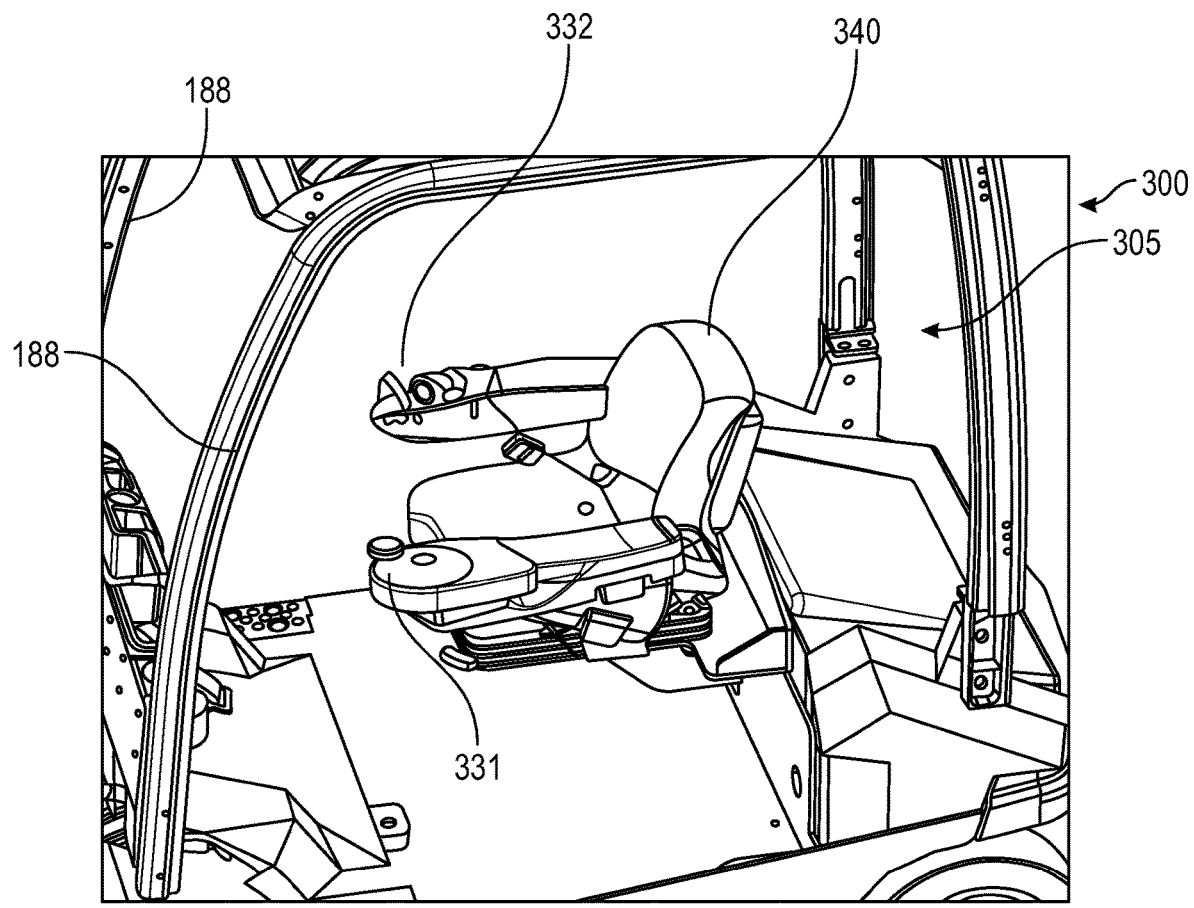

Referring to FIG. 10D, which provides a close-up view to show greater details, embodiments of lift truck 300 can include a seat 340 having finger controls 332 that are placed on the underside of an armrest, which also has a wrist strap.

FIG. 11 is a front view of a lift truck 300. In the embodiment of the lift truck 300 illustrated in FIG. 11 having a substantially flat and low floor 350, the operator has good visibility for counterbalance-type trucks in front of the truck because the components in the anterior portion of the truck 300 are lower in height as compared to components in commonly available lift trucks. The low floor 350 allows, for example, the components of the lift assembly that lie behind the fork carriage 360 and in front of and underneath the seat 340, which may include a hydraulic system used to raise and to lower the forks 365, to be placed lower within the chassis 330 than those of commonly available trucks. In an embodiment, the cowl 353 is transparent.

Having the low floor can also provide additional advantages, such as providing a lift truck 300 with a lower center of gravity than commonly available trucks because many of the heavy components of the truck 300 are located closer to the ground and/or in a horizontal arrangement rather than a vertical arrangement. The lift truck 300 may provide a center of gravity situated at a gravitational center height that is lower than or equal to the drive wheel height 198. The lift truck 300 may provide a center of gravity situated at a gravitational center height that is lower than or equal to the floor height 195. The lift truck 300 may provide a center of gravity situated at a gravitational center height that is lower than or equal to the steer wheel height 203. The lift truck 300 may provide a center of gravity situated at a gravitational center height that is lower than or equal to the drive wheel radius height 196. The lift truck 300 may provide a center of gravity situated at a gravitational center height that is lower than or equal to the steer wheel radius height 201.

Figure 12:
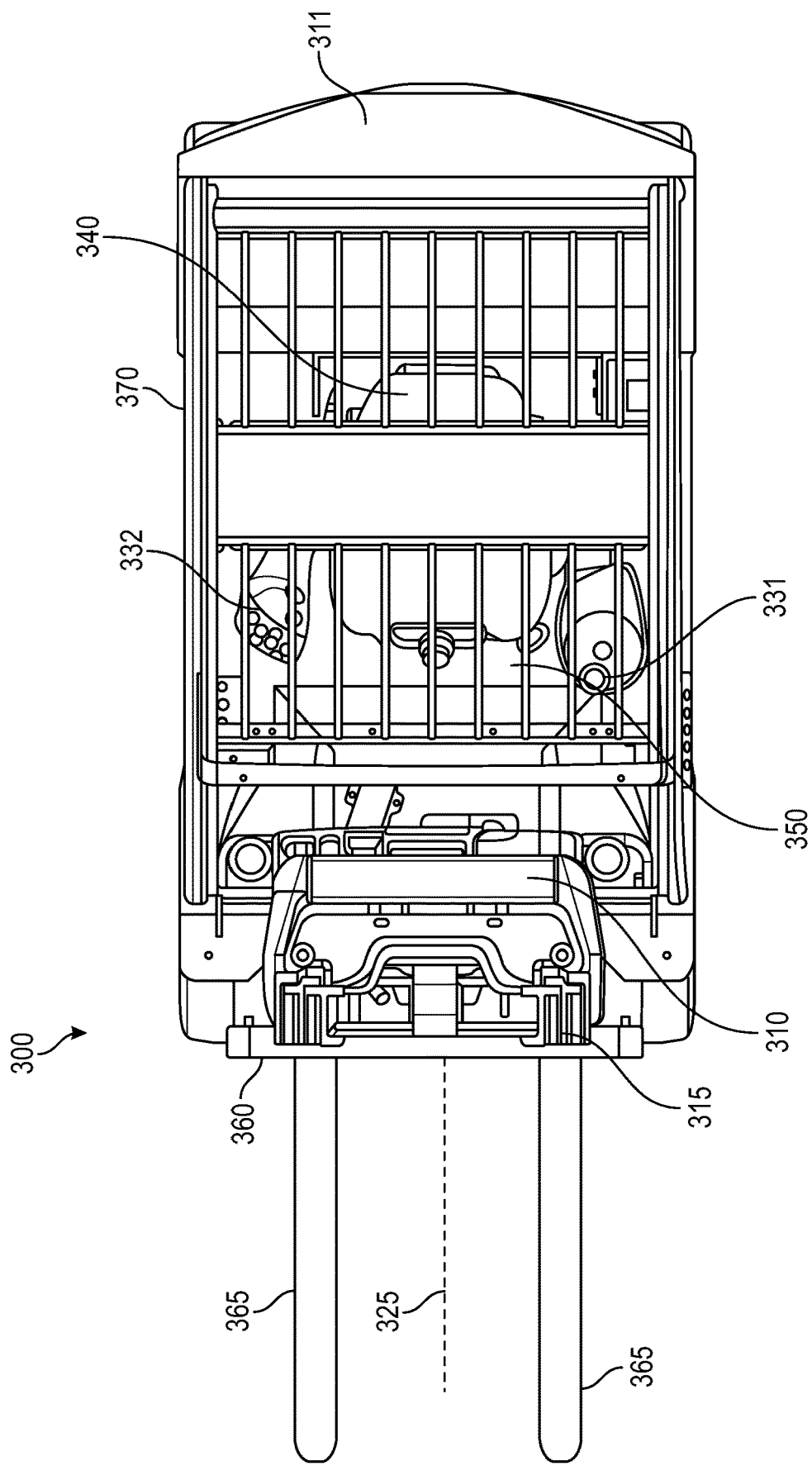
FIG. 12 is a top view of the lift truck of FIG. 6.

FIG. 12 is a top view of the truck 300 and illustrates the broad and unobstructed low floor 350 of the operator compartment 305. Seatside steering controls include finger controls 332 and a steering knob 331, which integrate into an armrest of the seat 340. Thus, no steering wheel or steering column is needed in this embodiment. The floor 350 of the operator compartment 305 can extend substantially flat side-to-side across approximately the entire width of the lift truck 300. When an operator is seated, there are no obstructions on the floor 350 that can hinder the operator's feet and legs when rotating the seat 340 to, for example, look around the truck 300 while driving or to exit the truck 300. In an embodiment, the lift truck 300 includes a steering wheel that may be mounted to a steering column that does not extend from the floor 350. For example, the steering column may be attached to or integrated with the seat 340, and as such, does not impede the movement of the operator's legs or feet.

In some embodiments, the truck 300 has seatside steering, such as a steering knob 331 and/or finger controls 332, and one or more foot controls in the operator compartment 305 that are near the floor 350 for operation by the driver. Exemplary foot controls include pedals. In an embodiment, the lift truck 300 includes an operator's seat 340 that has a bottom having front, left, right and rear edges, and a floor 350 that extends substantially flat front-to-back from a front floor edge proximate the front of the forklift truck 300 to a rear floor edge behind the front edge of the bottom of the seat 340.

Figure 13:
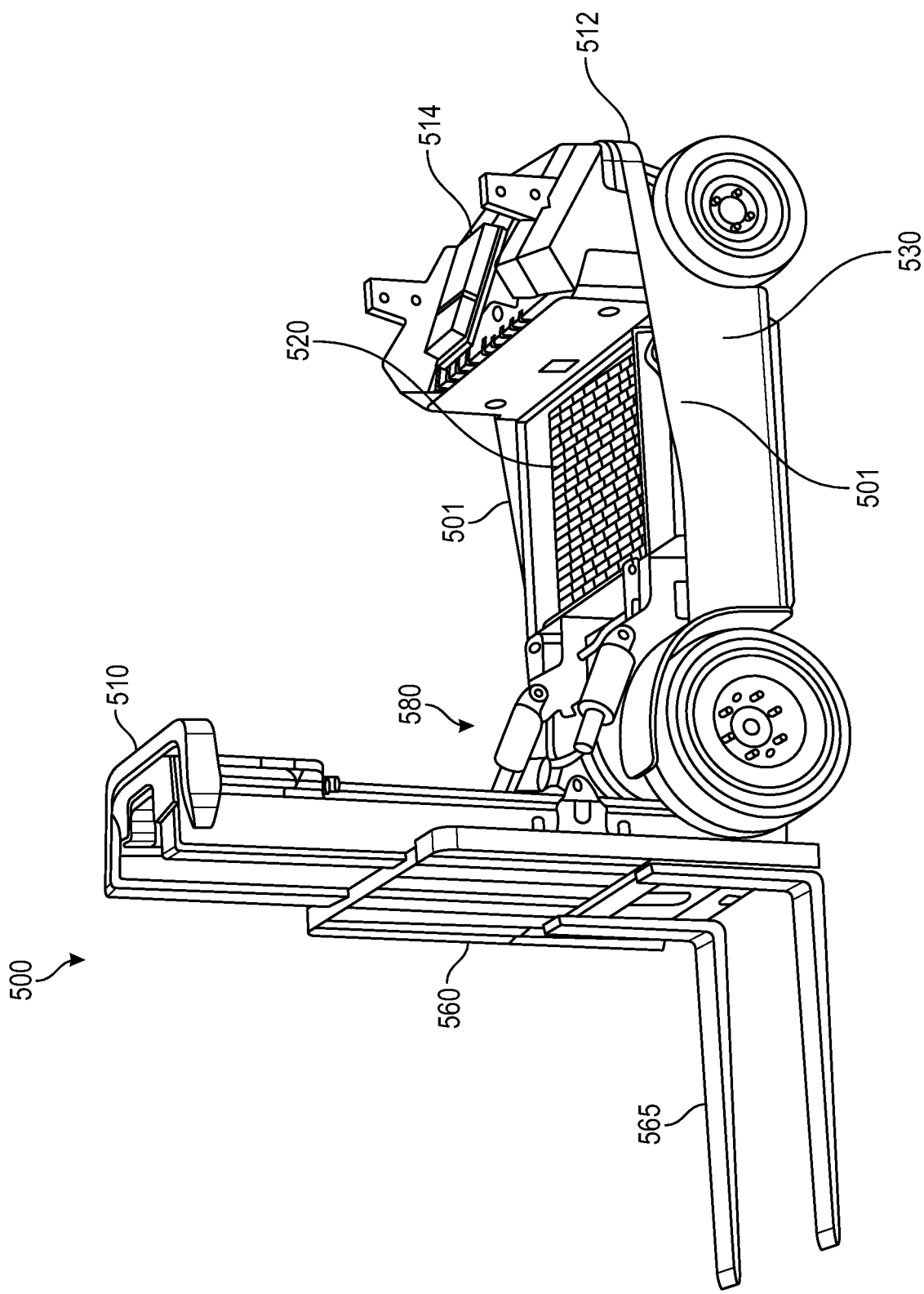
FIG. 13 is an isomeric drawing of the chassis of a lift truck from a left front perspective, according to one embodiment.
Figure 14:
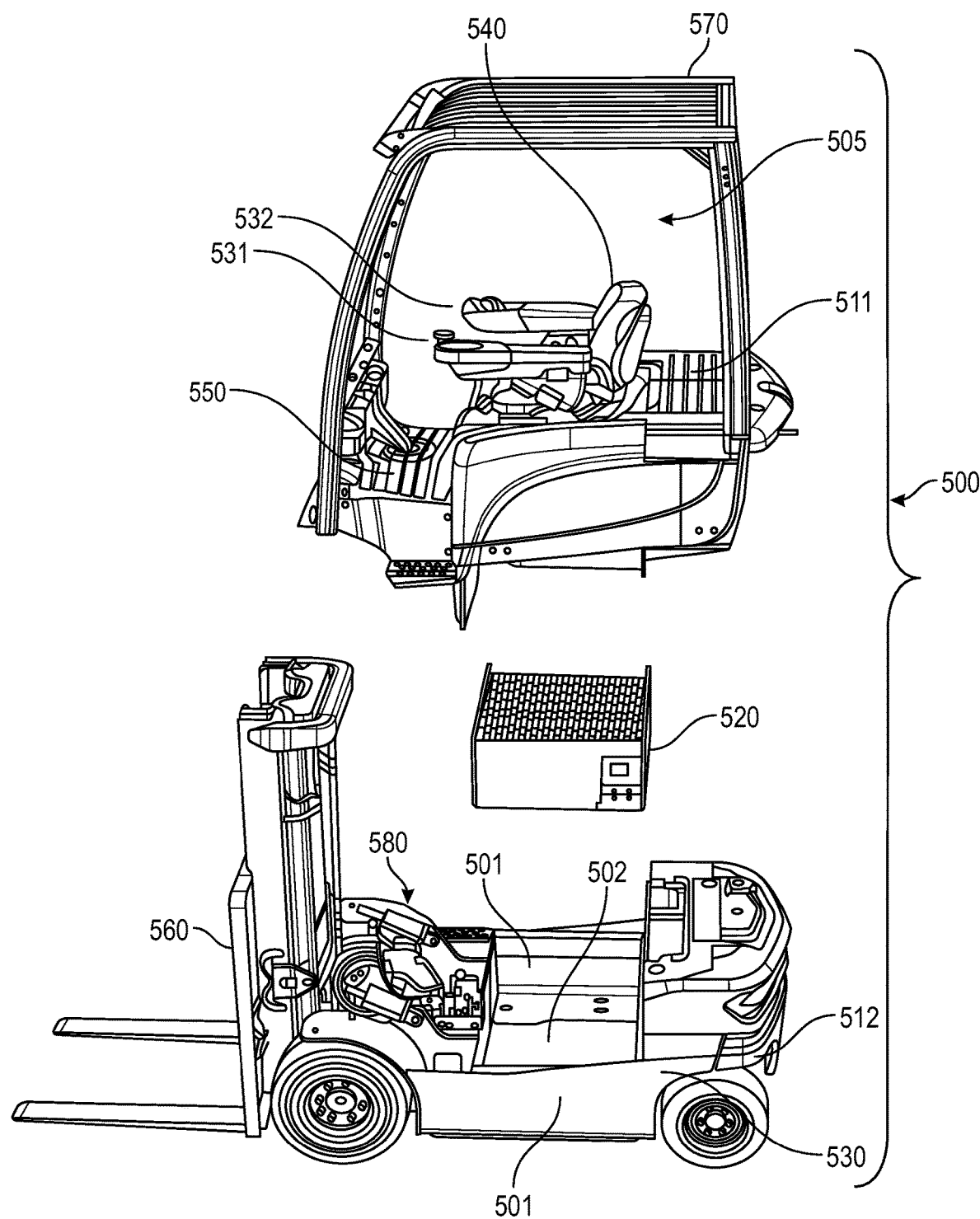
FIG. 14 is an illustration of an embodiment of a lift truck having a lithium-ion-battery-based energy source and seatside steering, in a partly exploded left side view, with an operator compartment (top) shown elevated above the battery bank (center) and chassis (bottom).

FIGS. 13 and 14 illustrate an embodiment of a lift truck 500 having an exemplary common truck chassis 530 that can be used for a lift truck having seatside steering and a lithium-ion battery 520 as an energy source. FIG. 13 shows the chassis 530 with the operator compartment 505 removed, to more clearly illustrate a chassis compartment under the floor of the operator compartment 505. Referring to FIG. 13, a chassis compartment is formed from chassis sides 501 and a bottom (not shown), to form a compartment that is within the sides and above the bottom of the chassis 530. The chassis compartment can contain, for example, an energy source including a lithium-ion battery 520 and an electric motor. A hydraulic system 580 may also be included in the chassis compartment. As illustrated in FIGS. 13 and 14, embodiments of the chassis compartment can extend above the front wheels in addition to under the operator's seat, as well as behind the operator's seat. In FIG. 14, for example, a counterweight 512 and additional truck parts 514 are shown attached behind the seat 540 in (wholly or partially) or on a chassis compartment on the rear side of the truck 500.

An exploded view of the truck 500 is shown in FIG. 14, which shows the operator compartment 505 elevated above lithium-ion battery 520, which is shown elevated above the chassis 530 and other components. FIG. 14 shows the chassis 530 having a bottom 502 of a chassis compartment and sides 501, a panel 511 (which can be sloped or level), a counterweight 512 and the hydraulic system 580.

The counterweight 512 may be made of one or more pieces, with each piece having one or more densities, such as a two-piece counterweight comprising multiple SAE J431 Gray Iron Casting grades. The truck 500 also includes an overhead guard 570, a lift assembly 560 having forks 365, mast 510, and hand-operated controls 531 and 532 integrated into seat 540. Unless specifically indicated otherwise, embodiments of the truck 500 can include some or all of the various components and variations thereof, as described for trucks 100 and 300 above, such as an optional notch in the overhead guard 570.

Figure 15A:
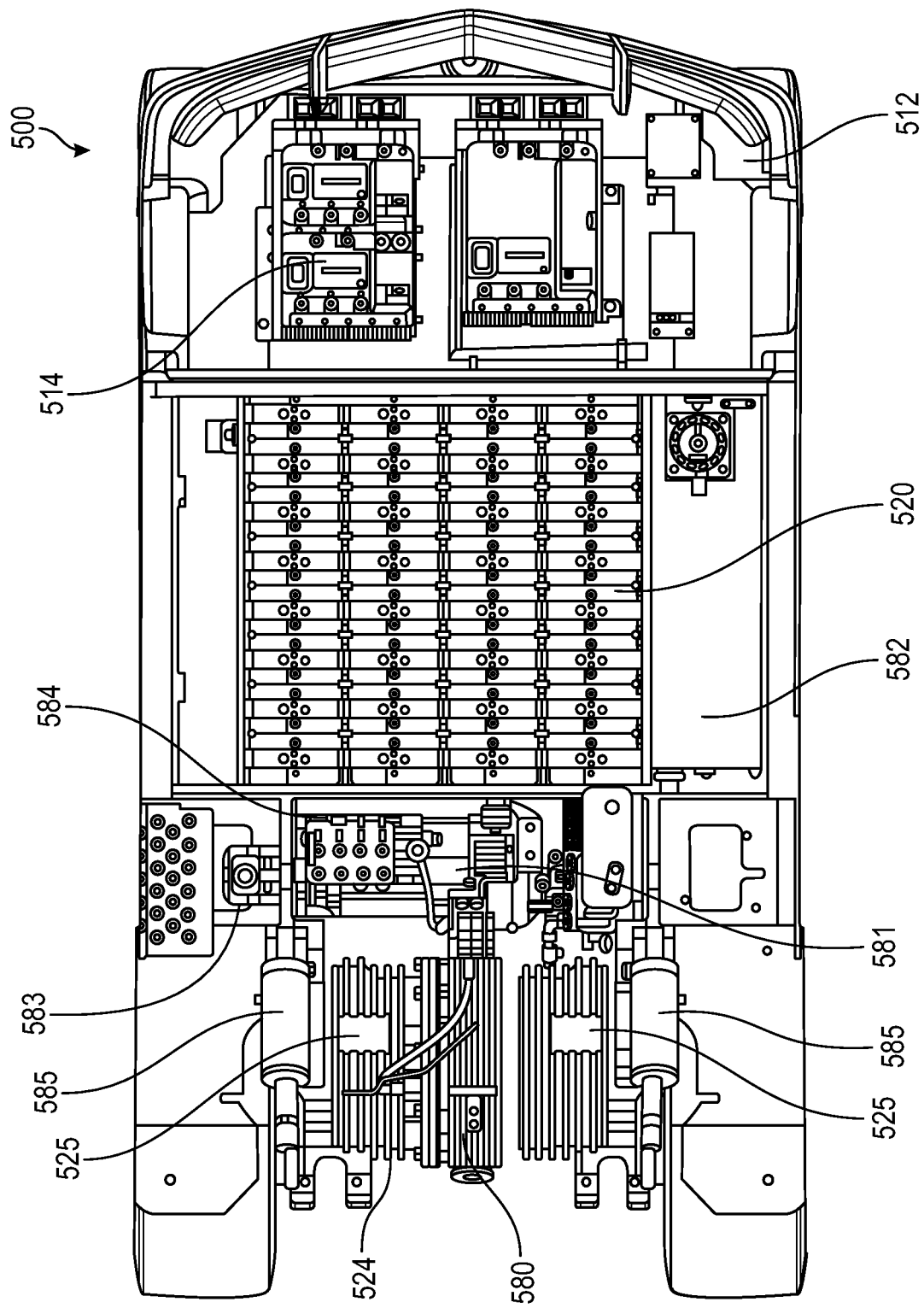
FIG. 15A is a top view of the battery bank and chassis of an embodiment of the lift truck of FIG. 13.
Figure 15B:
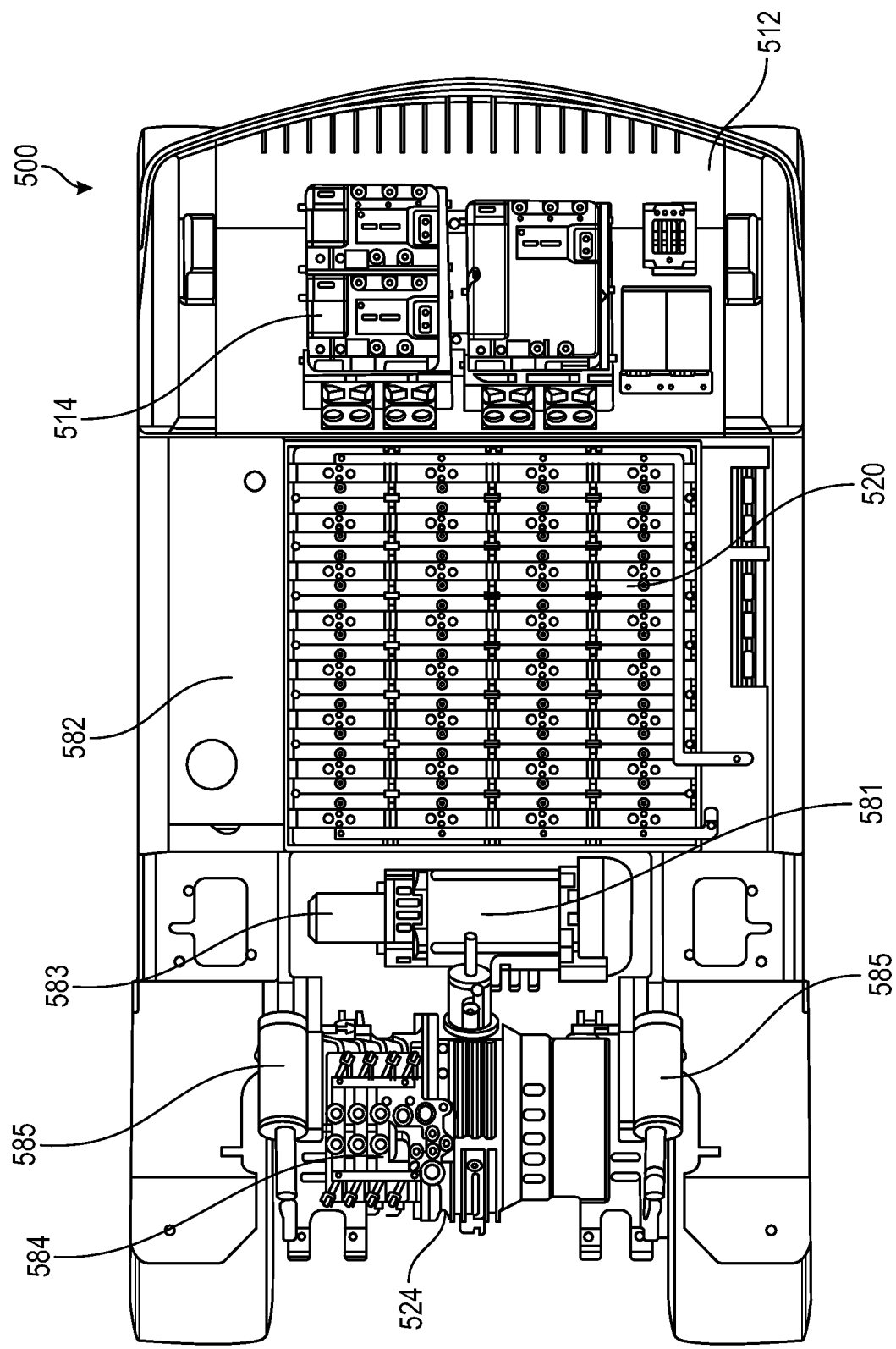
FIG. 15B is top view of the battery bank and chassis of an alternative embodiment of the lift truck of FIG. 13.

FIGS. 15A and 15B are top views of embodiments of the truck 500 with the operator compartment 505 removed, showing the battery bank and chassis compartments. FIGS. 15A and 15B show the lithium-ion battery 520 and the hydraulic system 580 in more detail. The smaller size of a lithium-ion battery 520 as compared to a lead-acid battery can provide an energy source with a low profile. A lift truck 500 can be designed to contain a low-profile lithium-ion battery 520 that is placed in a chassis compartment underneath the operator's seat 540, with a counterweight 512 placed in the rear of the truck 500 and behind the operator's seat 540. Using smaller lithium-ion batteries 520 for the energy source instead of larger, bulkier lead-acid batteries permits the chassis compartment containing the energy source to be smaller, therefore allowing for the low operator compartment floor 550, while maintaining similar amounts of electrical energy typically stored by lead-acid batteries in commonly available fork lift trucks.

The lithium-ion battery bank 520 is shown within a chassis compartment underneath the seat 540, behind (posterior to) most of the hydraulic system 580, and in front of (anterior to) counterweight 512 and truck parts 514. The arrangement of the components that make up the hydraulic system 580 and energy source may vary, in some embodiments of the lift trucks disclosed herein, in a vertical and/or horizontal direction as compared to the embodiment shown in FIGS. 13-15.

The hydraulic system 580 includes a hydraulic motor 581, a hydraulic tank 582, a hydraulic pump 583, at least one hydraulic valve 584, and at least one hydraulic cylinder 585, such as a tilt cylinder. The hydraulic pump 583 is connected to the hydraulic tank 582 such that the fluid in the tank 582 can be pressurized and released when the pressure in the hydraulic pump 583 is increased and decreased, respectively. The connection can be direct or indirect. For example, the hydraulic pump 583 can be directly connected to the hydraulic tank 582 via a plastic, metallic, or other appropriate hose. In an embodiment, the hydraulic pump 583 is directly connected to the hydraulic tank 582 without a hose. In one embodiment, the hydraulic motor 581 includes hydraulic lift cylinders.

The hydraulic pump 583 and hydraulic motor 581 may be located in a chassis compartment. The hydraulic tank 582 is fluidly connected to the hydraulic pump 583. The hydraulic tank 582 may be located in the same chassis compartment as the pump 583 and/or the motor 581, or the hydraulic tank 582 may be located in a different chassis compartment.

The hydraulic system 580, in an embodiment, includes one hydraulic valve 584 that controls the mast functions, and a different hydraulic valve 584 that controls the tilt functions for the mast 510. In one embodiment, the drive axle 524 is located at the front of the lift truck 500 and is attached to a front side of the chassis 530. In an embodiment, the drive axle 524 may form part of a drive train and can include one or more electric motors 525. In one embodiment, one or more electric motors 525 may be located in the drive axle 524. The drive axle may be attached to the mast 510.

Using the lithium-ion battery 520, the wheel-turning electric motor and the hydraulic system 580 constitute a power plant for the lift truck 500. The power plant drives at least some of the wheels to move the lift truck 500 and also raises the mast 510 to lift loads. Different embodiments, such as those described below, have different power plants based on different energy sources in place of the lithium-ion battery 520, but the lithium-ion battery 520 is presently a preferred energy source because it provides sufficient energy to use the lift truck during a complete work shift between recharging in a small volume that enables the size of the chassis compartment to be reduced and the floor of the operator compartment 505 to therefore be lowered, thereby realizing ergonomic advantages for the operator. A lithium-ion battery 520 may include, for example, multiple lithium cells connected together to achieve desired voltage and current for the lift truck 500 and/or a battery management system and battery power delivery components. Lithium-based batteries may include lithium-ion batteries as well as other batteries that include lithium in their chemical compositions. Lithium-ion batteries 520 may include chemical compositions of one or more of: lithium titanate, lithium-iron phosphate, lithium-nickel manganese cobalt oxide, lithium-manganese oxide. Other lithium battery chemistries that do not fall in the category of lithium ion include lithium sulfur, lithium air, and lithium silicone. One will appreciate that other types of lithium-based battery may be used in place of a lithium-ion battery 520 if the particular lithium-based battery has properties suitable for lift truck applications.

Figure 16:
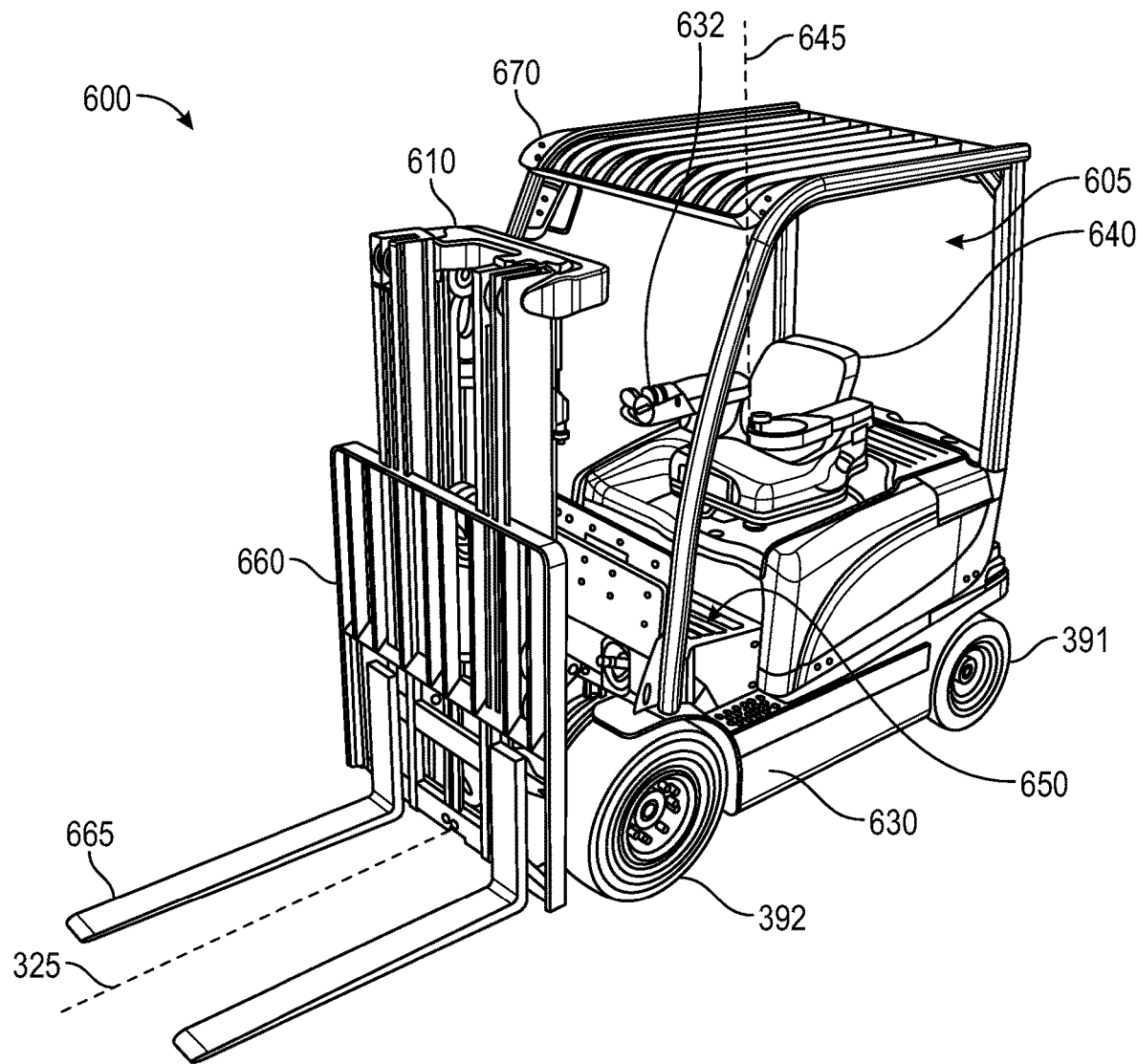
FIG. 16 is an isometric drawing of a lift truck having a lead-acid-battery-based energy source and seatside steering, according to one embodiment, from a left front perspective.
Figure 17:
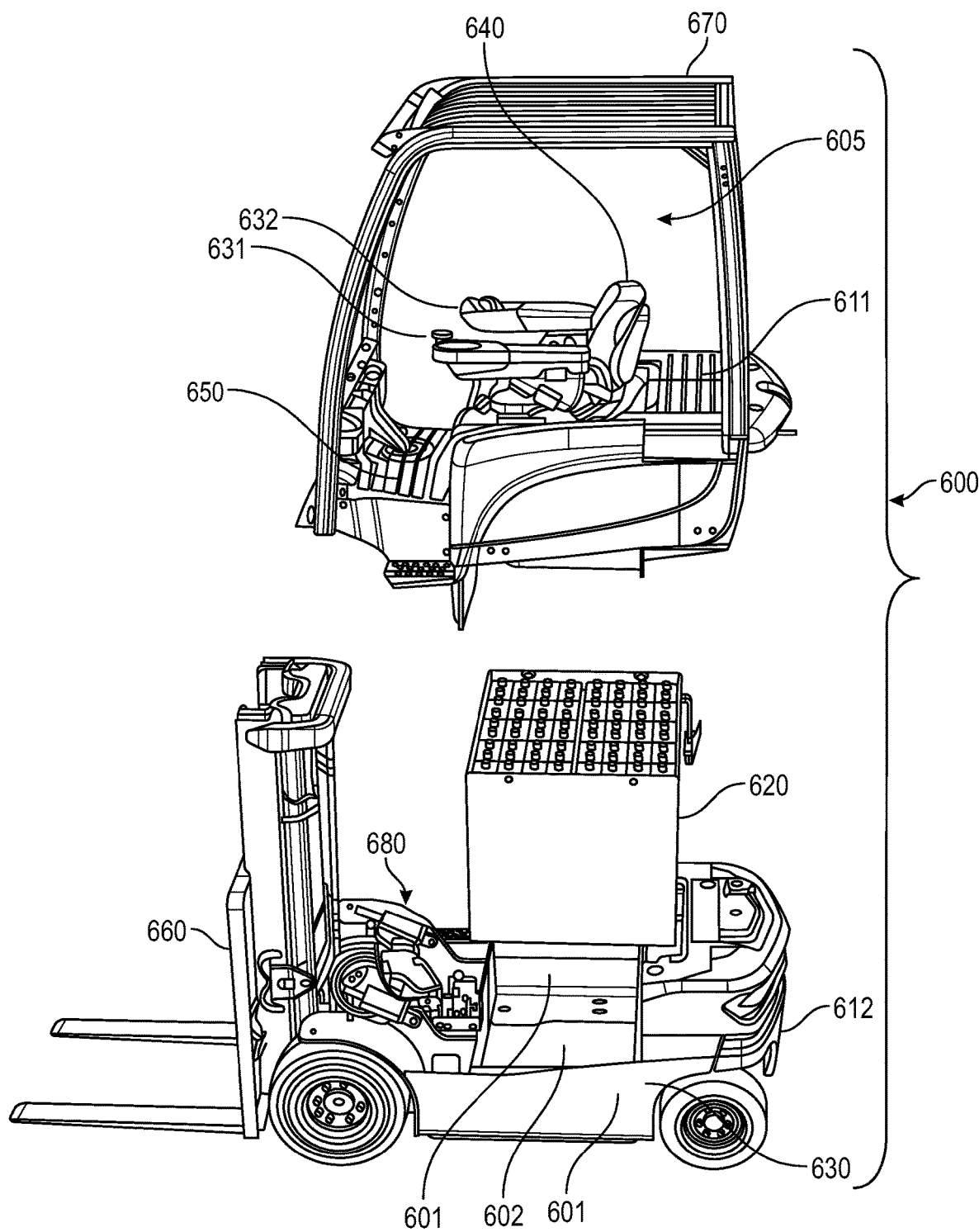
FIG. 17 is a partly exploded left side view of the lift truck of FIG. 16, with an operator compartment (top) shown elevated above a lead-acid battery (center) and chassis (bottom).

FIGS. 16 and 17 illustrate an embodiment of a lift truck 600 having a chassis 630, seatside steering and using a lead-acid battery as the energy source. Truck 600 also includes an overhead guard 670, a lift chassis 660 having forks 665, mast 610, and hand-operated controls 631 and 632 integrated into seat 640. The seat 640 can preferably rotate about a vertical axis 645. Unless specifically indicated otherwise, embodiments of truck 600 can include some or all of the various components and variations thereof, as described for trucks 100, 300, and 500 above, such as an optional notch in the overhead guard 670. Referring to FIG. 16, the floor 650 of the operator compartment 605 is not a low floor, in order to accommodate the larger size of a currently available lead-acid battery bank 620 underneath the operator's seat 640, as compared to the low-profile and smaller lithium-ion battery bank 520 shown for the truck 500 in FIGS. 13-15.

An exploded view of the truck 600 is shown in FIG. 17, which shows the operator compartment 605 elevated above the lead-acid battery bank 620, which is shown elevated above the chassis 630. In the embodiment shown in FIGS. 16 and 17, the floor 650 of the operator compartment 605 has neither a steering column nor a steering wheel. FIG. 17 shows the chassis 630 having a bottom 602 of a chassis compartment and sides 601. The hydraulic system 680 can fit completely or partially within the chassis compartment.

Embodiments of the truck 600 can contain a counterweight 612 that may be made of one or more pieces, with each piece having one or more densities, such as a two-piece counterweight comprising multiple SAE J431 Gray Iron Casting grades. The counterweight 612 may be located behind the operator's seat 640.

Figure 18A:
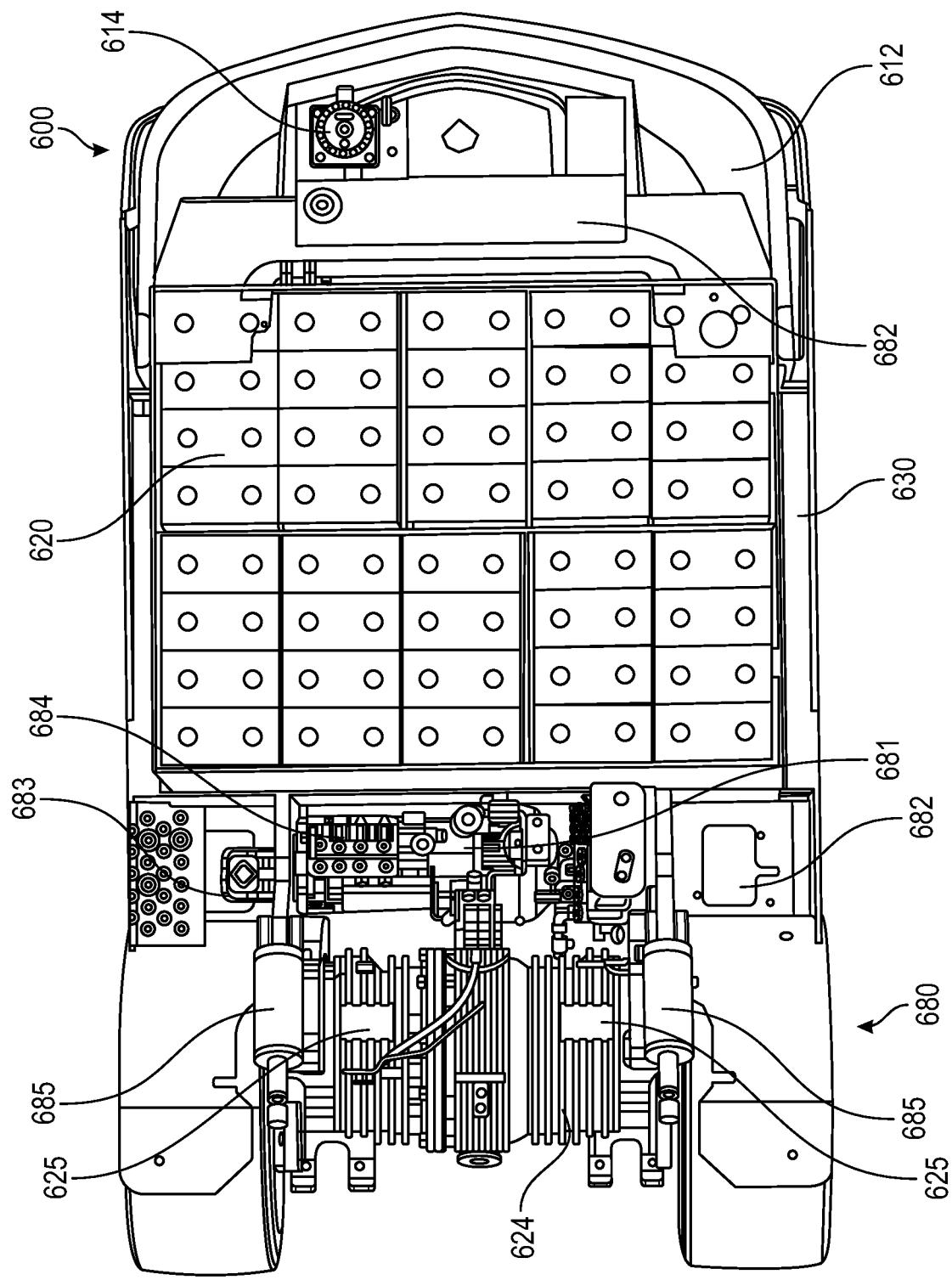
FIG. 18A is a top view of the battery and chassis of the lift truck of FIG. 17.
Figure 18B:
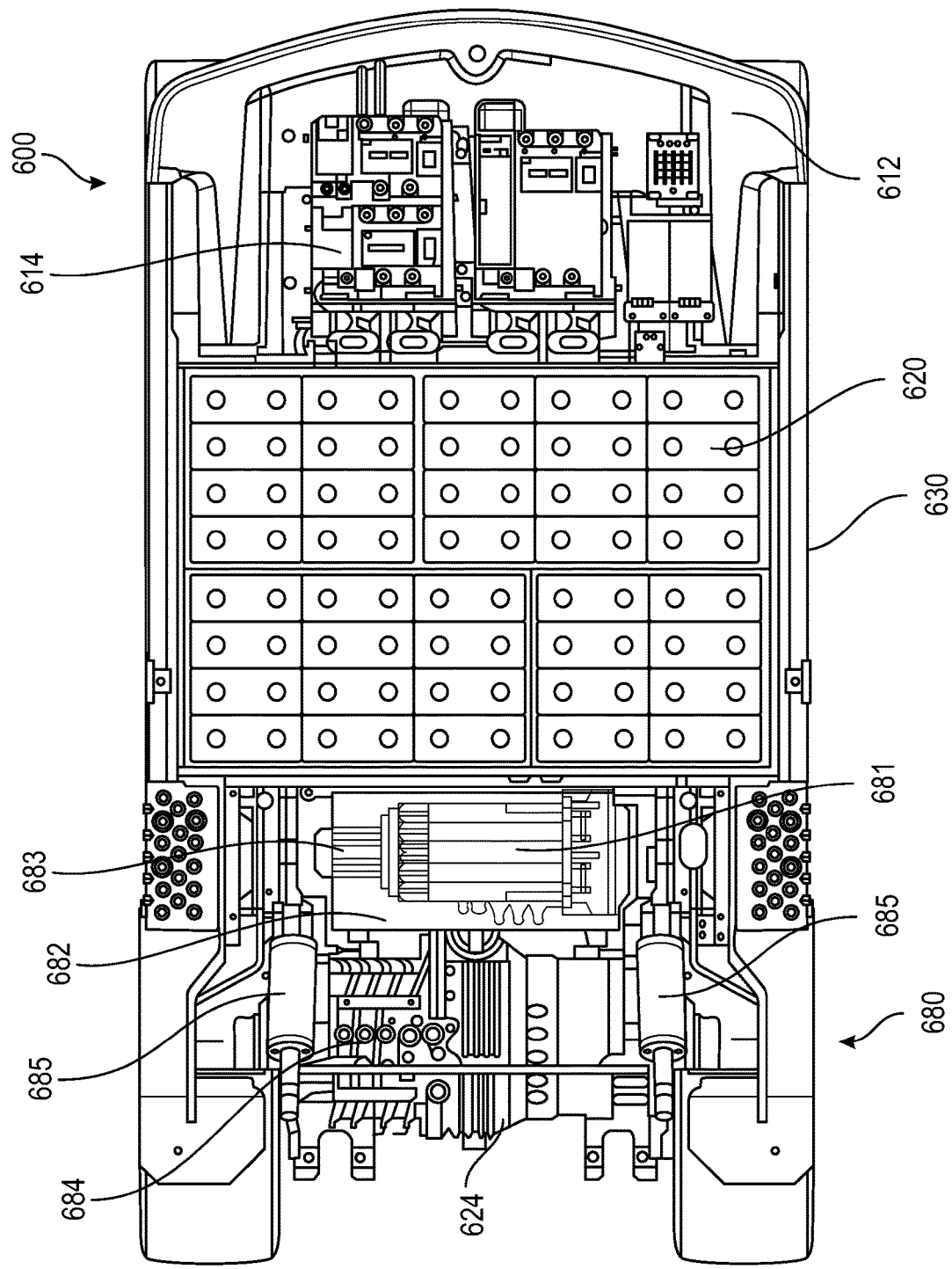
FIG. 18B is a top view of the battery and chassis of an alternative embodiment of the lift truck of FIG. 17, with the fork carriage and mast removed.

FIGS. 18A and 18B are top views of embodiments of the truck 600 with the operator compartment 605 removed, showing the battery bank and chassis compartments. FIGS. 18A and 18B show the lead-acid battery bank 620 and the hydraulic system 680 in more detail. The lead-acid battery bank 620 is shown within a chassis compartment underneath the seat 640, behind (posterior to) most of the hydraulic system 680, and in front of (anterior to) counterweight 612 and truck parts 614. Unless specifically indicated otherwise, the energy source, hydraulic system and drive mechanisms of embodiments of truck 600 can include some or all of the various components and variations thereof, as described for trucks 100, 300 and 500 above.

The hydraulic system 680 includes a hydraulic motor 681, a hydraulic tank 682, a hydraulic pump 683, at least one hydraulic valve 684, and at least one hydraulic cylinder 685. The functions and construction of the hydraulic system 680 and its components may be as described above in relation to the hydraulic system 580. In one embodiment, the drive axle 624 is located at the front of the lift truck 600 and is attached to a front side of the chassis 630. In an embodiment, the drive axle 624 may form part of a drive train and can include one or more electric motors 625.

Figure 19:
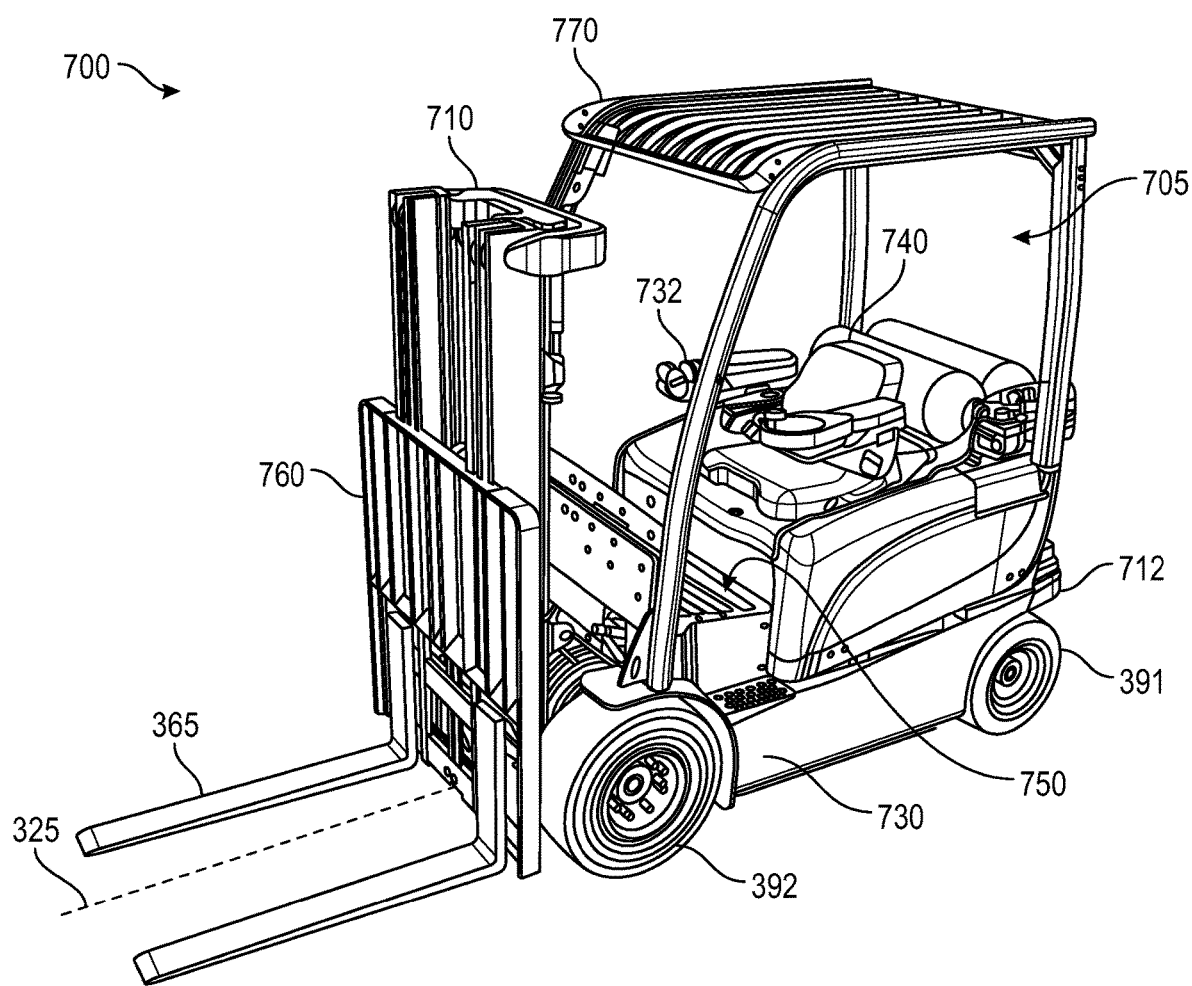
FIG. 19 is an isometric drawing of a lift truck with a hydrogen-fuel-cell-based energy source and seatside steering, according to one embodiment, from a left front perspective.
Figure 20:
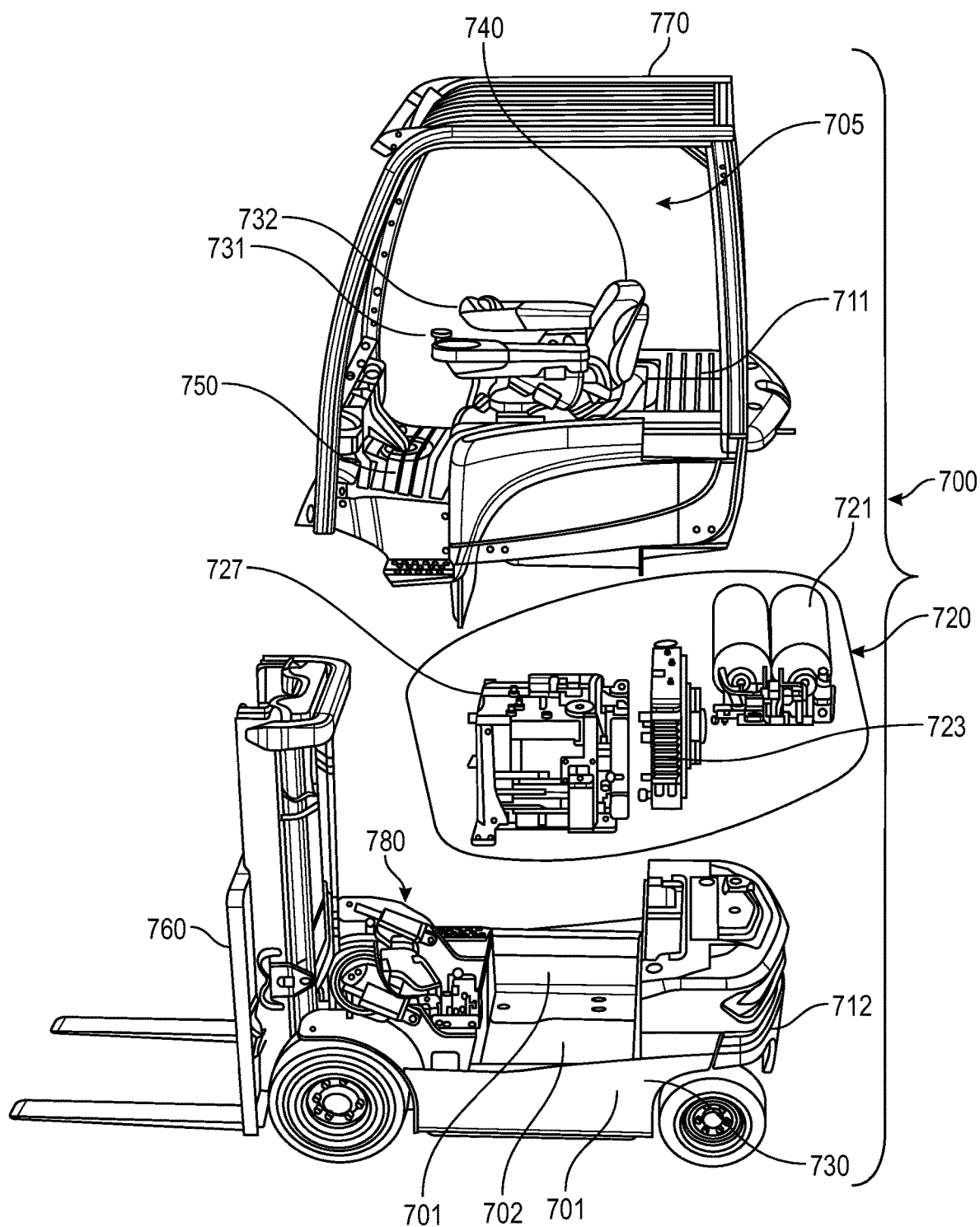
FIG. 20 is a partly exploded left side view of the lift truck of FIG. 19, with an operator compartment (top) shown elevated above a hydrogen-fuel-cell-based energy source (center) and chassis (bottom).

FIGS. 19 and 20 illustrate an embodiment of a lift truck 700 having a chassis 730, seatside steering and using a hydrogen fuel cell 720 as part of the energy source. The associated power plant may include an electric motor, power electronics, a hydrogen delivery system, and power connectors. Truck 700 also includes an overhead guard 770, a lift assembly 760 having forks 765, mast 710, and hand-operated controls 731 and 732 integrated into seat 740. Unless specifically indicated otherwise, embodiments of truck 700 can include some or all of the various components and variations thereof, as described for trucks 100, 300, 500, and 600 above, such as an optional notch in the overhead guard 770. Referring to FIG. 19, the floor 750 of the operator compartment 705 is not a low floor, to accommodate the larger size of the hydrogen fuel cell components underneath the operator's seat 740, as compared to the lower-profile and smaller lithium-ion battery bank 520 shown in the truck 500 of FIGS. 13-15.

An exploded view of the truck 700 is shown in FIG. 20, which shows the operator compartment 705 elevated above the energy source (fuel cell power system or fuel cell power plant) 720 which is shown elevated above the chassis 730. In some embodiments, the fuel cell power system 720 includes a hydrogen fuel cell 721, a cooling system 723, and fuel cell engine or motor 727. In the embodiment shown in FIGS. 19 and 20, the floor 750 of the operator compartment 705 has no steering column nor steering wheel. FIG. 20 shows the chassis 730 having a bottom 702 of a chassis compartment and sides 701. The hydraulic system 780 may fit completely or partially in the chassis compartment.

Embodiments of the truck 700 can contain a counterweight 712 that may be made of one or more pieces, with each piece having one or more densities, such as a two-piece counterweight comprising multiple SAE J431 Gray Iron Casting grades. The counterweight 712 may be located behind the operator's seat 740 and underneath hydrogen storage tanks used for the hydrogen fuel cell 721. FIG. 20 shows the truck 700 having a rear chassis compartment also behind the operator's seat 740, the compartment covered by panel 711, with the hydrogen storage tanks resting above panel 711.

Figure 21A:
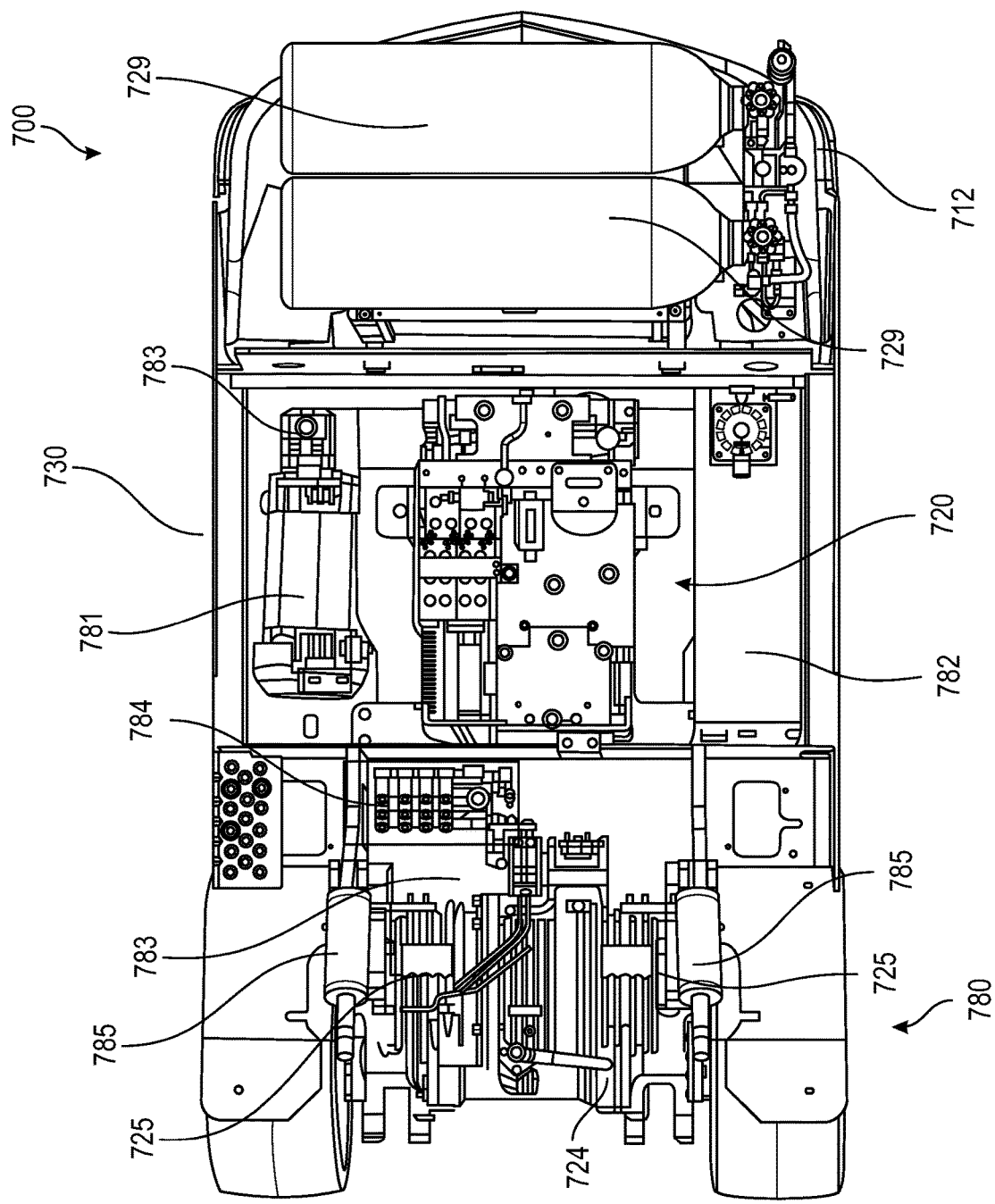
FIG. 21A is a top view of the energy source and chassis of the lift truck of FIG. 20.
Figure 21B:
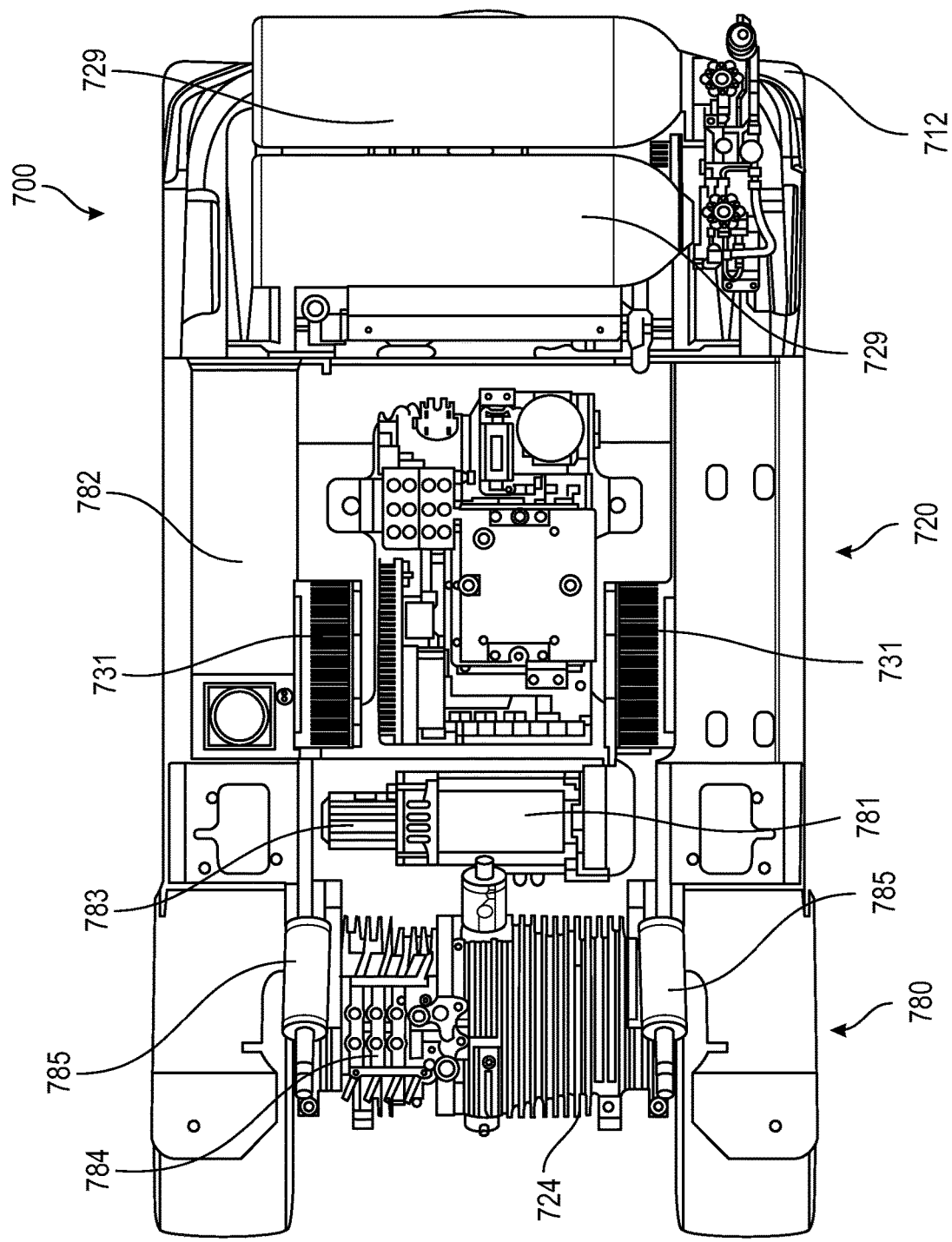
FIG. 21B is a top view of the energy source and chassis of an alternative embodiment of the lift truck of FIG. 20, with the fork carriage and mast removed.

FIGS. 21A and 21B are top views of embodiments of the truck 700 with the operator compartment 705 removed, showing the hydrogen-based energy source 720 (such as a hydrogen fuel cell power system or hydrogen fuel cell power plant), hydrogen storage tanks 729, and chassis compartments. FIGS. 21A and 21B show the energy source 720 and the hydraulic system 780 in more detail. Most of the hydrogen fuel cell power plant 720 is shown within a chassis compartment underneath the seat 740, behind (posterior to) most of the hydraulic system 780, and in front of (anterior to) counterweight 712 and truck parts 714. Unless specifically indicated otherwise, the energy source, hydraulic system and drive mechanisms of embodiments of truck 700 can include some or all of the various components and variations thereof, as described for trucks 100, 300, 500 and 600 above.

The hydraulic system 780 includes a hydraulic motor 781, a hydraulic tank 782, a hydraulic pump 783, at least one hydraulic valve 784, and at least one hydraulic cylinder 785.

The functions and construction of the hydraulic system 780 and its components may be as described above in relation to the hydraulic system 580. In one embodiment, the drive axle 724 is located at the front of the lift truck 700 and is attached to a front side of the chassis 730. In an embodiment, the drive axle 724 may form part of a drive train and can include one or more electric motors 725. The hydrogen fuel cell power plant 720 may provide energy directly to the hydraulic motor 781 or may provide energy to charge batteries 731, which can be regulated to feed the hydraulic motor 781.

Figure 22:
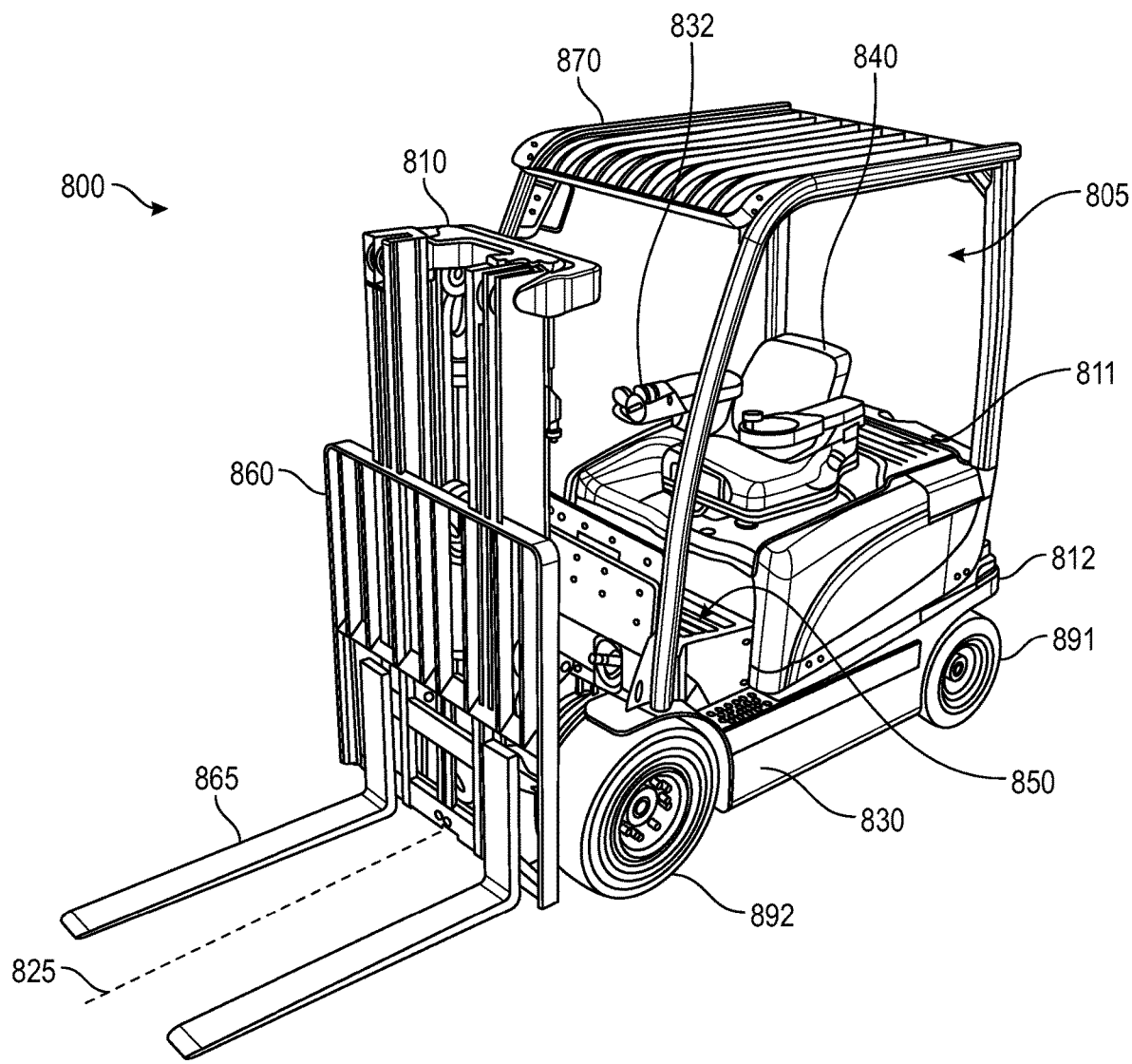
FIG. 22 is an isometric drawing of a lift truck with an internal-combustion-engine-based energy source and seatside steering, according to one embodiment, from a left front perspective.
Figure 23:
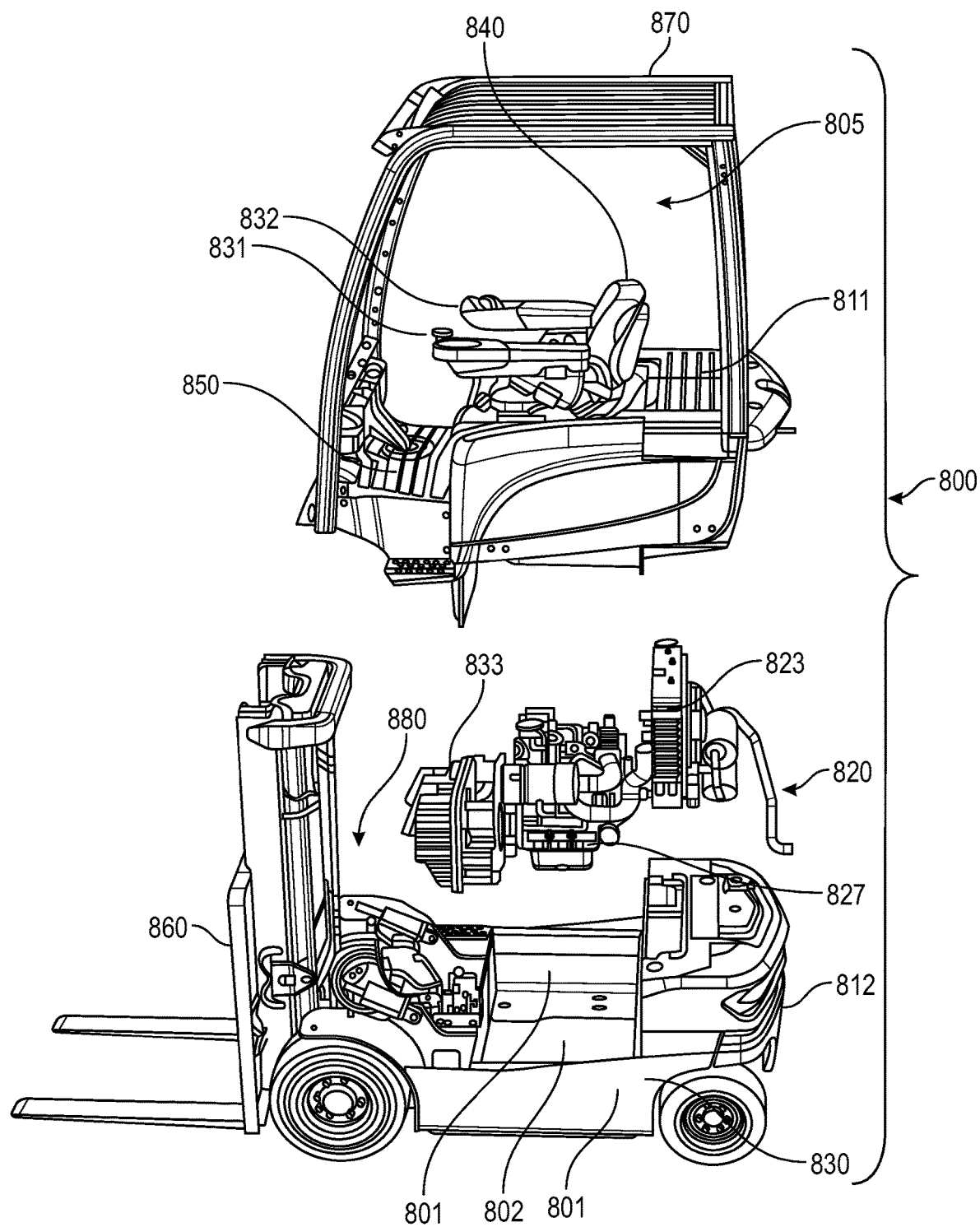
FIG. 23 is a partly exploded left side and top view of the lift truck of FIG. 22, with an operator compartment (top) shown elevated above an internal-combustion-engine-based energy source (center) and chassis (bottom).

FIGS. 22 and 23 illustrate an embodiment of a lift truck 800 having a chassis 830, seatside steering and using an internal combustion engine as the energy source. The truck 800 also includes an overhead guard 870, a lift chassis 860 having forks 865, mast 810, and hand-operated controls 831 and 832 integrated into seat 840. Unless specifically indicated otherwise, embodiments of the truck 800 can include some or all of the various components and variations thereof, as described for trucks 100, 300, 500, 600 and 700 above, such as an optional notch in the overhead guard 870. Referring to FIG. 22, the floor 850 of the operator compartment 805 is not a low floor, to accommodate the larger size of the internal combustion engine underneath the operator's seat 840, as compared to the lower-profile and smaller lithium-ion battery shown in the truck 500 of FIGS. 13-15.

An exploded view of the truck 800 is shown in FIG. 23, which shows the operator compartment 805 elevated above internal combustion engine energy source (power plant or drive train) 820, which is shown elevated above the chassis 830. The drive train 820 may include a cooling system 823, an internal combustion engine 827, and a transmission 833. In the embodiment shown in FIGS. 22 and 23, the floor 850 of the operator compartment 805 has no foot controls. FIG. 23 shows the chassis 830 having a bottom 802 of a chassis compartment and sides 801, and the hydraulic system 880. The hydraulic system 880 may fit completely or partially in the chassis compartment.

Embodiments of the truck 800 can contain a counterweight 812 that may be made of one or more pieces, with each piece having one or more densities, such as a two-piece counterweight comprising multiple SAE J431 Gray Iron Casting grades. The counterweight 812 may be placed in a compartment behind the operator's seat 840. FIG. 23 shows the truck 800 having a rear chassis compartment also behind the operator's seat 840, the compartment covered by panel 811, with the portions of the internal combustion engine resting above panel 811.

Figure 24A:
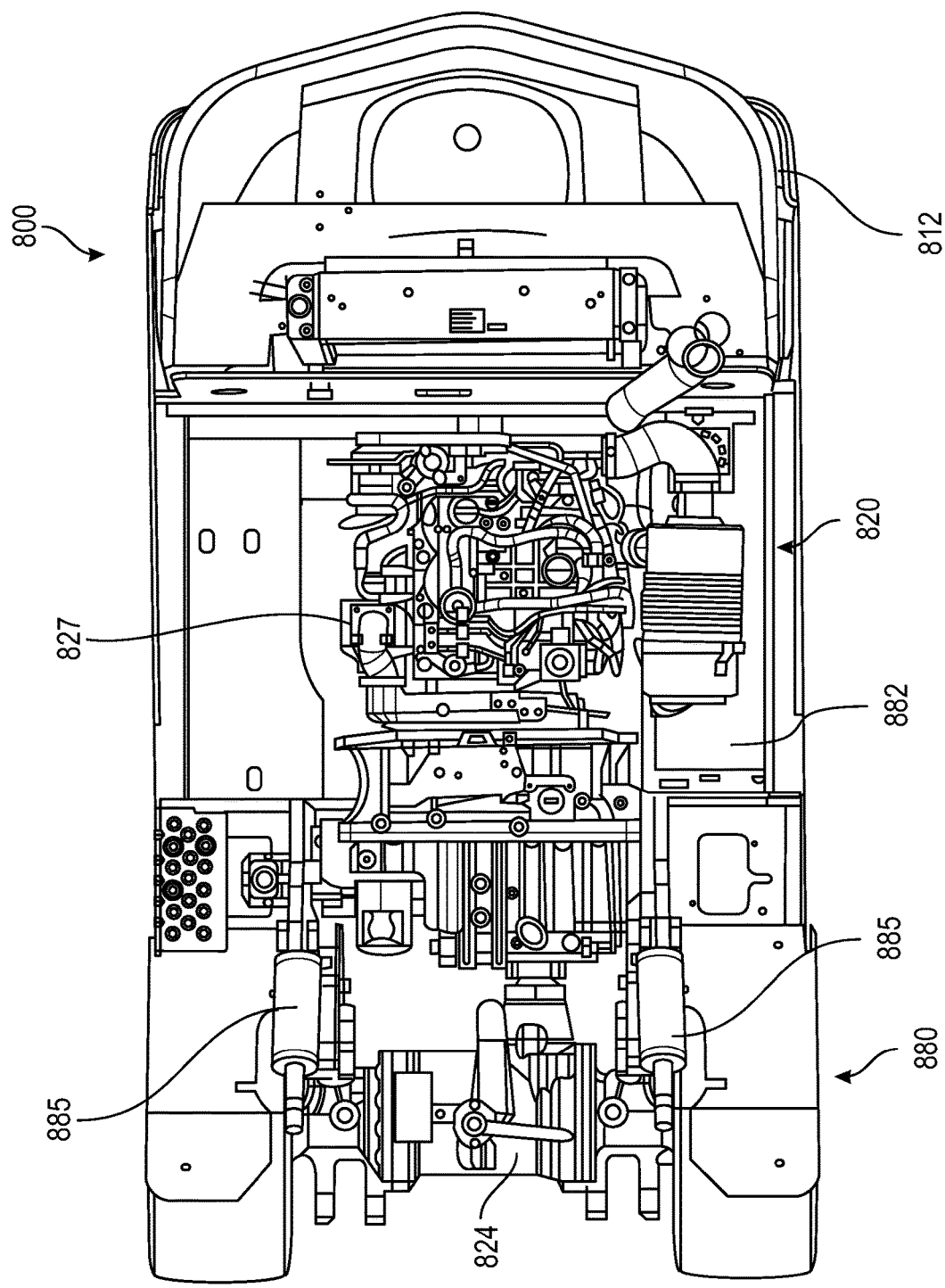
FIG. 24A is a top view of the energy source and chassis of the lift truck of FIG. 23.
Figure 24B:
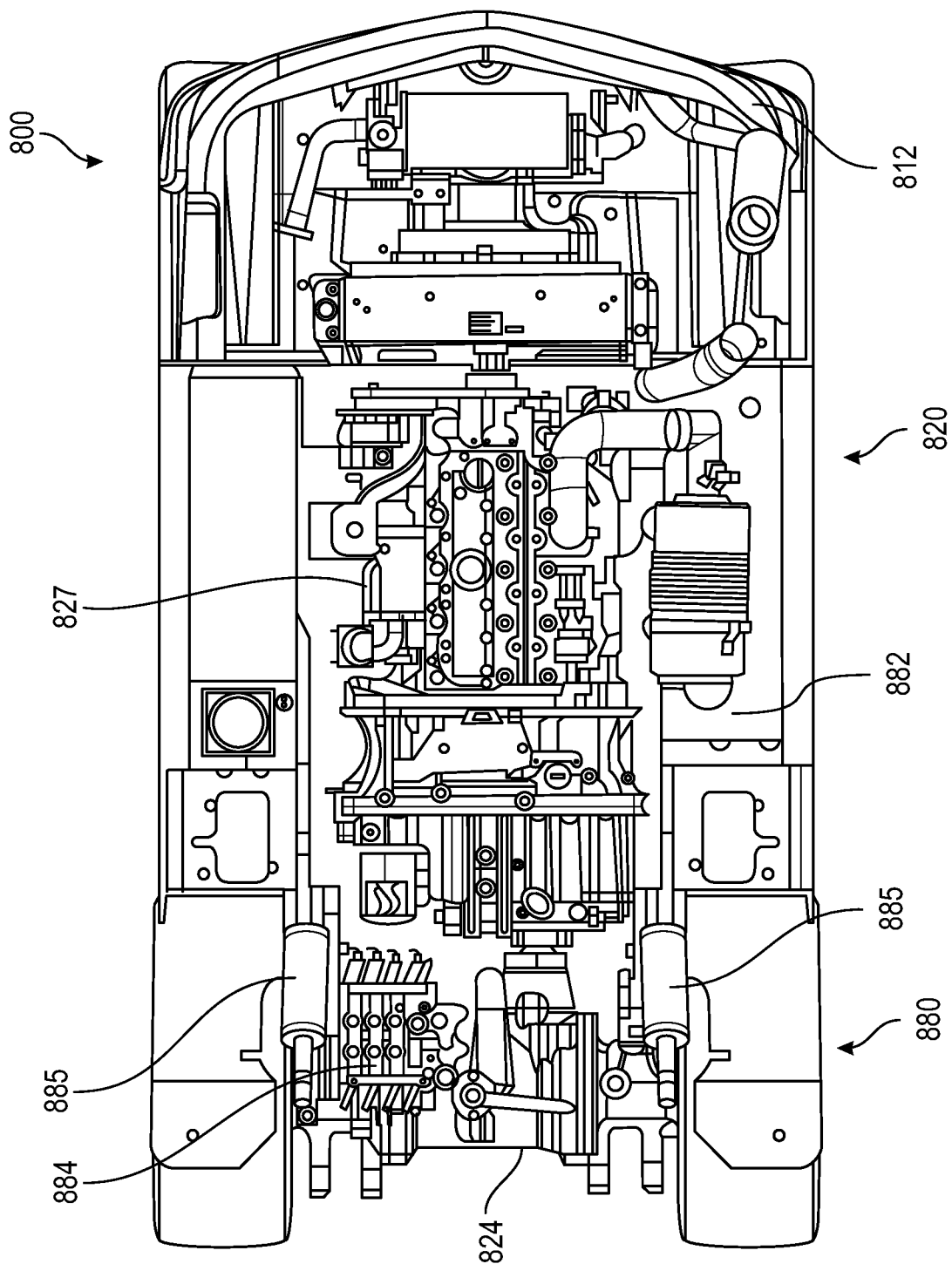
FIG. 24B is an additional illustration of FIG. 24A, with the fork carriage and mast removed.

FIGS. 24A and 24B are top views of embodiments of the truck 800 with the operator compartment 805 removed, showing the internal combustion-based energy source 820 and chassis compartments. FIGS. 24A and 24B show the energy source 820 and the hydraulic system 880 in more detail; however, the illustration of the energy source blocks the view of many of the hydraulic system components. Most of the internal-combustion-based energy source 820 is shown within a chassis compartment underneath the seat 840, behind (posterior to) most of the hydraulic system 880, and in front of (anterior to) counterweight 812. Unless specifically indicated otherwise, the energy source, hydraulic system and drive mechanisms of embodiments of truck 800 can include some or all of the various components and variations thereof, as described for trucks 100, 300, 500, 600 and 700 above.

The hydraulic system 880 includes a hydraulic motor (not shown), a hydraulic tank 882, a hydraulic pump (not shown), at least one hydraulic valve 884, and at least one hydraulic cylinder 885. The functions and construction of the hydraulic system 880 and its components may be as described above in relation to the hydraulic system 780. In one embodiment, the drive axle 824 is located at the front of the lift truck 800 and is attached to a front side of the chassis 830.

The lift trucks disclosed herein can include a truck chassis that is common to multiple embodiments. For example, the chassis 130, 330, 530, 630, 730 and 830 may all have the same design, that is, be a common chassis. The common chassis has a chassis cavity or compartment as described and referred to extensively above. An advantage of the common chassis is that the lift truck manufacturer can use the same chassis when manufacturing lift trucks having different floor heights, energy sources, and/or operator compartments. For example, the common chassis can be used in lift trucks that incorporate low floors and also for trucks having floors that are of commonly available height. Similarly, a common chassis can be used in lift trucks having a low-profile battery and also for trucks that use a hydrogen fuel-cell-based energy source.

Additional aspects of the modular design of the lift trucks and their chassis in the embodiments described herein, are shown in FIGS. 25-30. The various different designs for the chassis and components that are connected thereto are referred to herein as "form factors." Parameters contemplated by the form factor include the size, specification, materials used for, and the shape of parts used in the lift truck. Embodiments of the lift trucks shown in FIGS. 25-30 may include various components that can be incorporated in different embodiments of any of the lift trucks disclosed herein. Similarly, components of the lift trucks as described herein for trucks 100, 300, 500, 600, 700 and 800 above, may be included in any of the embodiments of lift trucks shown in FIGS. 25-30.

Figures 25A, 25B:
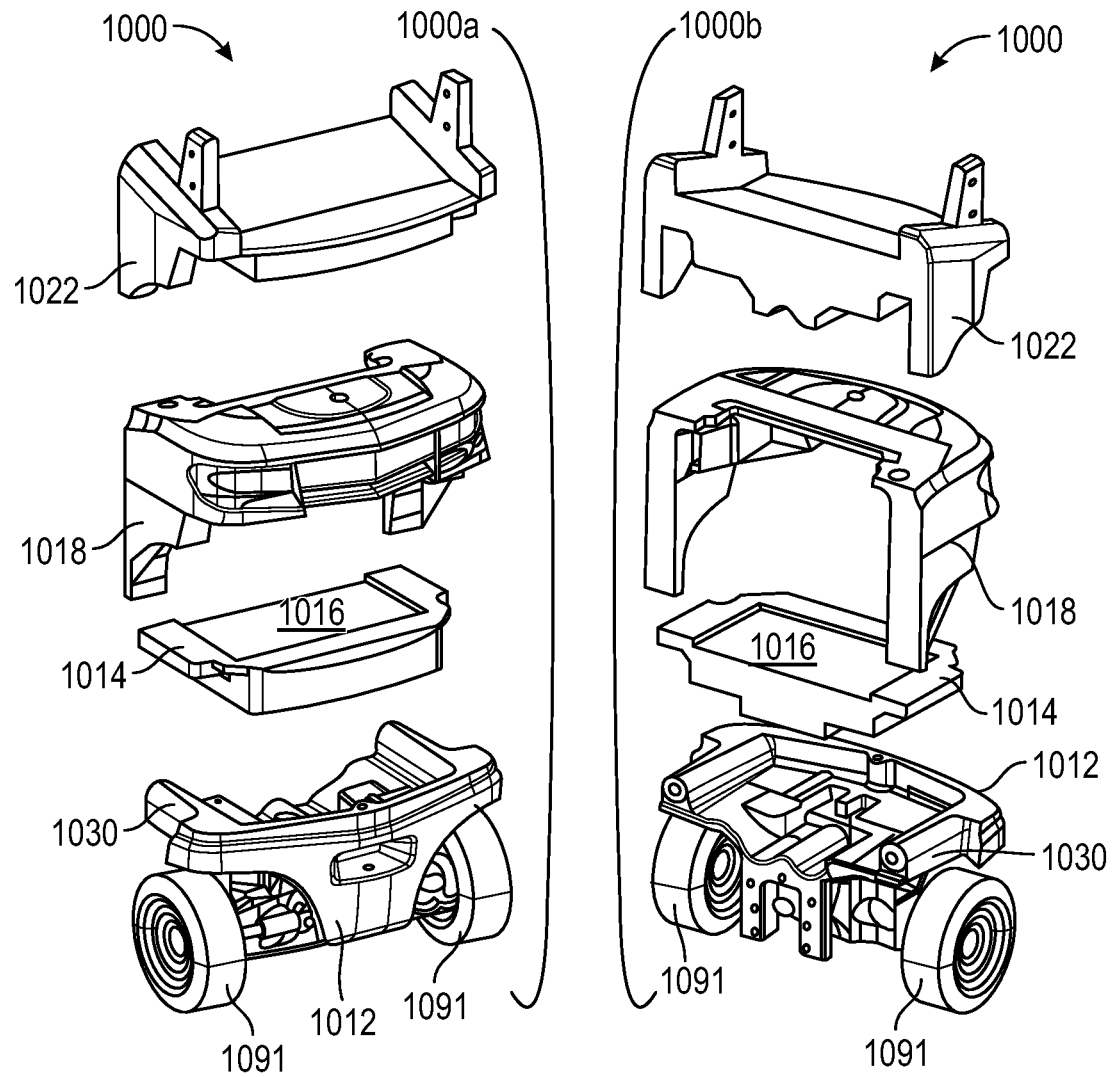
FIGS. 25A and 25B (collectively FIG. 25) are respective rear left and front left partly cutaway views that illustrate exemplary counterweight designs that can be used for a lift truck, which are able to accommodate different energy source and drive components and arrangements, according to various embodiments.

FIGS. 25A and 25B illustrate various shapes of a counterweight system 1000 that can be incorporated into the chassis of embodiments of a lift truck. The counterweight system 1000 can be made with more than one piece, and different form factors can accommodate different shapes and/or arrangements of the lift truck components. For example, different designs for counterweight systems 1000a and 1000b (collectively counterweight system 1000) that are placed behind an operator's seat are shown respectively from the rear left side of a cut away lift truck (FIG. 25A) and from the front right side of a cut away lift truck (FIG. 25B).

With reference to FIGS. 25A and 25B, the counterweight systems 1000 may include a structural (or lower) counterweight 1012 that forms part of a rear portion of the chassis 1030 and may be shaped to accommodate various sizes of rear wheels 1091. The structural counterweight 1012 is typically very heavy and may be the heaviest part of the counterweight system 1000. The structural counterweight 1012 may be a single piece built all at once, integrally or separately from the chassis 1030, or the structural counterweight 1012 may be formed of multiple pieces (such as two pieces) connected to each other and/or the chassis 1030 such as by one or more weldments. The structural counterweight 1012 may be adapted to provide attachment points, shapes, or other connector enhancements to support or accommodate the other components of the counterweight system 1000.

The counterweight system 1000 may also include a counterweight slab 1014 that rests on top of, and/or fits within, the structural counterweight 1012. The counterweight slab 1014 is often the second heaviest component of the counterweight system 1000. The counterweight slab 1014 may form a tray 1016 that is adapted to support a truck component, such as a battery, a fuel tank, an operator accessible component, or an auxiliary counterweight.

The counterweight system 1000 may also include an overhang counterweight 1018 that may be adapted to hang on or over the counterweight slab 1014 or on or over a truck component supported by the counterweight slab 1014. A lift truck having a hydrogen-based energy source may, for example, incorporate a counterweight system 1000 that is formed with a tall edge in order to help protect the hydrogen tanks resting thereon. Similarly, a lift truck having a rear chassis compartment and a lithium-ion battery bank, may incorporate a counterweight system 1000 that is designed to have a shelf or enclosure within it, for an operator-accessible compartment.

The counterweight system 1000 may also include an upper counterweight 1022 that may be adapted to attach to rear struts of the chassis that support the overhead guard. In some embodiments, the upper counterweight 1022 may function more as an adapter than a weight-bearing component. The design of the upper counterweight 1022 may be coordinated with that of the overhang counterweight 1018 to provide adequate connection between the two components. The upper counterweight 1022 and/or the counterweight system 1000 as a whole may be designed, such as sloped, to enhance the operator sight line to low objects close and behind the lift truck.

Any of these components of the counterweight system 1000 may be manufactured in multiple weights and/or sizes to suit an interchangeable modular system to accommodate different modular truck configurations utilizing a common chassis 1030 and to fine tune the center of gravity with respect to the particular configuration and specific lift truck components within such configuration.

Figure 26:
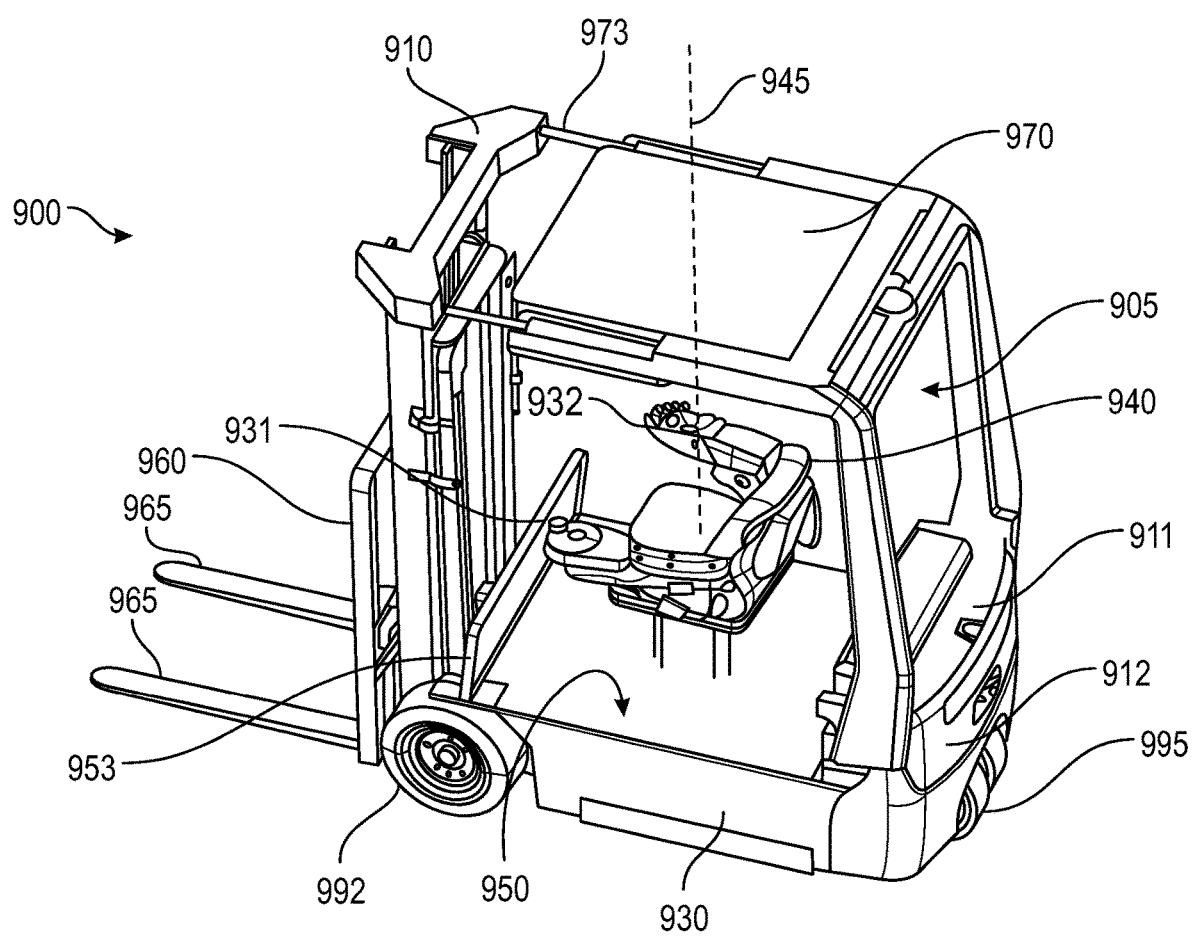
FIG. 26 is an isometric drawing of a lift truck having a different form factor than the lift truck of FIG. 1, from a rear left perspective, according to one embodiment.
Figure 27:
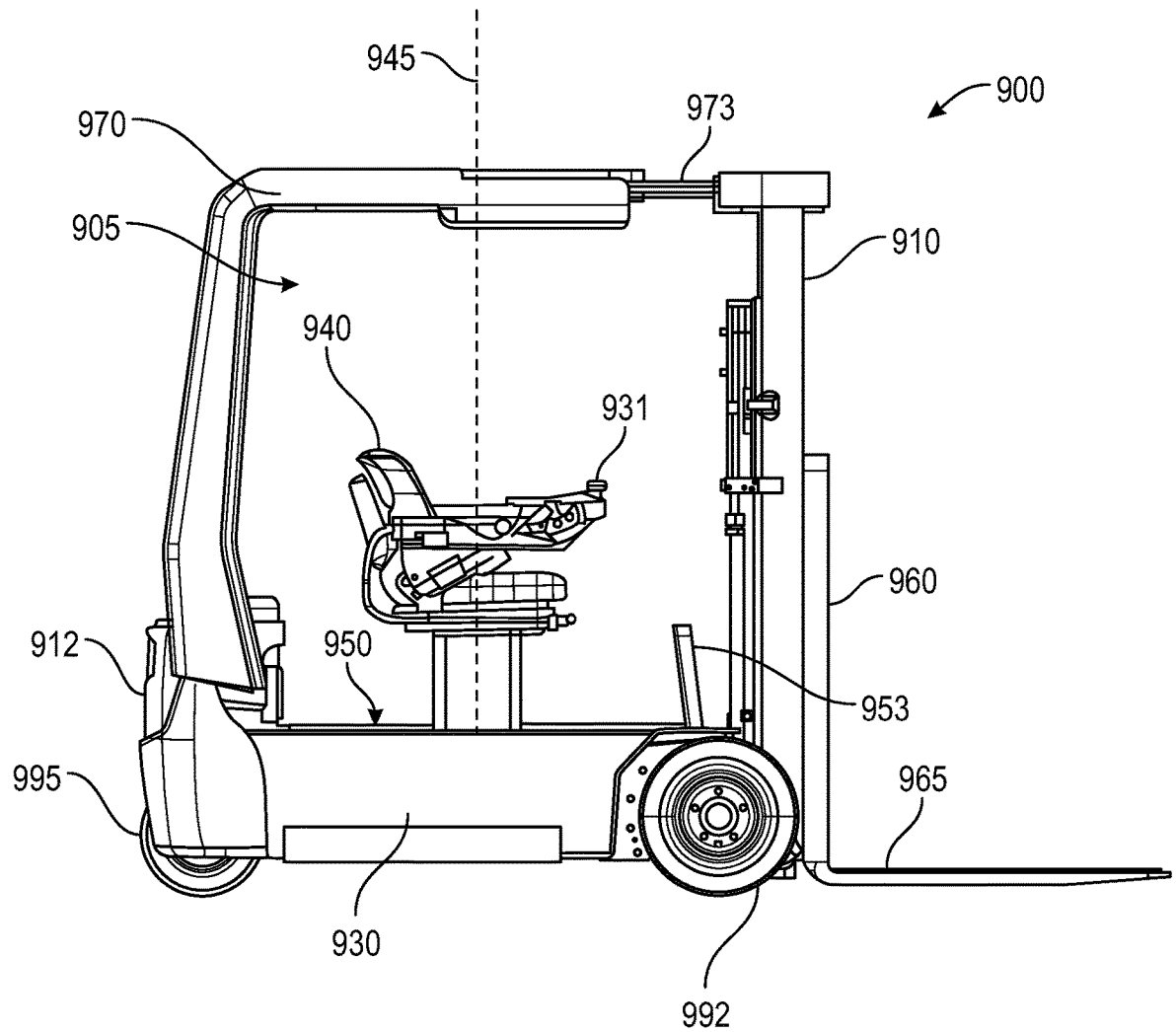
FIG. 27 is a right side view of a lift truck having an additional different form factor than the lift truck of FIG. 1, according to one embodiment.

FIGS. 26 and 27 are illustrations of an embodiment of a lift truck 900 having seatside steering and a low operator compartment floor 950 having no foot controls, with a different form factor as the lift trucks shown in FIGS. 1-24. Lift truck 900 has a chassis 930, seatside steering and a low floor 950. Truck 900 also includes an overhead guard 970, a lift chassis 960 having forks 965, mast 910, hand-operated controls 931 and 932 integrated into seat 940, and counterweight 912. The truck 900 has a lift assembly that includes a tilt mechanism 973 that is incorporated into the overhead guard 970 and is connected to the lift assembly. The tilt mechanism 973 can selectively tilt the lift assembly including fork carriage 960. The lift truck 900 has a single rear wheel 995, exemplifying an embodiment of a three-wheeled lift truck.

In reference to FIGS. 26 and 27, the low floor 950 is free from any obstruction to the operator's feet or legs when entering or exiting the truck, or when seated in the seat 940. The operator's seat 940 is attached directly to the operator compartment floor 950 and can rotate about vertical axis 945. Front cowl 953 of floor 950 separates the fixed operator compartment from the movable lift assembly and provides operator protection.

The shape and materials used for front cowl 953 may vary. In an embodiment, the cowl 953 is made of metal and is lower in height than the operator's seat 940. The cowl 953 may serve to protect the operator's feet from exposure to any materials being lifted on the lift carriage 960 which may fall into the operator's compartment 905. In an embodiment, the cowl 953 is higher than the height of the seat 940.

Figure 28:
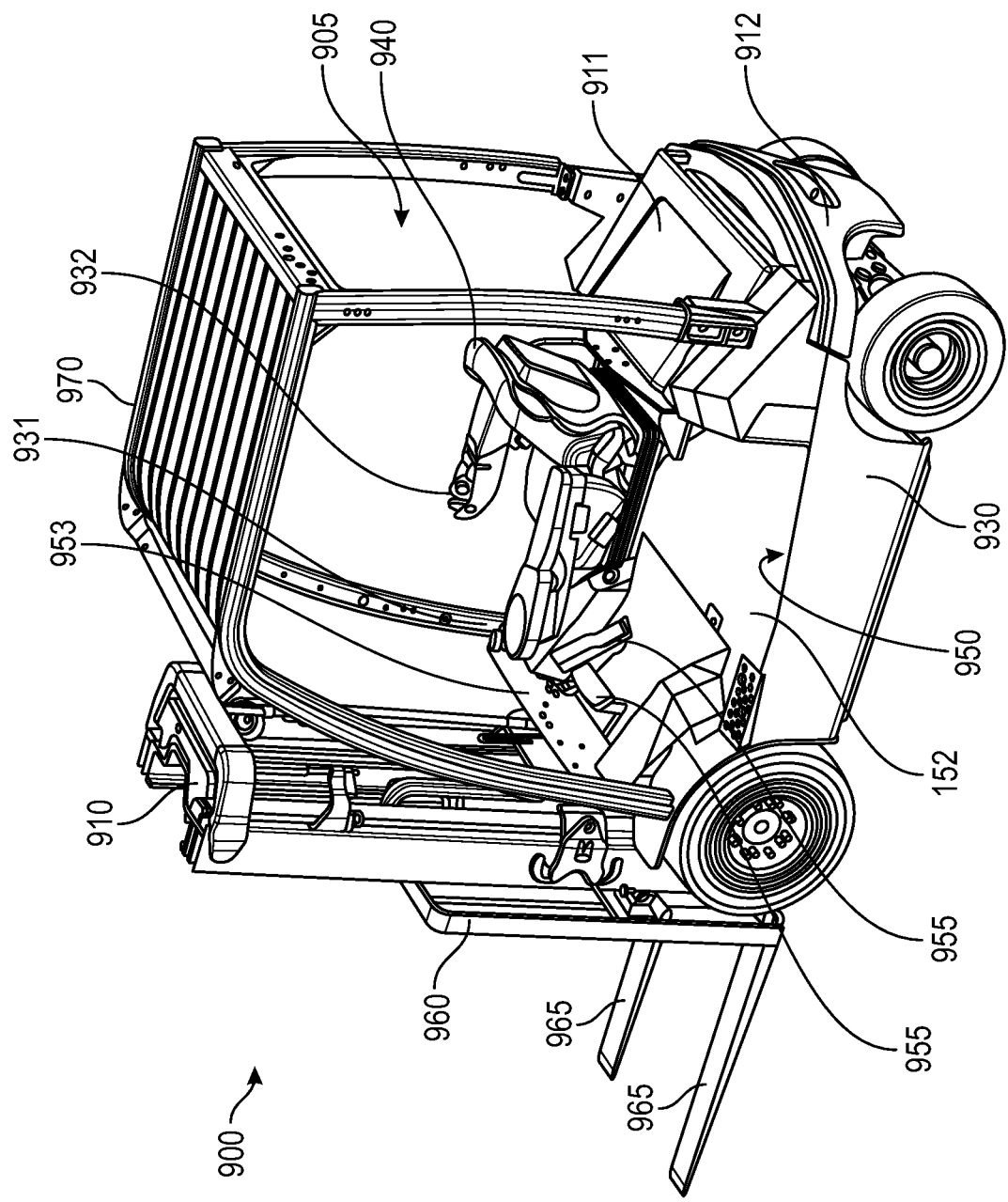
FIG. 28 is an isometric drawing of a lift truck with a short cowl and seatside steering, according to one embodiment, from a left rear perspective.

FIG. 28 is an illustration of an embodiment of a lift truck 900 having seatside steering, a low operator compartment floor, a short front cowl 953 and multiple foot controls 955. The embodiments of the lift truck 900 shown in FIG. 28 includes an overhead guard 970, a lift chassis 960 having forks 965, mast 910, hand-operated controls 931 and 932 integrated into seat 940, counterweight 912, and a sloping rear panel 911. The truck 900 has an operator's seat 940 that is not attached to the operator compartment floor 950. Multiple foot pedals 955 are shown.

Figure 29:
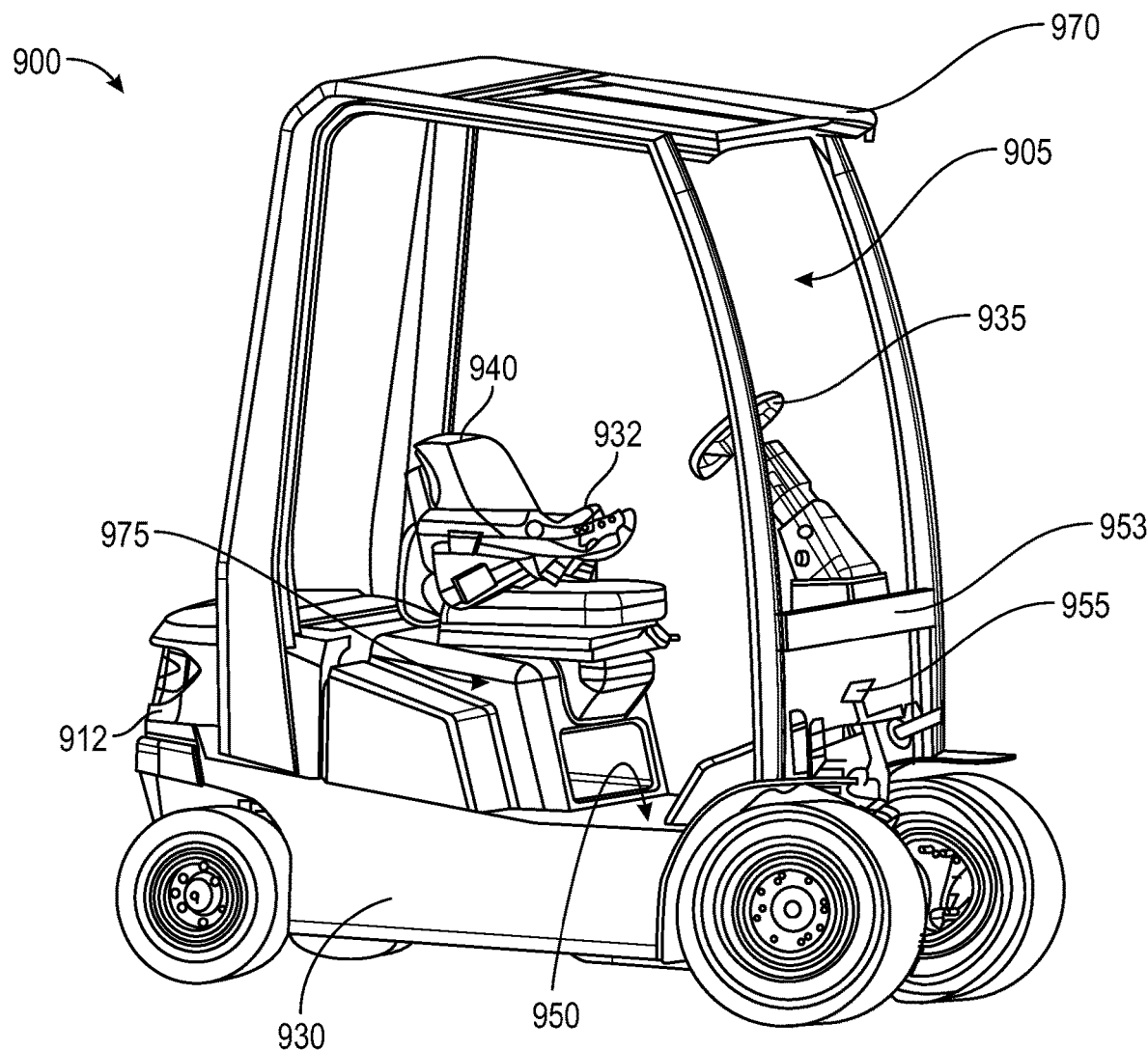
FIG. 29 is an isometric drawing of a lift truck with the mast and fork chassis removed, according to one embodiment, from a right front perspective.
Figure 30:
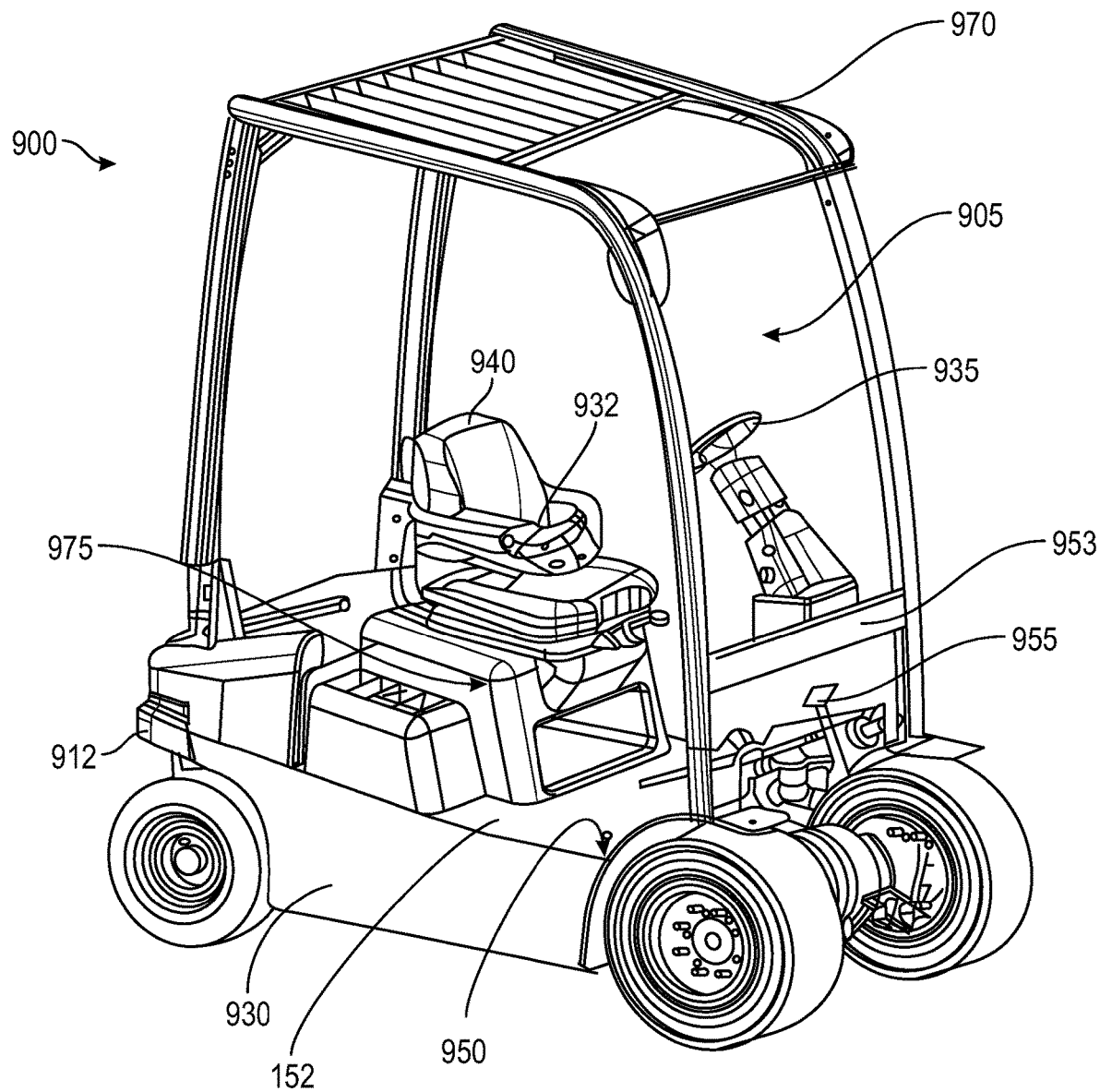
FIG. 30 is an isometric drawing of an additional lift truck with the mast and fork chassis removed, according to one embodiment, from a right front perspective.

FIGS. 29 and 30 are illustrations of an embodiment of lift trucks 900 having a steering wheel 935, a low operator compartment floor 950, a tall front cowl 953, and a single foot pedal 955. The embodiments of the lift trucks shown in FIGS. 29-30 include varying form factors and have the lift assembly removed for clarity. The lift trucks 900 shown in FIGS. 29-30 include an overhead guard 970, an operator compartment 905, four wheels, chassis 930, hand-operated finger controls 932 integrated into seat 940, and counterweight 912. The lift trucks 900 shown in FIGS. 29 and 30 illustrate two examples of operator-accessible storage compartments, but other, different operator-accessible storage compartments are possible in the space available under the seat 940 or elsewhere in the open space that a broad, flat floor makes available.

Referring to FIG. 29, the embodiment of truck 900 shown has an operator's seat 940 that does not adjust vertically. Below the seat 940 and above the floor 950, there is an operator-accessible storage compartment 990 that is open in the front. The tall front cowl 953 is made with an upper horizontals metallic portion and a transparent lower portion, such that the operator can view the lift carriage when the carriage is close to the ground.

Referring to FIG. 30, the embodiment of the truck 900 shown also has an operator's seat 940 that does not adjust vertically and a tall front cowl 953 that is made with an upper horizontals metallic portion and a transparent lower portion. Below the seat 940 and above the floor 950, there is an operator-accessible storage compartment 992 that is open in the front, and there are also open compartments to the side of the seat, for additional storage.

Additional examples of the advantageous lift truck elements described herein can be found in U.S. Design patent application Ser. No. 29/685,948, filed on Mar. 1, 2019, which is herein incorporated by reference. The lift trucks shown in U.S. Design patent application Ser. No. 29/685,948 include an optional step between the ground and the operator compartment floor so that operators who are accustomed to using a step may utilized one even though not necessary.

One will appreciate that some aspects of the lift truck disclosed herein can also be utilized for end-rider trucks, such as the modularity of configurations, the low floor, the interchangeable components, and/or the batteries and electric motors.

CONCLUSION

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. A chassis for a configurable sit-down counterbalanced forklift truck having a plurality of wheels, the chassis comprising:
a front side, a rear side, a left side, and a right side; and
a chassis compartment situated between the front side and the rear side and between the left side and right side of the chassis,
wherein the chassis compartment is sized and shaped so that one of a plurality of different types of power plants for the forklift truck and one of a plurality of different types of power sources can be installed within the chassis compartment to power the forklift truck to drive and to lift a load,
wherein the chassis compartment is configured to hold one of a plurality of different designs of counterweights on or in a rear portion of the chassis compartment, and
wherein the chassis is configured to support one of a plurality of different operator compartment modules attached atop the chassis.

2. A chassis according to claim 1, wherein the different types of power sources comprise lithium-ion batteries, lead-acid batteries, petrochemical fuel, and hydrogen.

3. A chassis according to claim 1, wherein the different types of power plants comprise a motor, a hydrogen fuel cell, and an internal combustion engine.

4. A chassis according to claim 1, wherein the different designs of counterweights comprise a single-piece counterweight and a multi-piece counterweight.

5. A chassis according to claim 1, wherein the different designs of counterweights comprise a first multi-piece counterweight and a second multi-piece counterweight, wherein the first and second multi-piece counterweights have at least one different piece.

6. A chassis according to claim 1, wherein the different operator compartment modules comprise an operator module having a floor at a height less than at least one of the wheels.

7. A chassis according to claim 1, wherein the different operator compartment modules comprise an operator module having a substantially flat operator floor that extends laterally from the left side of the chassis to the right side of the chassis.

8. A chassis according to claim 7, wherein the operator compartment module further comprises an operator seat comprising a backrest, wherein the operator floor extends below the backrest of the operator seat.

9. A chassis according to claim 1, wherein the chassis compartment is further configured to contain a hydraulic system.

10. A chassis according to claim 1, wherein a height of the chassis is less than a height of at least one of the wheels.

11. A chassis according to claim 1, wherein the chassis is configured to support one of a plurality of different operator compartment modules permanently attached atop the chassis.

12. A chassis according to claim 1, wherein the chassis compartment is formed by the front side, the rear side, the left side, and the right side.

13. A chassis according to claim 1, wherein the chassis compartment is sized, shaped, and configured so that the power plant is one or more electric motors, the power source is one or more batteries, and the operator compartment module comprises an operator compartment floor at a height less than at least one of the wheels, and wherein the operator compartment floor is also a top cover for the chassis compartment.

14. A chassis according to claim 13, wherein the operator compartment floor is substantially flat and extends laterally from the left side of the chassis to the right side of the chassis.

15. A chassis according to claim 13, wherein the operator compartment module further comprises an operator seat comprising a backrest, wherein the operator compartment floor extends below the backrest of the operator seat.

16. A method for manufacturing a configurable sit-down counterbalanced forklift truck using a common chassis, the method comprising:
starting with a common chassis having a front side, a rear side, a left side, and a right side defining a chassis compartment situated between the front side and the rear side and between the left side and right side of the chassis;
installing within the chassis compartment one of a plurality of different types of power plants for the forklift truck and one of a plurality of different types of power sources so as to provide power to the forklift truck to drive and to lift a load;
installing on or in a rear portion of the chassis compartment one of a plurality of different designs of counterweights; and
attaching to the chassis atop the chassis one of a plurality of different operator compartment modules.

17. A method according to claim 16, wherein the different types of power sources comprise lithium-ion batteries, lead-acid batteries, petrochemical fuel, and hydrogen.

18. A method according to claim 16, wherein the different types of power plants comprise a motor, a hydrogen fuel cell, and an internal combustion engine.

19. A method according to claim 16, wherein the different designs of counterweights comprise a single-piece counterweight and a multi-piece counterweight.

20. A method according to claim 16, wherein the different designs of counterweights comprise a first multi-piece counterweight and a second multi-piece counterweight, wherein the first and second multi-piece counterweights have at least one different piece.

21. A method according to claim 16, further comprising:
attaching a plurality of wheels to the forklift truck such that the power plant can turn one or more of the wheels to drive the forklift truck, and wherein the different operator compartment modules comprise an operator module having a floor at a height less than at least one of the wheels.

22. A method according to claim 16, wherein the different operator compartment modules comprise an operator module having a substantially flat operator floor that extends laterally from the left side of the chassis to the right side of the chassis.

23. A method according to claim 22, wherein the operator compartment module further comprises an operator seat comprising a backrest, wherein the operator floor extends below the backrest of the operator seat.

24. A method according to claim 16, further comprising:
installing a hydraulic system in the chassis compartment;
installing a mast and a forklift subassembly on the forklift truck; and
connecting the hydraulic system to the forklift subassembly to provide lifting power form the hydraulic system to the forklift subassembly.

25. A method according to claim 16, further comprising:
installing a plurality of wheels to the chassis and the power plant, wherein a height of the chassis is less than a height of at least one of the wheels.

26. A method according to claim 16, wherein said attaching to the chassis atop the chassis one of a plurality of different operator compartment modules comprises permanently attaching to the chassis atop the chassis one of a plurality of different operator compartment modules.

27. A method according to claim 16, wherein said one of the plurality of different types of power sources comprises one or more lithium-ion batteries, said one of the plurality of different types of power plants comprises one or more electric motors, and said one of the plurality of different operator compartment modules comprises an operator compartment floor, and wherein the operator compartment floor is also a top cover for the chassis compartment.

28. A method according to claim 27, wherein the operator compartment floor is substantially flat and extends laterally from the left side of the chassis to the right side of the chassis.

29. A method according to claim 27, wherein the operator compartment module further comprises an operator seat comprising a backrest, wherein the operator compartment floor extends below the backrest of the operator seat.

* * * * *

UNITED STATES PATENT AND TRADEMARK OFFICE
CERTIFICATE OF CORRECTION

PATENT NO. : 12,330,925 B2
APPLICATION NO. : 18/640146
DATED : June 17, 2025
INVENTOR(S) : Stilwell et al.

It is certified that error appears in the above-identified patent and that said Letters Patent is hereby corrected as shown below:

In the Specification

In Column 1, Line 28, delete "an operator" and insert --operator-- therefor.

In Column 11, Line 9, delete "according one" and insert --according to one-- therefor.

In Column 11, Line 37, delete "isomeric" and insert --isometric-- therefor.

In Column 11, Line 46, delete "is" and insert --is a-- therefor.

In Column 21, Line 10, delete "be" and insert --being-- therefor.

In Column 32, Line 27, delete "horizontals" and insert --horizontal-- therefor.

In Column 32, Line 33, delete "horizontals" and insert --horizontal-- therefor.

In the Claims

In Column 34, Claim 24, Line 62, delete "form" and insert --from-- therefor.

Signed and Sealed this
Twelfth Day of August, 2025

Coke Morgan Stewart
*Acting Director of the United States Patent and Trademark Office*